(12) United States Patent
Manson et al.

(10) Patent No.: US 10,887,415 B1
(45) Date of Patent: Jan. 5, 2021

(54) COMMON AGNOSTIC DATA EXCHANGE SYSTEMS AND METHODS

(71) Applicant: Architecture Technology Corporation, Minneapolis, MN (US)

(72) Inventors: Carl Manson, Eden Prarie, MN (US); Ryan Marotz, Bloomington, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 239 days.

(21) Appl. No.: 15/975,091

(22) Filed: May 9, 2018

(51) Int. Cl.
*H04L 29/08* (2006.01)
*H04L 29/06* (2006.01)

(52) U.S. Cl.
CPC ........ *H04L 67/2823* (2013.01); *H04L 67/288* (2013.01); *H04L 67/2876* (2013.01); *H04L 69/08* (2013.01)

(58) Field of Classification Search
CPC ............. H04L 67/2823; H04L 67/2876; H04L 67/288; H04L 69/08
See application file for complete search history.

(56) References Cited

U.S. PATENT DOCUMENTS

| | | | | |
|---|---|---|---|---|
| 5,608,874 A * | 3/1997 | Ogawa | ............... | H04N 1/00204 709/246 |
| 10,248,096 B2 * | 4/2019 | Fainor | .............. | G06Q 10/06375 |
| 2004/0088425 A1 * | 5/2004 | Rubinstein | .............. | H04L 63/20 709/230 |
| 2004/0122656 A1 * | 6/2004 | Abir | ........................ | G06F 16/30 704/4 |
| 2004/0186842 A1 * | 9/2004 | Wesemann | .......... | G06F 16/1794 |
| 2013/0283171 A1 * | 10/2013 | Schick | .................. | G06F 3/0481 715/733 |
| 2015/0326664 A1 * | 11/2015 | Richter | .................. | G06Q 10/06 709/217 |
| 2016/0092557 A1 * | 3/2016 | Stojanovic | ............ | G06F 16/254 707/723 |
| 2019/0141106 A1 * | 5/2019 | Hertz | .................... | H04L 65/605 |

* cited by examiner

*Primary Examiner* — Patrice L Winder
*Assistant Examiner* — Aye M Aung
(74) *Attorney, Agent, or Firm* — Key IP Law Group, PLLC

(57) ABSTRACT

In a network, a common agnostic data exchange method between two devices native to the network, the devices using different formats and transmission protocols, includes invoking a proxy at each device, and a first proxy receiving a first data record from a first device, the first data record having a first format. The first proxy identifies the first format by comparing a first pattern of the first data record to reference patterns of one or more reference data records and determines if a sufficient pattern match exists between the first pattern and the reference pattern. The first proxy translates the first data record's format into an inter-proxy data record having an inter-proxy format and transmits the inter-proxy data record to a second proxy coupled to a second device. The second proxy translates the inter-proxy data record to a second data record having a format employed at the second device.

19 Claims, 41 Drawing Sheets

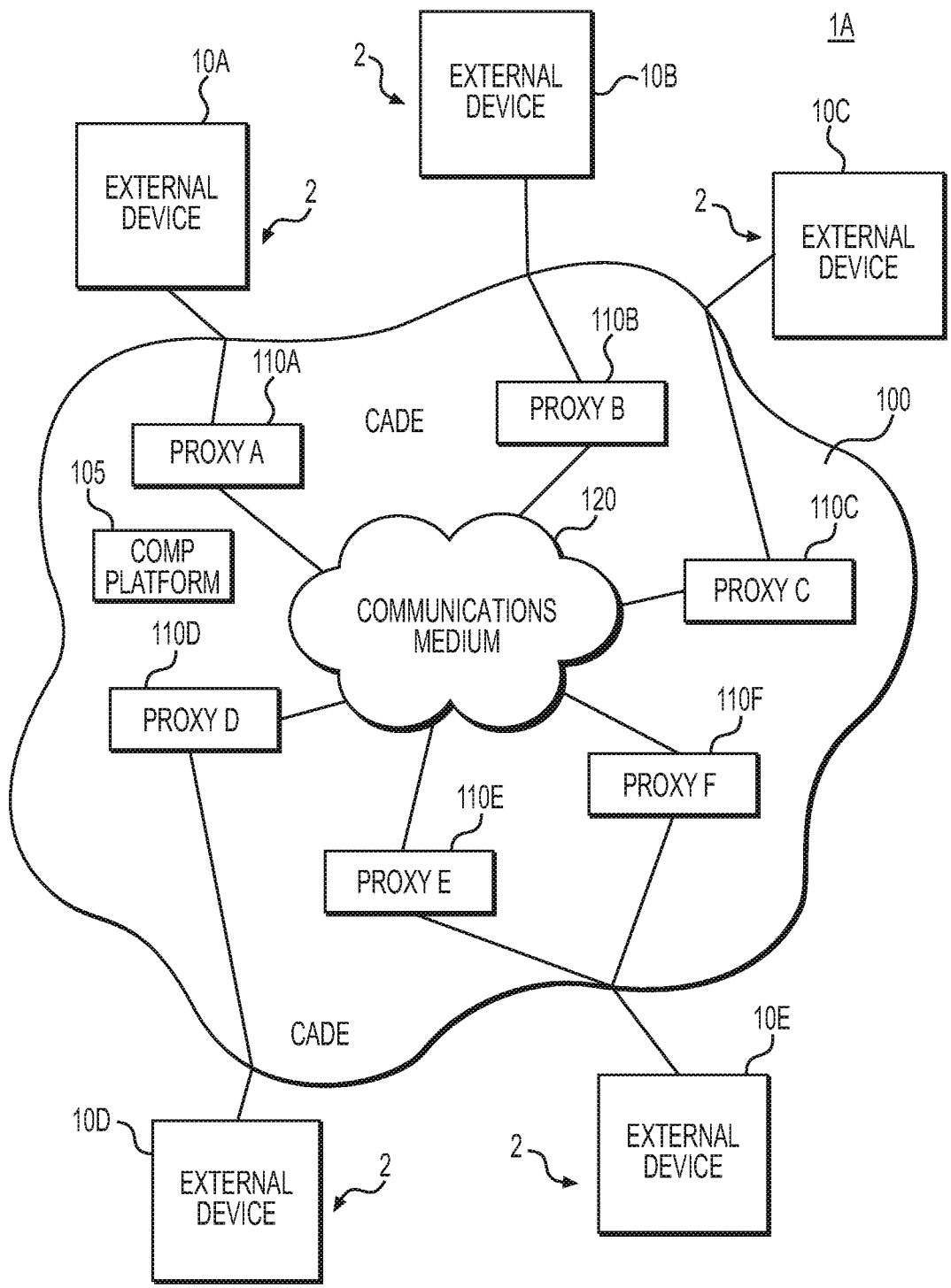
FIG. 1A(1)

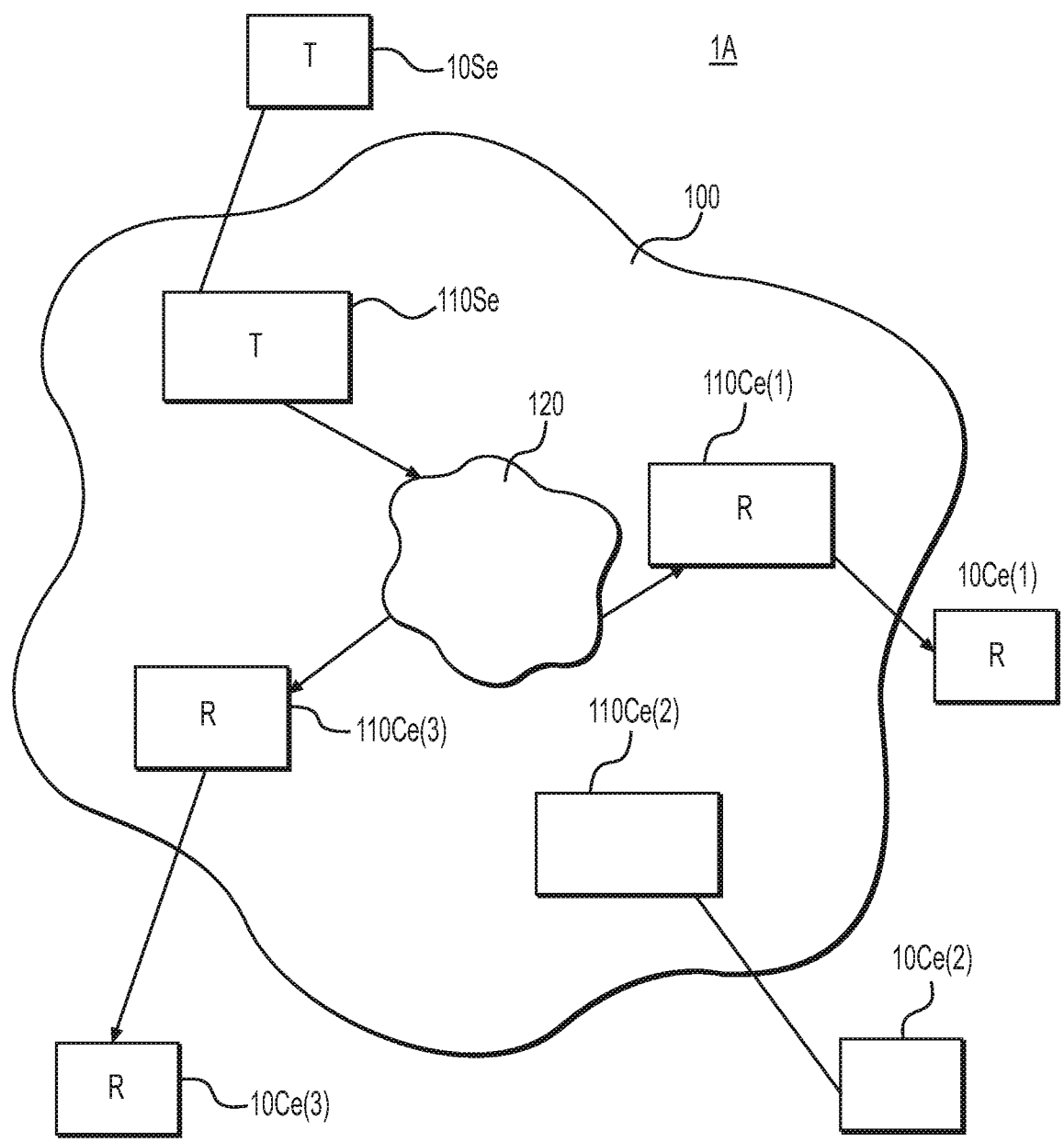
FIG. 1A(2)

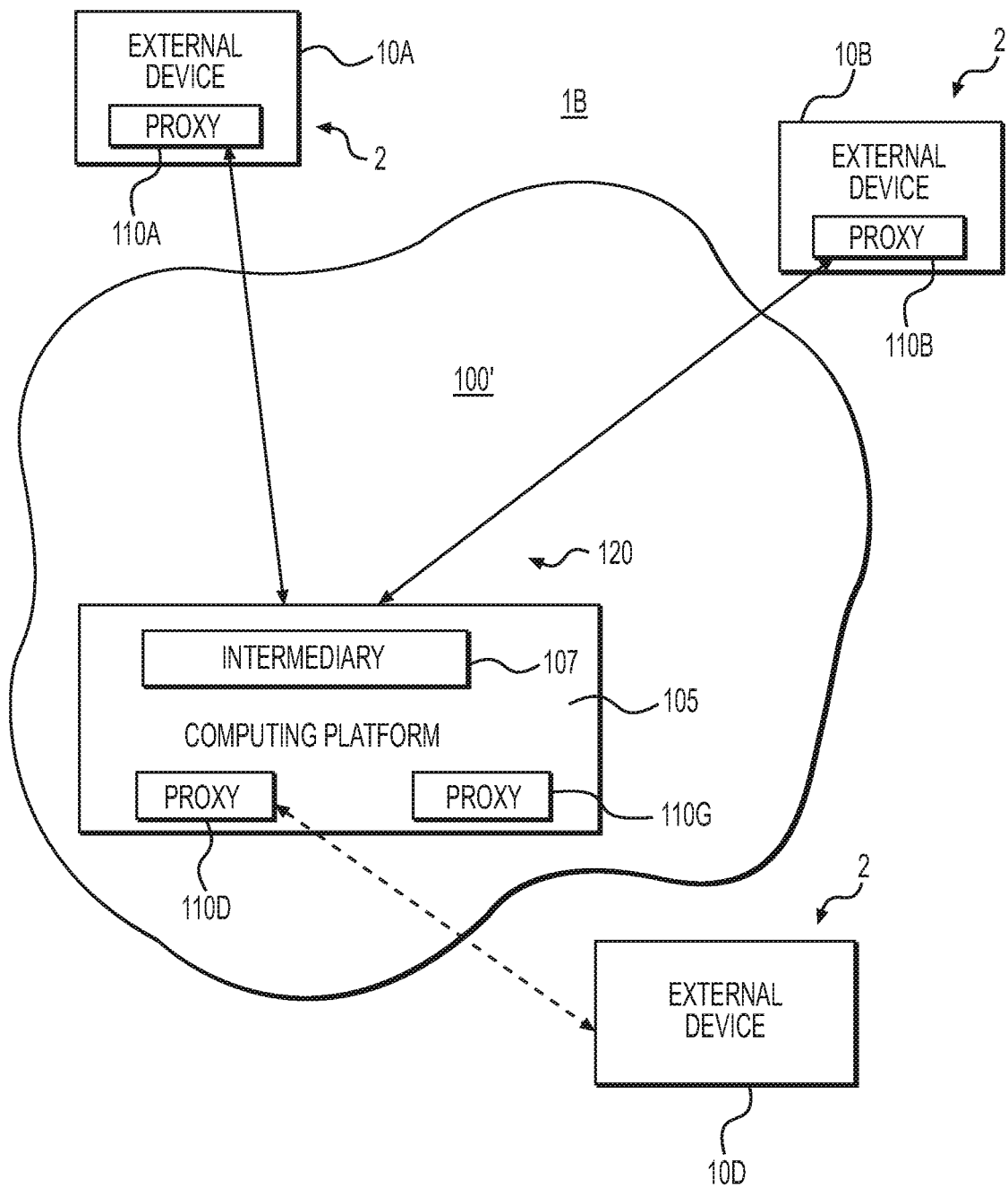
FIG. 1A(3)

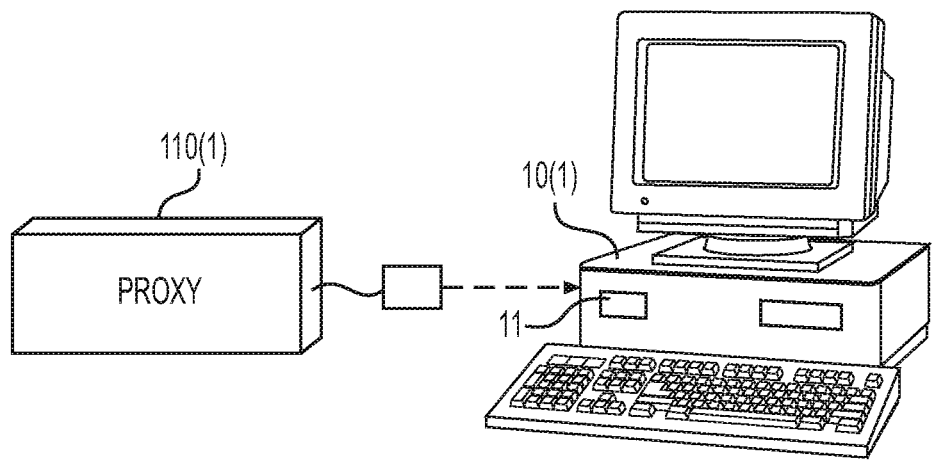
FIG. 1B(1)
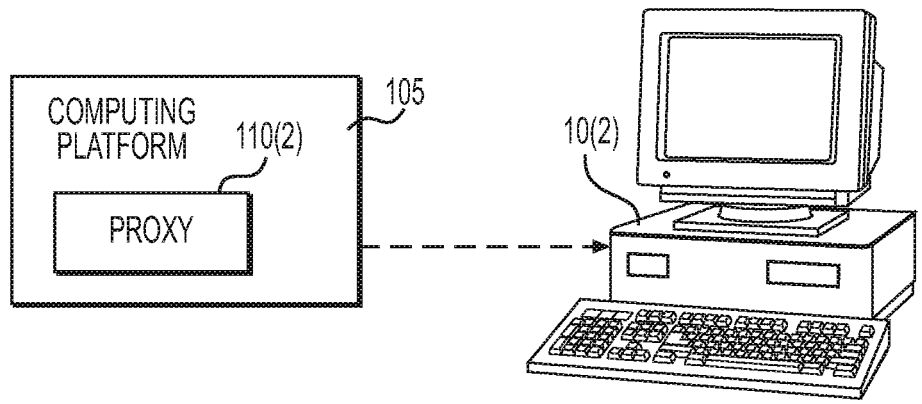
FIG. 1B(2)
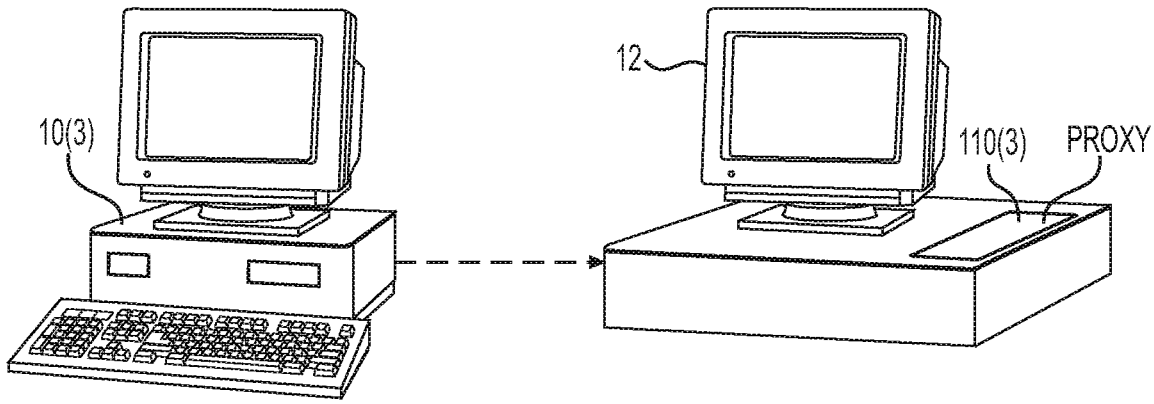
FIG. 1B(3)

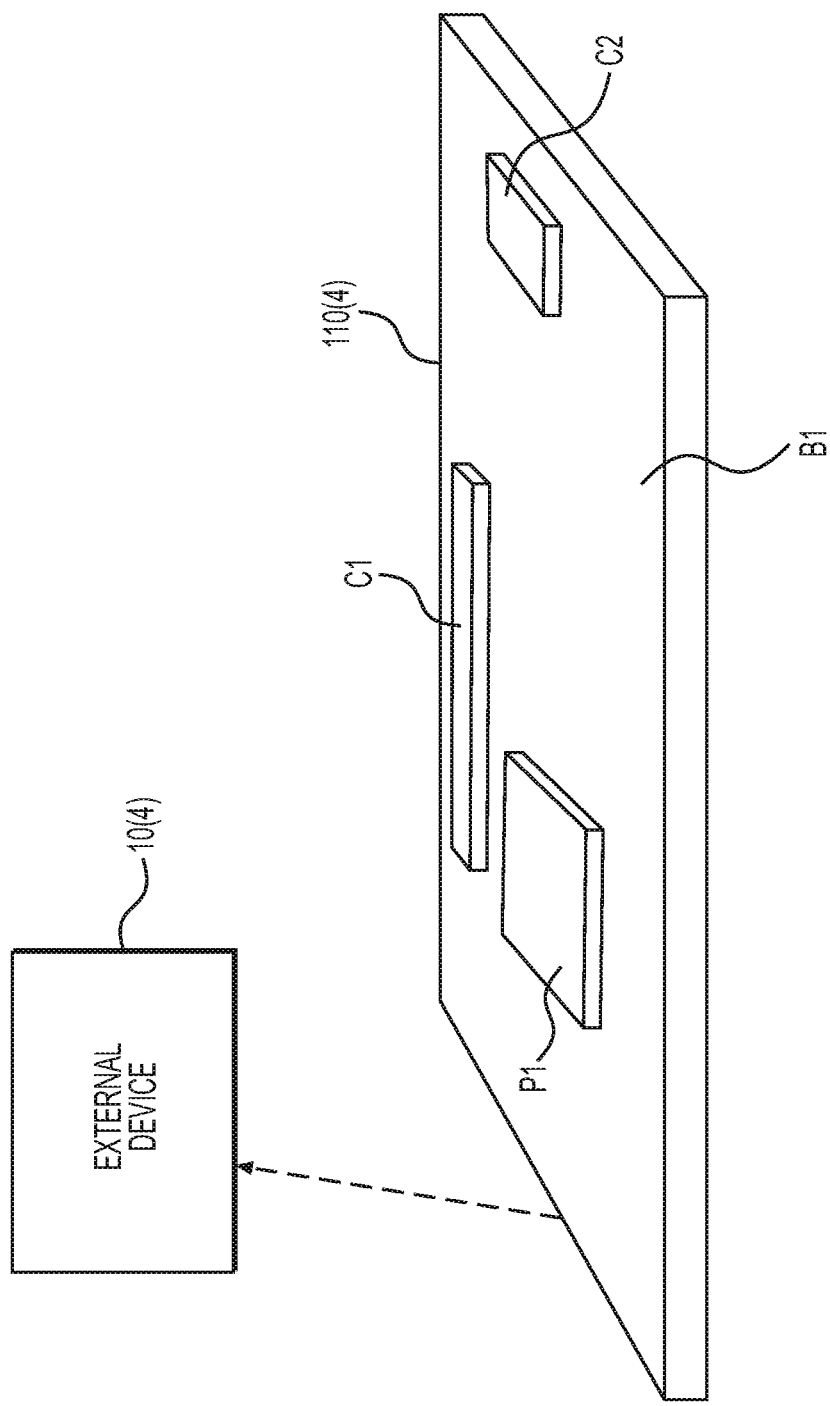
FIG. 1B(4)

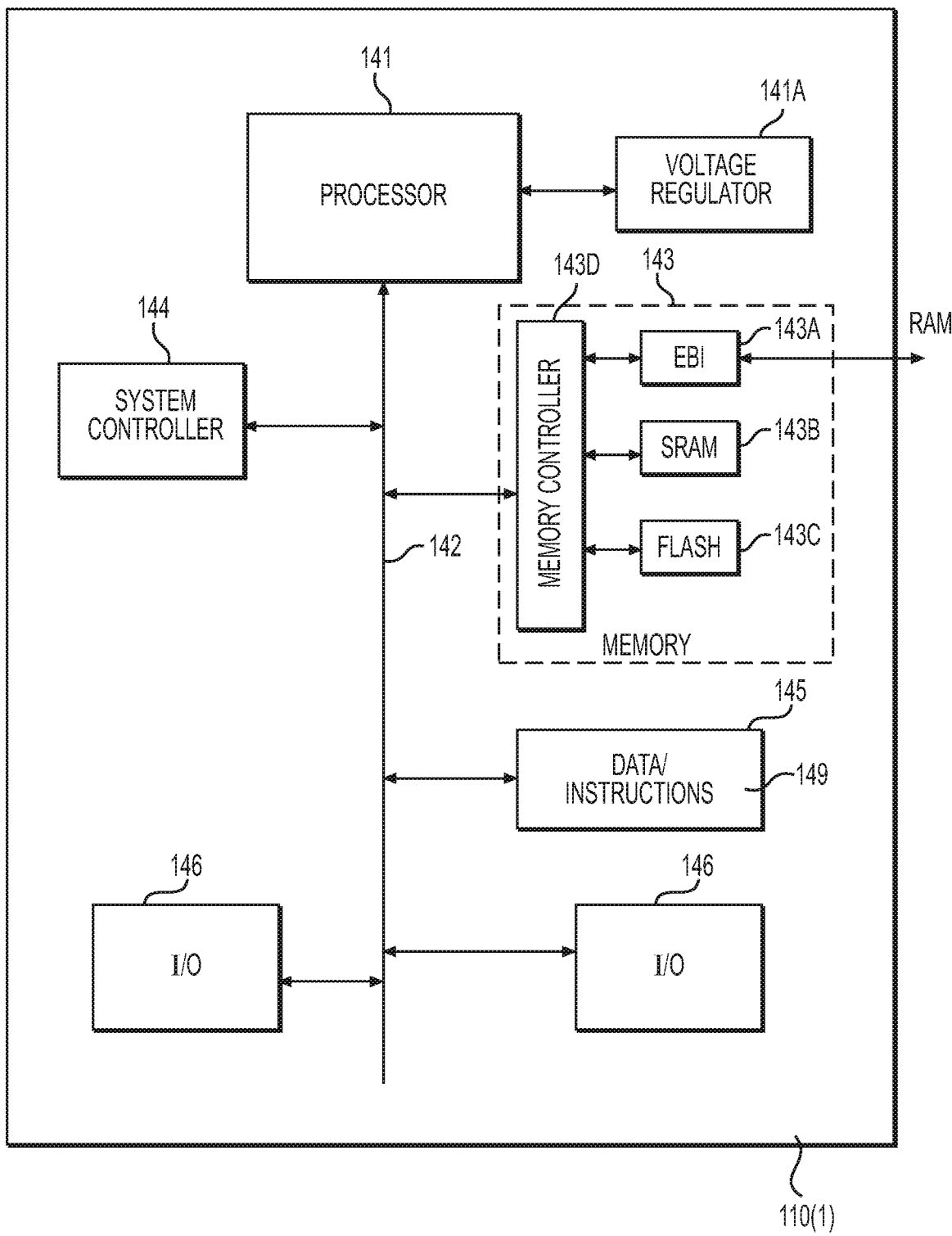
FIG. 1C(1)

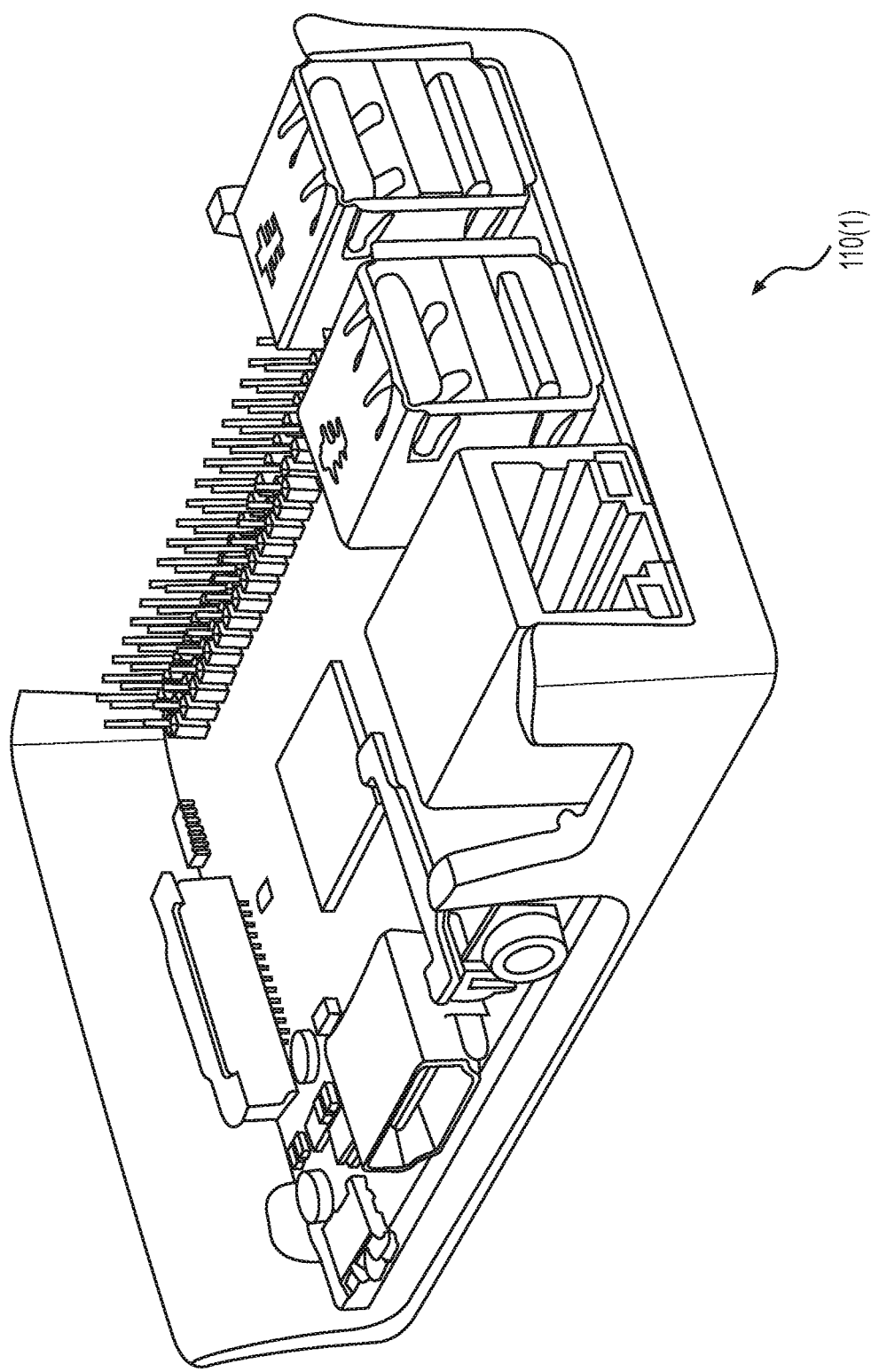
FIG. 1C(2)

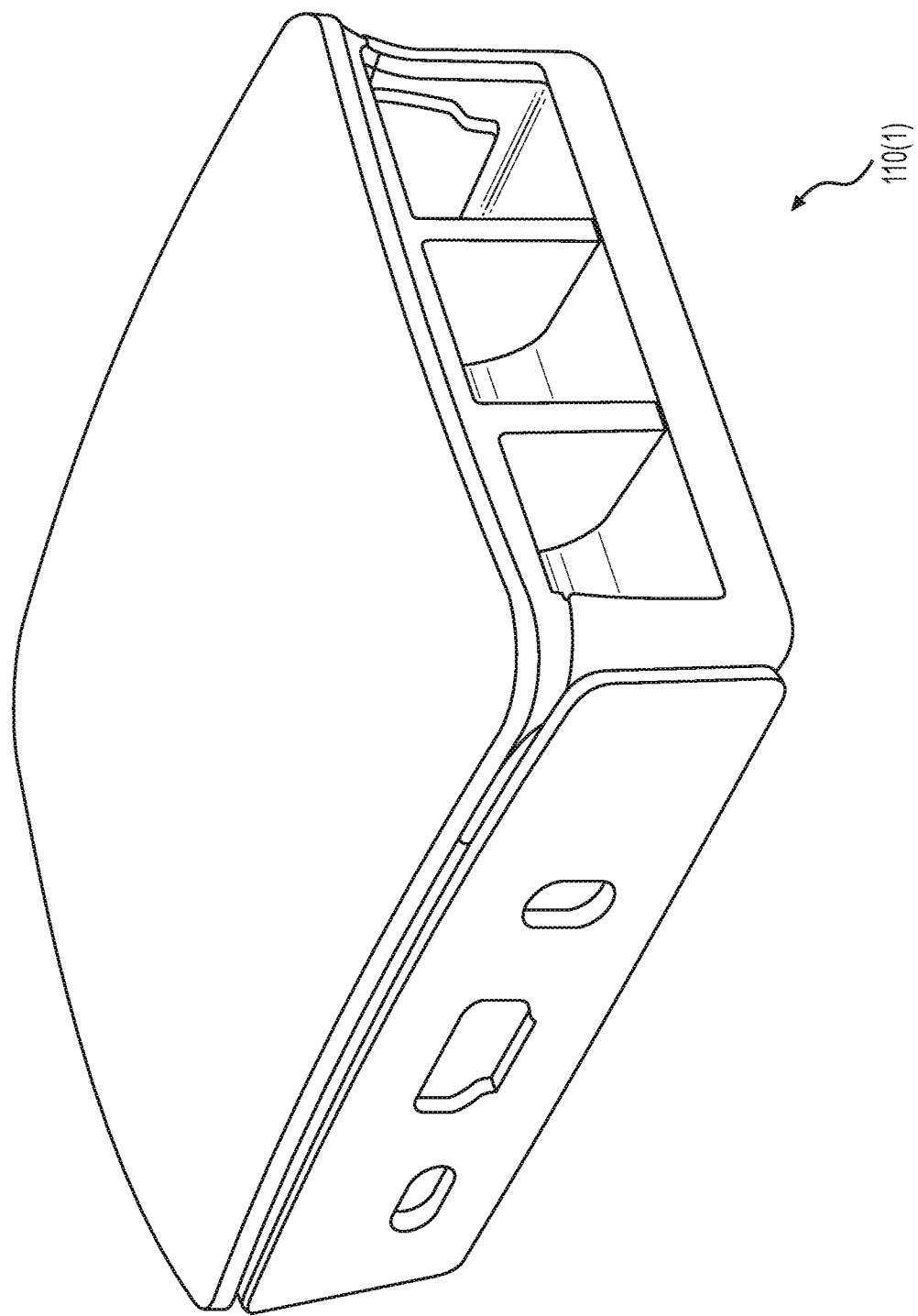
FIG. 1C(3)

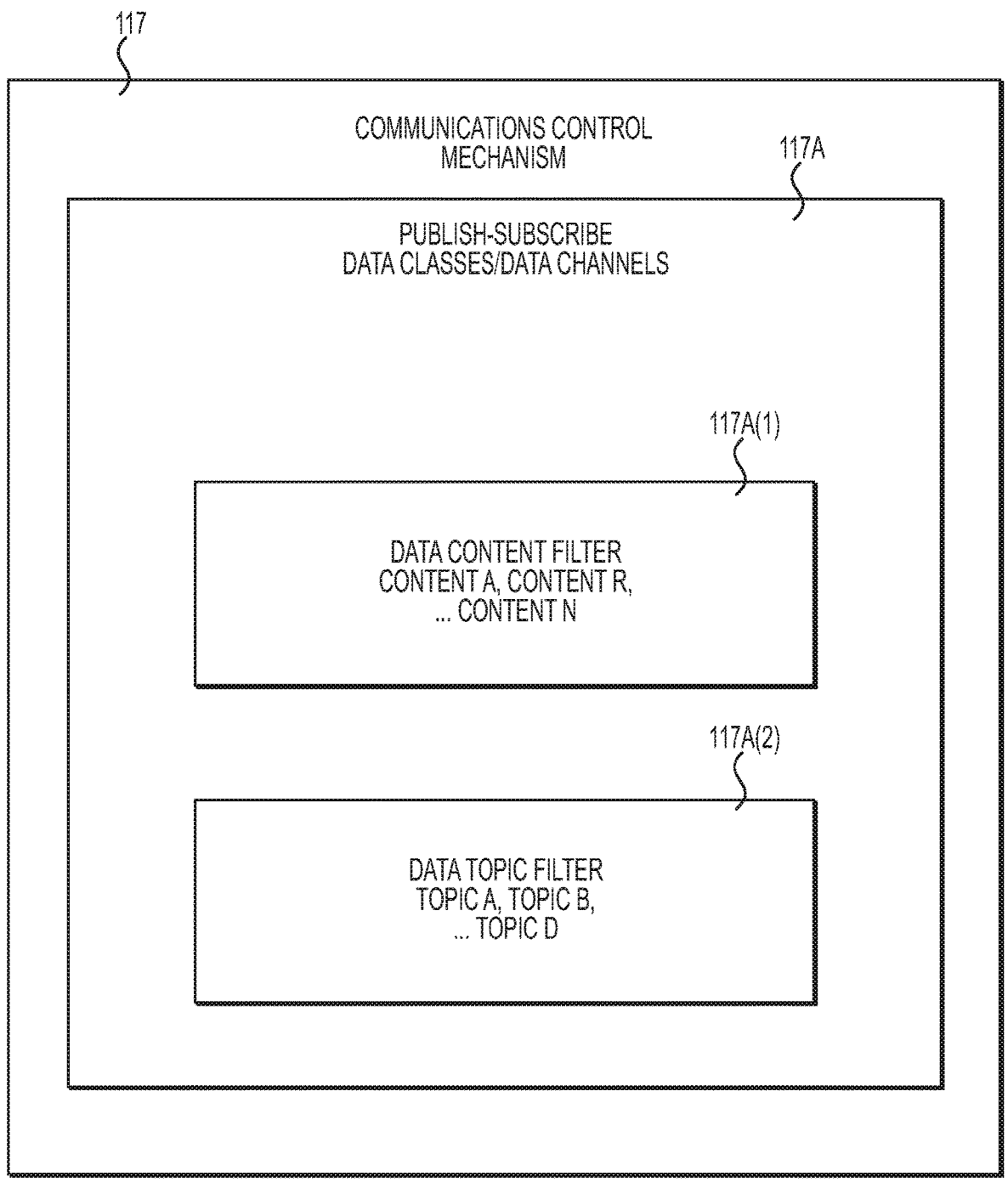
FIG. 3D(1)

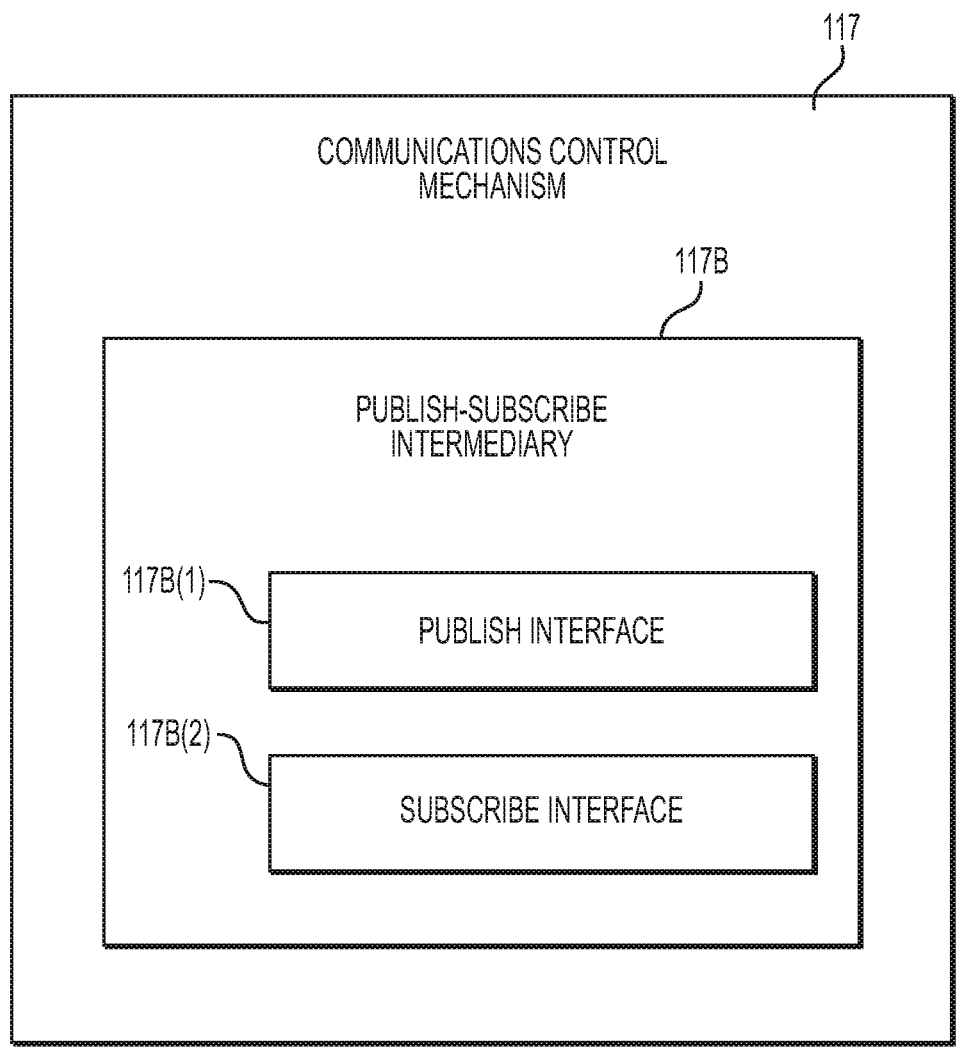
*FIG. 3D(2)*

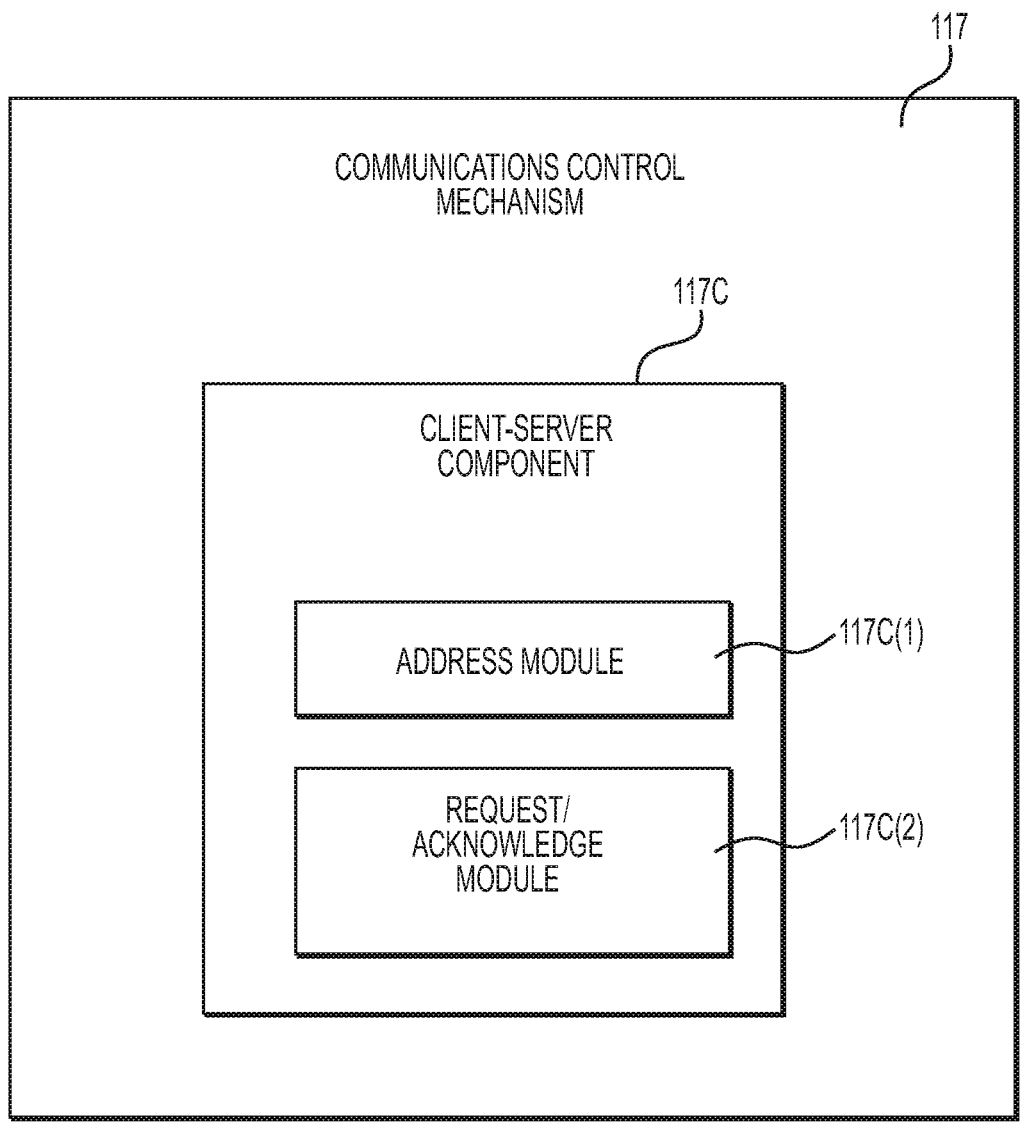
FIG. 3D(3)

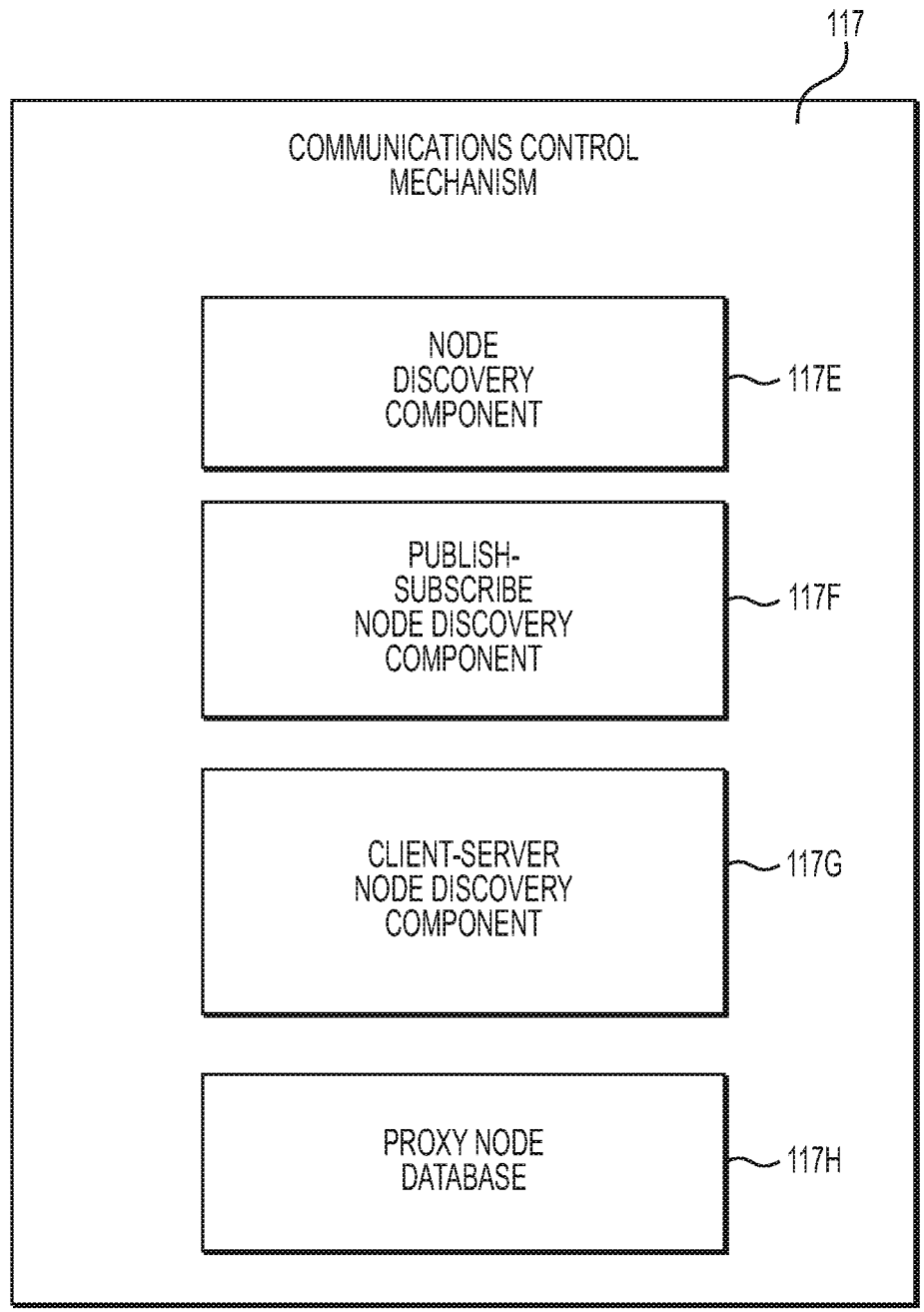
FIG. 3E(1)

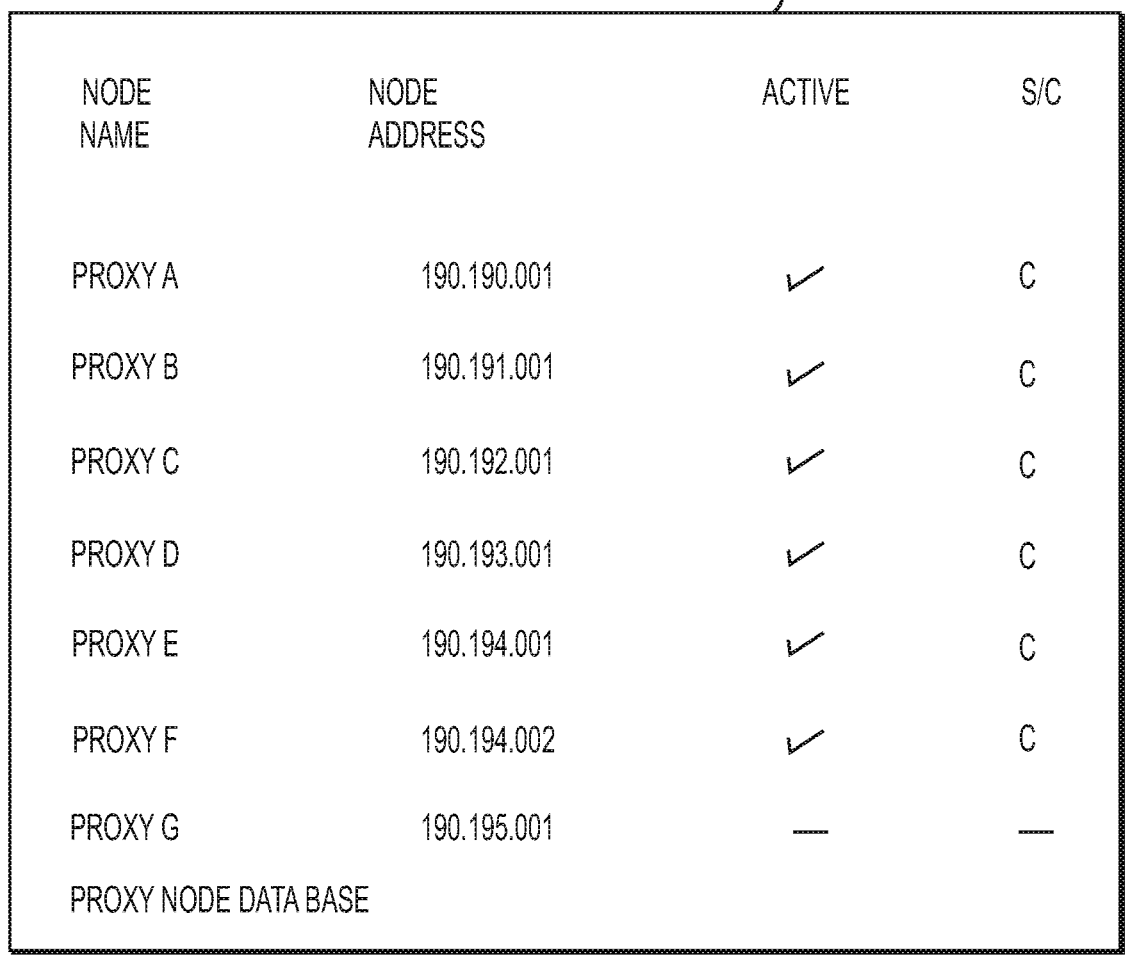
FIG. 3E(2)

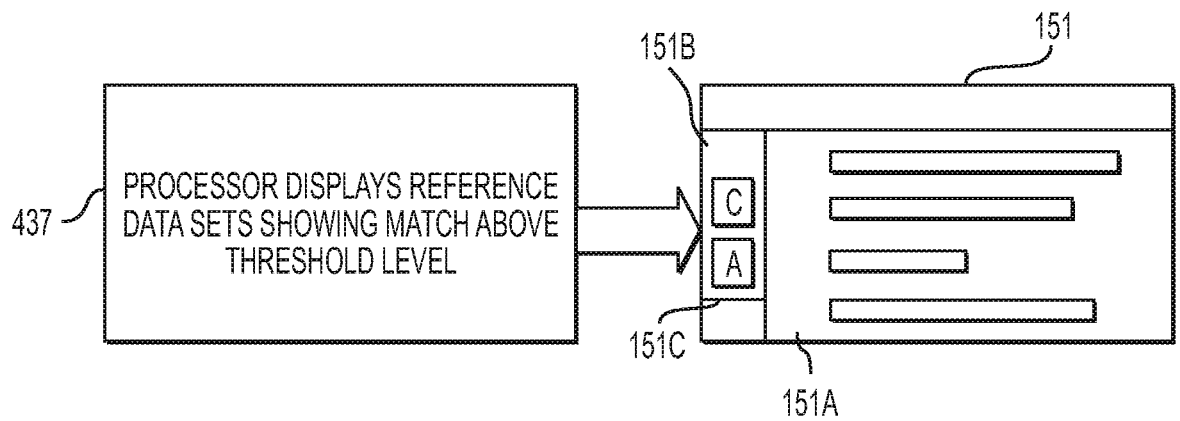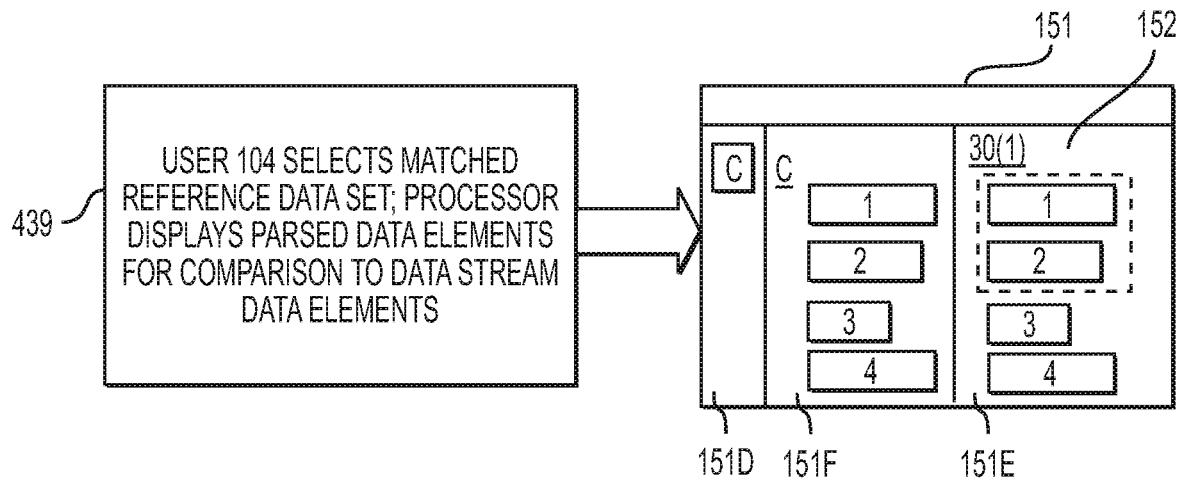
FIG. 4D
CONT. 1

CONT. 2

*CONT. 2*

CONT. 1

710

```
{
  "firstName": "John",
  "lastName": "Smith",
  "age": 42,
  "address": {
    "streetAddress": "20 Los Alamos St.",
    "city": "St. Augustine",
    "state": "FL",
    "postalCode": "92000"
  },
  "phoneNumber": [
    {
      "type": "home",
      "number": "904-555-1234"
    },
    {
      "type": "fax",
      "number": "904-555-4567"
    }
  ],
  "gender": {
    "type": "male"
  }
}
```

```
firstName: John
lastName: Smith
age: 42
address:
   street address: 20 Los Alamos St.
   city: St. Augustine
   state: FL
   postalCode: '92000'
phoneNumber:
- type: home
  number: 904-555-1234
- type: fax
  number: 904-555-4567
gender:
   type: male
```

```
<person>
   <firstName>John</firstName>
   <lastName>Smith</lastName>
   <age>42</age>
   <address>
      <streetAddress>20 Los Alamos St.</streetAddress>
      <city> St. Augustine</city>
      <state> FL</state>
      <postalCode>92000</postalCode>
   </address>
   <phoneNumber>
      <type>home</type>
      <number>904-555-1234</number>
   </phoneNumber>
   <phoneNumber>
      <type>fax</type>
      <number>904-555-4567</number>
   </phoneNumber>
   <gender>
      <type>male</type>
   </gender>
</person>
```

```
<person firstName="John" lastName="Smith" age="42">
   <address streetAddress="20 Los Alamos St" city="St. Augustine" state="FL" postalCode="92000"/>
   <phoneNumber type="home" number="904 555-1234"/>
   <phoneNumber type="fax" number="904 555-4567"/>
   <gender type="male"/>
</person>
```

FIG. 7D

| Record → Element/Sub Element | 710 | 720 | 730 | 740 |
|---|---|---|---|---|
| Unit 1 (NAME) | "firstName": "name", | firstName: name | <firstName>first_name</firstName> | |
| Unit 2 (NAME) | "lastName": "name", | lastName: name | <lastName>last_name</lastName> | |
| Unit 3 (AGE) | "age": XX, | age: XX | <age>XX</age> | |
| Unit 4 (Person) | ... | ... | ... | <person_> |

COMMON AGNOSTIC DATA EXCHANGE SYSTEMS AND METHODS

BACKGROUND

Modern information systems may generate, consume, transmit, process, and store large quantities of data related to system operation and performance or other matters. No standard format exists for the storage of these data, thereby making universal data interpretation and aggregation problematic. For example, analysis of these data by applications external to an originating information system frequently is difficult and time consuming.

SUMMARY

An embodiment of a common agnostic data exchange method between two network devices in a network, the two devices using different data record formats and transmission protocols includes invoking a proxy at each device, a first proxy receiving a first data record from a first device, the first data record having a first format, identifying the first data format by comparing a first pattern of the first data record to reference patterns of one or more reference data records, and determining a sufficient pattern match exists between the first pattern and the reference pattern. The method includes the first proxy translating the first data record into an inter-proxy data record having an inter-proxy format and transmitting the inter-proxy data record to a second proxy coupled to a second device. Finally, the method includes the second proxy translating the inter-proxy data record to a format of the second device.

An embodiment of a common agnostic data exchange method for exchanging data between two devices in a network, each device transmitting and receiving data records using different formats and transmission protocols includes invoking a proxy at each of the two devices, each proxy including a processor component; a first processor component of a first proxy receiving a first data stream from a first device, the first data stream comprising at least one first data record, the at least one first data record having a first format exhibiting a first pattern corresponding to first pattern information; the first processor component identifying the first format of the at least one first data record, comprising: comparing first pattern information of the at least one first data record to reference pattern information of one or more reference data records, and determining a sufficient data pattern match exists between the first pattern information and the reference pattern information; the first processor component generating an inter-proxy data record using a translator to translate the first format of the at least one first data record into a common, inter-proxy format; the first processor component transmitting the inter-proxy data record to a second proxy coupled to a second device, the second proxy comprising a second processor component; and the second processor component translating the inter-proxy format of the inter-proxy data record to a second format of a second data record at the second device. In an aspect of this embodiment, the first data record comprises one or more discrete first elements, each of the one or more discrete first elements having a first element format, the one or more discrete first elements comprising first data elements and first non-data elements, the first non-data elements comprising first synchronizing elements and first identification elements that cooperate to form the first data elements into the first data record; and wherein each reference data record comprises one or more discrete reference elements, each of the one or more discrete reference elements having a reference element format, the one or more discrete reference elements comprising reference data elements and reference non-data elements, the reference non-data elements comprising reference synchronizing elements and reference identification elements that cooperate to form the reference data elements into the reference data record. In an aspect of this embodiment, the first processor generates the inter-proxy format, comprising the first processor component: receiving reference data element format information and reference non-data element format information for a plurality of reference formats; comparing reference element format information for each of the one or more discrete reference elements to first element information for each of the one or more discrete first elements to identify common functions of the first elements and the reference elements; generating a common grammar encompassing the identified common functions; generating the inter-proxy format and a corresponding inter-proxy format specification from the common grammar; generating a translator between the inter-proxy format and each of the plurality of reference formats; and verifying translation between the inter-proxy format and each of the plurality of reference formats by applying the translator to a reference data record for each of the plurality of reference formats to generate the inter-proxy data record. In an aspect of this embodiment, the first elements and the reference elements are parsed, respectively, into smallest parsable units of the corresponding first data record and the reference data record, and wherein the first processor component generating the inter-proxy format specification comprises the first processor component applying a parsing tool to identify as the reference elements, the smallest parsable units of the reference data record, and applying an extraction tool to extract the reference elements from the reference data record. In an aspect of this embodiment, the first processor component generating a translator comprises the first processor component: generating an equivalence matrix between the inter-proxy data record format and the reference data record format comprising each row of the matrix including a reference element and a corresponding first element, and each row further including a translation rule to provide two-way translation between the reference element and the corresponding first element; and assembling the translation rule of each row of the matrix to generate the translator.

An embodiment of a method for agnostically exchanging data between two network devices, each device transmitting and receiving data records using different formats, each format comprising formats and transmission protocols includes invoking a separate proxy at each of the two network devices, each proxy including a processor component; a first processor component of a first proxy receiving a first data stream from a first network device, the first data stream comprising at least one first data record, the at least one first data record comprising one or more discrete data elements and one or more non-data elements, the first data record, the one or more discrete data elements, and the non-data elements having a first format; the first processor component invoking a format identification method, comprising: displaying in a user interface to a user, the data elements and non-data elements of the first data record and data elements and non-data elements of a first reference data record, the user interface providing a comparison between a first pattern of the first data record and reference patterns corresponding to one or more reference data records; providing suggestions in the user interface of best matches between the first pattern and one or more of the reference patterns; receiving from a user, a selection of a reference pattern matching the first pattern, the first processor component selecting a translator for translating the first data record; the first processor component generating an inter-proxy data record by translating the first format of the first data record into a common, inter-proxy data record format; the first processor component transmitting the inter-proxy data record to a second proxy coupled to a second network device, the second proxy comprising a second processor component; and the second processor component translating the common, inter-proxy data record format of the inter-proxy data record to a format used at the second network device. In an aspect of this embodiment, providing suggestions in the user interface of best matches between the first pattern and one or more of the reference patterns, comprises: providing in the user interface, an adjustable, sliding window positionable by the user; receiving a user instruction to position the sliding window to encompass a sub-set of first elements of the first data record; and highlighting reference elements when the sliding window encompasses first elements performing same functions as the reference elements.

An embodiment of a common agnostic data exchange system for exchanging data between two network devices in a network, each network device transmitting and receiving data records employing different s and transmission protocols includes a first proxy in communication with a first network device and a second proxy in communication with a second network device, the first proxy comprising: a first processor component, and a first non-transitory, computer-readable storage medium storing machine instructions that, when executed, cause the first processor component to: receive a first data stream from the first network device, the first data stream comprising at least one first data record having a first format; identify the first format of the at least one first data record, wherein the first processor component comprises: comparison means to compare first pattern information of the at least one first data record to reference pattern information of one or more reference data records, and determination means to determine a sufficient match exists between the first pattern and the reference pattern; generates an inter-proxy data record by invoking a first translator to translate the first format of the first data record into a common, inter-proxy format; transmits the inter-proxy data record to the second proxy, the second proxy comprising a second processor component and a second non-transitory, computer-readable storage medium storing machine instructions that, when executed, cause the second processor component to: receive the inter-proxy data record; invoke a translator to translate the inter-proxy format of the inter-proxy data record into a second format of a second data record; and transmit the second data record to the second network device. In an aspect of this embodiment wherein the first and second proxies comprise standalone computing platforms physically connected, respectively, to the first and second network devices. In an aspect of this embodiment, the first and second proxies comprise virtual machines instantiated on a central computing device coupled to the network.

An embodiment of a common agnostic data exchange method for exchanging data in a network between two network devices, each network device transmitting and receiving data records using different data formats and transmission protocols, includes invoking a proxy device at each of the two network devices, each proxy device including a processor component; a first processor component of a first proxy device receiving a first data stream from a first network device, the first data stream comprising at least one data record, the at least one data record comprising one or more elements, the one or more elements comprising data elements and non-data elements, the first data record and having a first format; the first processor component identifying the first format of the at least one data record, comprising: applying comparing means to compare first pattern information of the first data record to reference pattern information of one or more reference data records, applying determining means to determine a sufficient data pattern match exists between the first pattern information and the reference pattern information; and applying generating means for generating an inter-proxy data record format; the first processor component translating the first data record into an inter-proxy data record having the inter-proxy data record format; the first processor component transmitting the inter-proxy data record to a second proxy device coupled to a second network device, the second proxy device comprising a second processor component; the second processor component translating the common, inter-proxy data record into a second data record having a second format; and the second processor component transmitting the second data record to the second network device.

In a communications network comprising two or more communications devices, an embodiment of a configurable agnostic data exchange system for exchanging data between and among the two or more communications devices comprises: at least one proxy device coupled to each communications device, each of the at least one proxy device comprising: a processor, and a non-transitory, computer-readable storage medium comprising data exchange instructions that when executed by the processor, cause the processor to: generate an inter-proxy format and an inter-proxy format specification; identify differences between the inter-proxy format and a format of a native data record native to a communications device; generate a translator to translate between data records employing the inter-proxy format and native data records employing formats native to the communications devices; generate an inter-proxy data record by translating a native data record of a first communications device record using the translator; transmit the inter-proxy data record to a second proxy, wherein the second proxy translates the inter-proxy data record to a second native data record having a data record format native to the second communications device.

DESCRIPTION OF THE DRAWINGS

The detailed description refers to the following figures in which like numerals refer to like objects, and in which:

FIGS. 1A(1) and 1A(2) illustrate a conceptual architecture for implementation of a configurable agnostic data exchange system;

FIG. 1A(3) illustrates another conceptual architecture for implementation of a configurable agnostic data exchange system;

FIGS. 1B(1)-1B(4) illustrate example conceptual implementations of a configurable agnostic data exchange system;

FIGS. 1C(1)-1C(3) illustrate an example physical implementation of a configurable agnostic data exchange system proxy;

FIGS. 3A-3D(3) illustrate further example components of the proxy of FIG. 2A;

FIGS. 3E(1) and 3E(2) illustrate node discovery components of the proxy of FIG. 2A;

FIGS. 7A-7D illustrate example data elements having the same data but with different data formats;

FIG. 7E illustrates an example data element equivalence matrix that may be used to compare parsable units of the example data elements of FIGS. 7A-7D.

DETAILED DESCRIPTION

Figure 2A:
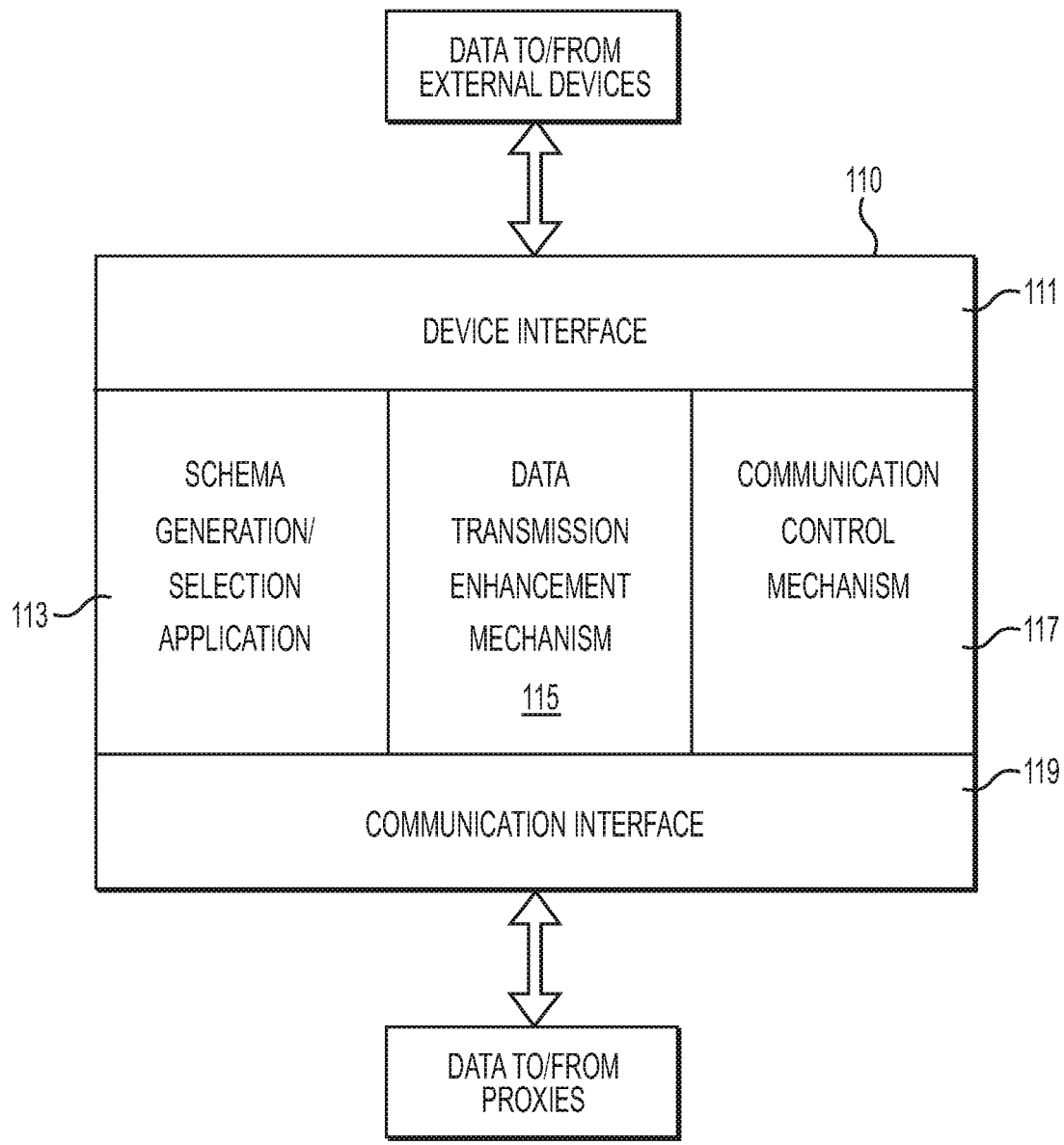
FIG. 2A illustrates an example component of a proxy used in the systems of FIGS. 1A-1B(4)

Organizations large and small, government and non-government, may employ multiple information processing and communication systems. Such systems may facilitate personnel management, product and service production and provision, infrastructure, organizational communications both internal and external to the organization, and other logistics and readiness functions. Each of these systems may be developed and provided by sources or vendors. As a result, even if all systems are compatible in terms of overall information flow, data consumed and produced by the systems may not be compatible directly (i.e., without some form of conversion). For example, some organizational infrastructures may use an overall system in which efficient data transmission and consumption requires individual system components being able to process multiple data formats and data transmission protocols.

To facilitate and improve data interoperability, disclosed herein is a configurable agnostic data exchange (CADE) systems, and corresponding methods, that provides a means for exchanging data between systems and system components, thereby simplifying system operation, expansion, and efficiency. An example CADE system provides bi-directional data exchange between other systems, subsystems, components, and devices that may use differing data formats and differing data transmission protocols. The CADE system minimizes or eliminates compatibility issues by providing an innovative, interactive data format determination coupled with a well-defined, extensible and configurable schematic notation that decodes and translates input data streams. In an aspect, the CADE system provides configurable and efficient data exchange between heterogeneous systems, subsystems, components, and devices through the use of proxies that operate to define a common, intermediate (i.e., inter-proxy) form of data being consumed.

In an embodiment, the CADE system executes to perform data transmission and related operations. The first operation generates a configurable, extensible data protocol and corresponding data format and data format specification. To execute this first operation, the CADE system includes means to generate the configurable, extensible data protocol; the protocol allows data translation and data transmission between or among two or more external system components where the external system components may employ differing data formats and differing data transmission protocols. In an aspect, the CADE system employs automated and/or semi-automated means to generate the configurable, extensible data protocol, which represents a common, intermediate data format and corresponding data format specification. The second operation includes data translation and data transmission between and among the external system components. In this second operation, given input data streams with multiple data formats and data transmission protocols, the CADE system employs means to parse, extract, decode and translate data streams and then to format the translated data streams into the common, intermediate form. In an embodiment, the CADE system includes a configurable set of software and/or hardware proxies, each of which employs a set of rule-based means to parse, extract, and decode input data streams and to translate and format the decoded data streams to support multiple data formats and transmission protocols. In an aspect, these means provide automated identification of the format of a data stream and automated parsing, formatting, and further processing of the data stream. In another aspect, these means provide a (human) user an opportunity to determine the format of a data stream and to translate the data into any desired format. With either the automated or semi-automated processes, the proxies allow the CADE system to completely define the common, intermediate (inter-proxy) form for data received from external systems interfaced by the proxies. In an embodiment, each of two or more external devices of the external system has at least one associated proxy. In an aspect, the associated proxy may be dedicated to a specific external device. These operations are disclosed in more detail herein, including with respect to FIG. 5.

Thus, the CADE system (1) executes automated and/or semi-automated tools to generate an inter-proxy data format and (2) executes automated and/or semi-automated protocol parser/extractor/translator tools that employ a protocol specification and an extraction specification to automatically identify an input data format, including a data stream's schema, grammar, and transmission protocol and translate the input data stream into a data stream having an intermediate, inter-proxy data format. The protocol specification may include a schema and corresponding grammar. Generally speaking, a schema is a formal description of a data format; for example, a data format expressed in extensible markup language (XML). A grammar may consist of a rule set that may be employed to describe the schema's structure. The CADE system may use the automated and/or semi-automated tools to generate a schema and associated grammar that define the inter-proxy data format. Each proxy in the CADE system may generate, store and modify variants of the schema and its grammar so as to be able to translate between the data format(s) of its respective external device and the common, inter-proxy data format. By employing a schema and an associated grammar, the CADE system specifies the inter-proxy data format that is used for data transmission between the CADE system's proxies (see, for example, FIG. 1A(1)). The CADE system's automated protocol parser/extractor/translator tools represent an improvement over manual or hand-coded protocol parsing, extracting, and translating mechanisms, which have at least two major weaknesses in comparison with the CADE system's automated protocol parsing, extracting, and translating processes. First, hand-coded protocol parsers are hard to reuse because they typically are tightly coupled to specific systems and deeply embedded into the system's working environments. Second, hand-coded protocol parsers tend to be error-prone and lack robustness. Writing an efficient and robust parser is a time-consuming and error-prone process and generally results in a limited-use protocol parser.

In another embodiment, the CADE system may provide an interactive, or semi-automated process for generating a schema that defines the inter-proxy data format. Since manual generation of a schema and grammar can require specialized training and can be tedious and error prone, this embodiment of the CADE system also is an improvement over hand-coded processes for generating schemas and grammars and may be utilized if automated processes are not available or desirable. To implement the semi-automated, interactive processes, the CADE system may include components that allow a human user to visualize the application of various syntaxes/formats, including partial specifications to derive the desired schema/grammar. This embodiment of the CADE system provides a "what-if" user interface that may be employed to create new inter-proxy schema/grammar specifications that in turn may be stored and retrieved as necessary.

In either the automated or semi-automated process noted above, the proxy architecture of the CADE system simplifies the specification and generation of the intermediate, common format used between proxies by eliminating the need to transform data to a preset schema; instead, the proxies allow a schema to be defined in its most efficient form. FIGS. 7A-7D illustrate example data records, each of which employs a different format, but each of which contains exactly the same data. Data records 710, 720, 730 represent data records that may be received at a proxy 110$i$ from an associated external device 10$i$. Data record 740 represents an inter-proxy data record formatted through operations of the CADE system according to the inter-proxy format. FIGS. 7A-7D are discussed in more detail herein.

In some implementations, the CADE system may consume and process data records of many different formats; however, these formats may share some similarities, such as one or more data frames containing one or more sub-frames. Both the frames and sub-frames may display similar format/extraction information. The CADE system may leverage these similarities to generate a short-hand notation containing the same information that ordinarily would be expressed in a grammar for the CADE system's common, internal (inter-proxy) format. Data verification rules also may be generated as part of the grammar specification. This grammar specification may allow the CADE system to execute in an automatic mode for some data processing and format identification, and a semi-automatic mode (i.e., with some human user feedback) for other data processing and format identification. In all cases (both the external device format and the common, inter-proxy format), the CADE system grammar specification may be expandable without requiring a redesign of the schema.

Thus, the CADE system may be used in many different network architectures. The CADE system may be implemented with different features, components, and capabilities. The CADE system components may be structured to support networks employing a client-server scheme, a peer-to-peer scheme, and/or a publish-subscribe scheme, or combinations of these and other schemes. The CADE system may operate in different use cases. The CADE system is described herein for a use case in which the schema/grammar and transmission protocols are known in advance and a use case in which one or more network devices employ an unknown, but knowable schema/grammar and transmission protocol.

FIGS. 1A(1)-1A(3) illustrate example CADE system implementations in a computer network. Although FIGS. 1A(1)-1A(3) show a CADE system implemented in a computer network, the CADE system is not limited to such implementations and may be implemented in any system that uses digital data. In FIG. 1A(1), CADE system 100 is shown implemented in network 1A. Network 1A includes multiple external devices 10$i$, with one external device 10$i$ at each of multiple network nodes 2. The external devices 10$i$ may be the identical, similar, or different network devices, computing devices, and/or communications devices. For example, the external devices 10$i$ may be computers, servers, routers, or switches. Each external device 10$i$ may send and receive data. For ease of description, and without limitation, the data transmitted generally will be referred to herein as a data stream. A data stream may be composed of data records, which in turn may be composed of data packets. A data packet may be composed of data frames, which in turn may be composed of sub-frames. The data streams, records, packets, frames, and sub-frames will follow a specific format or protocol and will be transmitted according to a specific data transmission protocol. The CADE system, as noted, generates a common, intermediate format that facilitates data transmission between and among external devices 10$i$ of network 1A. The external devices 10$i$ thus represent any external interfaces (including clouds) with which the CADE system 100 may interface and interact. Each device 10$i$ may have associated with it, one or more proxies 110$i$, which are components of the CADE system 100. Other components of the CADE system 100 include a communications medium 120 and a user interface mechanism 150 (see FIG. 3A), which may be a component of computing platform 105 and/or a proxy 110$i$. The communication medium 120 also may be a component of the network 1A and is described in more detail later. The user interface mechanism 150 may be employed by aspects of the CADE system 100, and also is described in more detail herein. Although FIG. 1A(1) shows the proxies 110$i$ separated from their associated external devices, 10$i$, in other networks or network configurations, the proxies 110$i$, while still components of the CADE system 100, may be located physically on or with the devices 10$i$, on separate, individual computers, and/or on a single computing platform (such as computing platform 105) as virtual machines or separate processes. Thus, the CADE system 100 may be viewed conceptually as a cloud that interfaces with multiple external devices 10$i$ and in an aspect streams data between any pair of external devices 10$i$. In another aspect, some or all proxies communicate data through use of intermediary 107 (see FIG. 1A(3)). In an embodiment, data enters and exits the CADE system 100 in the native formats of the interfaced external devices 10$i$ with the data transmitted between proxies 110$i$ being of the transformed, common, intermediate format (i.e., the inter-proxy format). As an example, and referring to FIGS. 7A-7D and FIG. 1A(3), proxy 110A receives data record 710 from external device 10A and transforms data record 710 into data record 740 having the inter-proxy format. Proxy 710 then transmits data record 740 to proxy 110B and proxy 110D. Proxy 110B transforms data record 740 into data record 720 and provides data record 720 to external device 10B. Proxy 110D transforms data record 740 to data record 730 and provides data record 730 to external device 10D. Note that one aspect of the data transformation and data transmission processes involves transforming non-data elements that may be appended to a data record. FIG. 4A, for example, illustrates certain non-data elements that would be appended to a data record as part of the data transmission process. These non-data elements are identified and transformed along with the data elements illustrated in data records 710-740. Thus, the proxies 110$i$ allow the CADE system 100 to employ an optimal definition of the common, intermediate format (i.e., between proxies 110*i*) while ultimately being able to transmit all data consumed from the external devices 10*i*. This structure of the CADE system 100 also allows the addition of proxies 110*i* in an incremental fashion as the network 1A adds new external devices 10*i*. The CADE system 100 also allows multiple proxies 110*i* to be employed for a single external device 10*i* to increase data handling capacity, redundancy, and quality of service provisions.

FIGS. 1B(1)-1B(4) illustrate example architectures for a proxy employed by the CADE system 100. In FIG. 1B(1), proxy 110(1) is in the form of a standalone computing platform that may have a footprint similar to that of a standard credit card, and that may be plugged into a data port 11 of an external device 10(1). In FIG. 1B(2), proxy 110(2) is implemented as a virtual machine on computing platform 105, which in turn is a component of the CADE system 100, and is coupled to external device 10(2). In FIG. 1B(3), proxy 110(3) is implemented as a software plugin to standalone computer platform 12, which in turn is coupled to external device 10(3). In FIG. 1B(4), proxy 110(4) is implemented as a system on a chip (SoC) configuration in which a processor P1 and other components C1 and C2 are installed on board B1 that may be inserted into an external device 10(4). Regardless of its physical form, a transmitting proxy 110*i* may include the structure needed to decode data streams of uncertain format from an external device 10*i* and translate the data streams into a common, inter-proxy format and a receiving proxy 110*i* may include the structure to translate the inter-proxy data record into another format used by an external device 10*i*.

FIGS. 1C(1)-1C(3) illustrate an example schematic and an example physical implementation of the proxy 110(1) shown in FIG. 1B(1). FIG. 1C(1) is a schematic illustrating example components of the proxy 110(1). Proxy 110(1) includes a central processor 141, voltage regulator 141A, system controller 144, input/output (I/O) devices 146, and memory components 143. The memory components 143 include EBI 143A connection to RAM, SRAM 143B, Flash memory 143C, and memory controller 141D. Other memory devices may be used. In an aspect, the proxy 110(1) may store limited data and instructions 149 on its corresponding external device 10(1) or on non-transitory computer-readable data store 145, as shown. These proxy components are connected by bus 142. Of particular note, the proxy structure shown in FIG. 1C(1) employs SRAM 143B, which allows faster operations than would be possible with certain other memory types. Use of SRAM 143B is made possible by the distributed nature of the proxy architecture shown, for example, in FIG. 1A(1). That is, each proxy 110*i* is subjected to a minimal processing load, which allows use of faster memory located closer to the central processor 141 than would be possible with a centralized proxy architecture. Although FIG. 1C(1) shows a schematic for a specific hardware implementation of proxies, other hardware implementations, as well as software implementations, may provide the same benefits. FIGS. 1C(2) and 1C(3) show an example physical implementation of the proxy 110(1).

Depending on its configuration and control features, the CADE system 100 may operate according to different communications schemes, one of which is a client-server scheme and another of which is a publish-subscribe scheme. The CADE system 100 also may operate using other communications schemes or a combination of communications schemes. As described herein, the publish-subscribe scheme may increase processing speed and reduce memory use by the proxies 110*i*. Referring to FIG. 1A(2), in an example client-server scheme, each transmitting (or server) external device 10Se and proxy 110Se pair transmits data to a specific receiving (or client) proxy 110CI and external device 10CI pair (or pairs). In this client-server scheme, an external device/proxy pair may be a "server" or transmitter for some data transmissions and a "client" or receiver for other data transmissions. In this scheme, transmitting proxy T 110Se may use a specific network address for each receiving proxy R 110CI. In such a traditional tightly coupled client-server scheme, the client external device 10CI cannot post data requests to the server external device 10Se unless the server process is running, nor can the server external device 10Se transmit data unless the client external device 10CI is running. As an alternative to such direct client-server addressing, a transmitting proxy T 110Se may use indirect client-server processes such as broadcasting or multicasting data to some or all receiving proxies R 110CI.

FIG. 1A(3) illustrates CADE system 100' in which an example publish-subscribe scheme may be implemented. In CADE system 100', proxies 110A and 110B are physically located with their external devices 10A and 10B, respectively, while proxy 110D is a virtual machine resident on computer platform 105 and is accessed by external device 10D. Proxy 110G is shown unused by any external device 10*i*. In the scheme of FIG. 1A(3), each proxy 110*i* may be either a data publisher or a data subscriber, depending on the operational context of any given data transmission. The proxies 110*i* may execute so that a published data description will match a subscriber's requested data description, thereby ensuring only desired data are transmitted between proxies 110*i*. Proxy 110A is in association and communication with external device 10A. The external device 10A employs a known schema/grammar; the proxy 110A consumes data requested by other external devices 10*i* from the external device 10A when external device 10A operates as a publisher and distributes the requested data to subscribers of the proxy 110A (i.e. to other proxies 110*i*). In an aspect of the publish-subscribe scheme, each proxy 110*i* controls "publication" and "subscription" using publish-subscribe control 117 (see FIG. 2A). As a subscriber, proxy 110B consumes data from the publishing proxy 110A using the common, inter-proxy format and then reformats the consumed data according to the schema/grammar appropriate for its associated external device 10B. The subscribing proxy 110B then presents the data to its associated device 10B in the appropriate format. In another aspect, the proxies 110*i* interact with the computing platform 105, or other component of the CADE system 100', to publish data and to subscribe to data. For example, external device 10A/proxy 110A pair may publish to intermediary 107 and proxy 110D may query intermediary 107 to obtain the data originally transmitted by external device 10A. This aspect of the publish-subscribe scheme is disclosed further herein, including with respect to FIGS. 3D(1) and 3D(2).

In either FIG. 1A(1) or 1A(3), as the proxy 110A (for example) consumes data from its associated external device 10A, the data are reformatted and sent to other proxies 110*i* in an efficient manner given the common, inter-proxy format (including transmission protocols) established among the proxies 110*i*. If the communications medium 120 is a satellite communications medium, the proxy 110A might first compress the data before transmission: if large data volumes are involved, the proxy 110A may employ some form of caching and queuing. As shown in FIG. 1A(1), if necessary or desired, an external device 10*i*, such as external device 10E may employ multiple proxies 110E and 110F to increase effective bandwidth for external device 10E. In an aspect, as described in more detail herein, additional proxies 110*i* may be provided for a specific external device 10*i* dynamically, for example, on an as needed or "on-demand" basis.

Thus, in an example, an external device 10*i*, acting as either a client (in a client-server scheme) or a subscriber (in a publish-subscribe scheme), requests data in its appropriate schema/grammar, and according to a specific transmission protocol, and its associated proxy 110*i* translates the request into the common, inter-proxy format and transmission protocol and passes the translated request to a publisher/server proxy 110*i*. A reverse process occurs at the publisher/server proxy 110*i*/device 10*i*. In this first use case, the CADE systems 100 and 100' employ proxies 110*i* that have identified and therefore "know" the schema/grammar and transmission protocol of their respective external devices 10*i*, such that data translation in the proxy 110*i* may be fully automated. Thus, the process of this example first use case works well because the schema/grammar of each device 10*i*, and the appropriate transmission protocols are known to components of the CADE systems 100 and 100'. However, the schema/grammar and/or transmission protocol need not be known in advance for the CADE systems 100 and 100' to perform their data translation functions.

An example second use case involves one or more external devices 10*i* for which the CADE system 100 is not provided with an advance identification of the appropriate device schema/grammar and/or communication protocol. To account for this unidentified schema/grammar situation, each proxy 110*i* may be provided with multiple data schemas/grammars (and may be implemented on a platform that offers multiple physical interfaces) such that the CADE system 100 allows streaming data between any devices 10*i*, including devices 10*i* with unidentified schemas/grammars. To select which schemas/grammars and protocols to employ for a given external device 10*i*, the CADE system 100 may execute the user interface mechanism 150 (see FIG. 3A). The user interface mechanism 150 may execute in one or more of three identification modes, namely automatic, semi-automatic, and manual identification modes. As disclosed herein, including with respect to FIGS. 2A-3E, some of these modes may involve a degree of human interaction and/or control.

FIG. 2A shows software components of an example proxy 110. In FIG. 2A, proxy 110 includes external device interface 111, schema generation/selection application 113, data transmission enhancement mechanism 115, communications (e.g., publish-subscribe; client-server) control 117, and common communications interface 119. The external device interface 111 communicates directly with its proxy's associated external device 10. The external device interface 111 may include one or more individual device interfaces, each interface with appropriate protocol support, depending how many different external device types the proxy 110 is intended to support. In an aspect, a proxy's external device interface 111 may be updated as a configuration of the networks 1A or 1B change to include additional external device types or because of updates to existing external devices 10*i* within the networks 1A or 1B. The common communications interface 119 is selected based on a particular installation of the CADE system 100. In an aspect, both the external device interface 111 and the common communications interface 119 offer at least a same level of security as the most secure external device 10*i* being interfaced. The schema generation/selection application 113, among other components, includes aspects of the user interface mechanism 150 (see FIG. 3A), and may be employed, in conjunction with a display device (not shown in FIG. 2A) to provide a visual display, or user interface 151, that enables human participation, as required, in automatic, semi-automatic, and manual discovery of data schemas and grammars, and communications protocols. The user interface 151 is disclosed in more detail herein, including with respect to FIGS. 3A and 8A-8C. The data transmission enhancement mechanism 115 may provide enhancements such as data compression and data caching. These and other aspects of the mechanism 115 are disclosed in more detail herein, including with respect to FIG. 3C. The communications control 117, among other functions, allows new external devices 10*i* to connect, through an associated proxy 110*i*, to other elements of the CADE system 100. The communications control 117 is disclosed in more detail herein, including with respect to FIG. 3D(1)-3E(2).

Figure 2B:
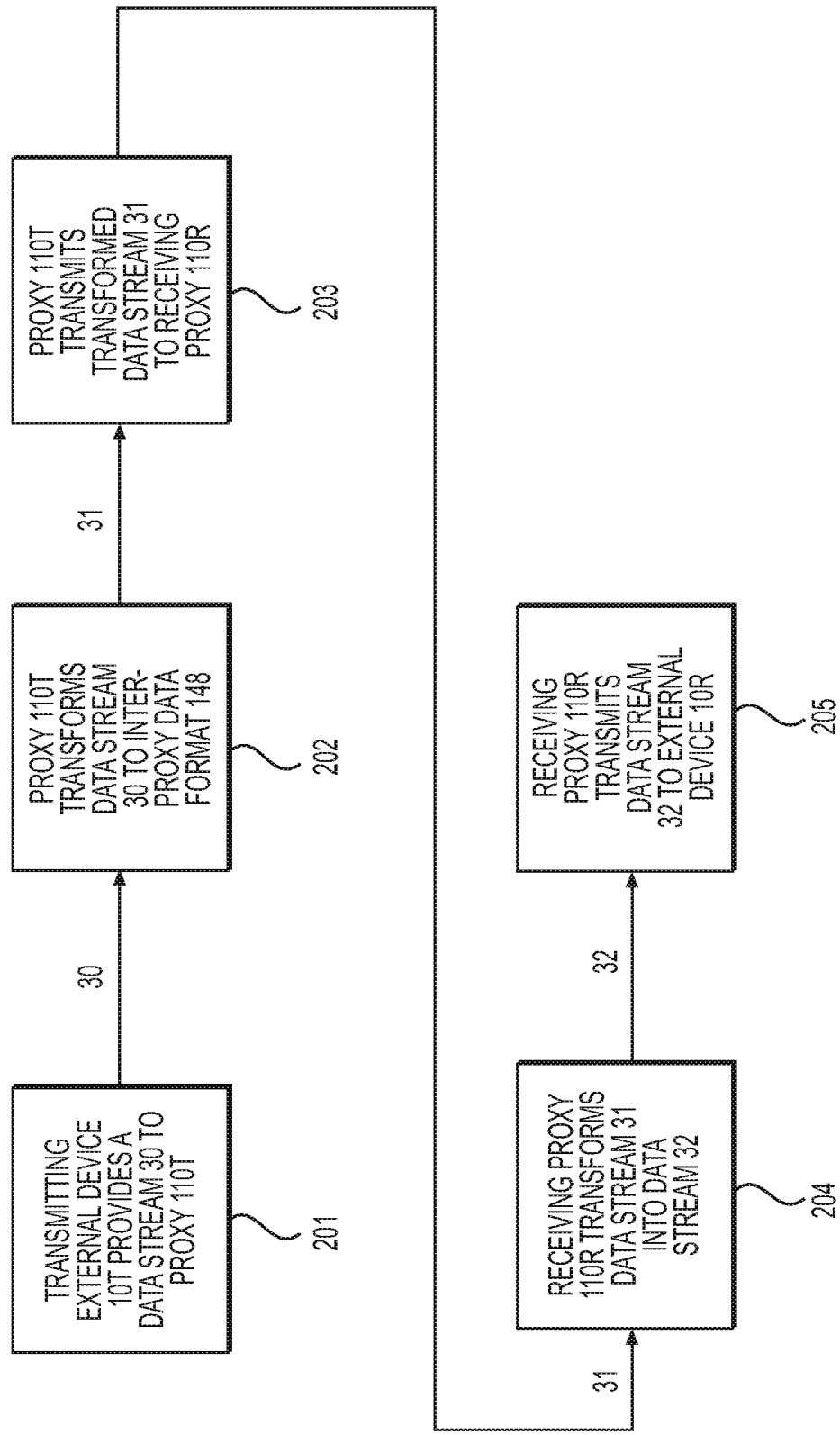
FIG. 2B is a conceptual illustration of a data processing operation implemented by the example component of FIG. 2A.

FIG. 2B is a conceptual illustration of a data transmission operation implemented by the example proxy 110 of FIG. 2A. In FIG. 2B, data transmission operation 200 begins when transmitting external device 10T provides, 201, a data stream 30 to its associated proxy 110T. The data stream 30 may be composed of data records, data packets, data frames, and data sub-frames, for example. In 202, components of the proxy 110T attempt to execute an automated process to transform the data stream 30 into a common, inter-proxy format. In 203, the proxy 110T transmits inter-proxy data stream 31 to a receiving proxy 110R. In 204, the receiving proxy 110R transforms the inter-proxy data stream 31 into output data stream 32 having a format used by its associated external device 10R. In 205, the proxy 110R transmits, and the external device 10R receives, output data stream 32.

Figure 3A:
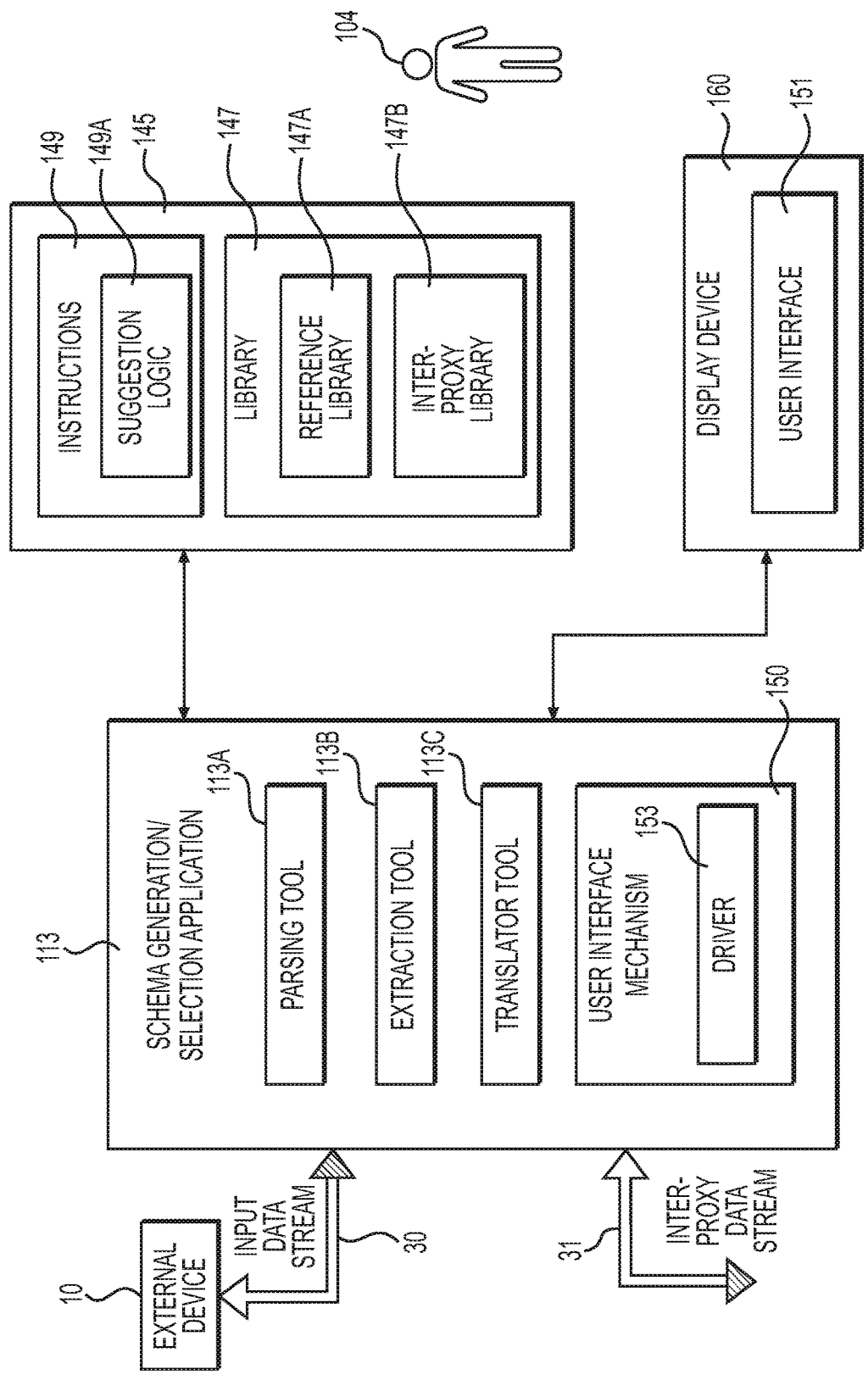
Figure 4A:
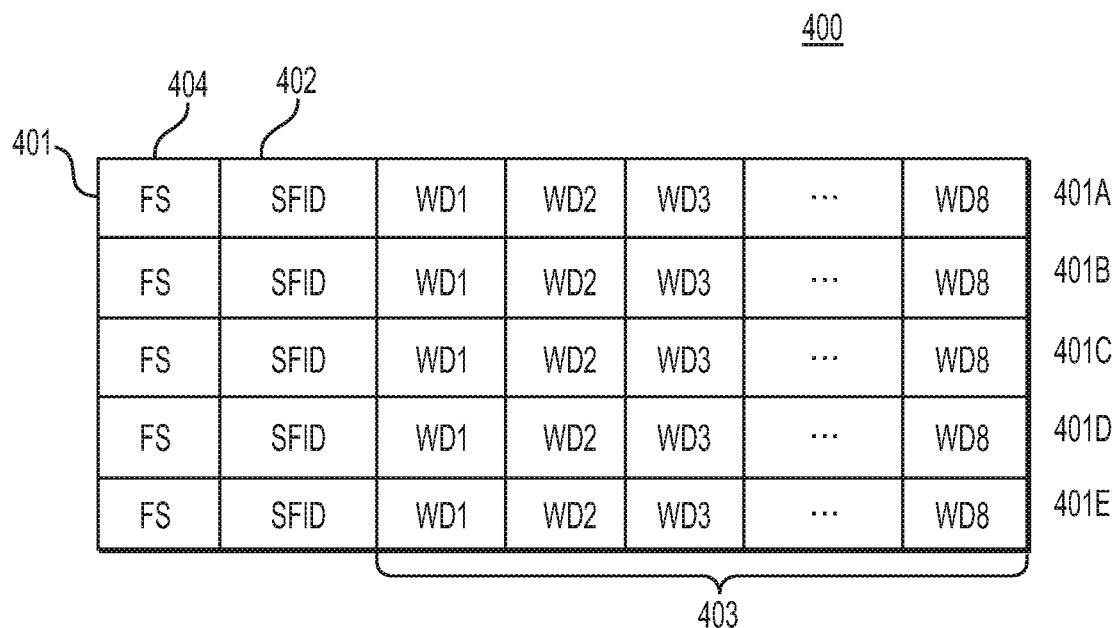
FIG. 4A illustrates a simplified representation of an example data frame processed by the systems and components of FIGS. 1A(1)-1B(4)

FIG. 3A illustrates an example schema generation/selection application 113 of proxy 110 of FIG. 2A, and related user interface 151, which is shown displayed on display device 160. The schema generation/selection application 113 includes or accesses structural components that provide distinct but related functions. A first function is to process an incoming data stream 30 to identify the protocols used by data stream 30, including the data schema and transmission protocols. In an aspect, the application 113 may include components that receive a specific identification, such as a network address, associated with the external device 10*i* providing the incoming data stream 30. The application 113 then may use the network address to look up the data schema and transmission protocols. In another aspect, the source of the data stream 30 may not be explicitly identified. For this aspect, to satisfy the first function, components of the application 113 may execute to parse, extract, and identify elements of the data stream 30. A second function involves generating an inter-proxy translator (if not already generated by or existing at proxy 110*i*) that may be used to produce an inter-proxy data record based on the protocols of the incoming data stream 30, and that subsequently may be used to translate between protocols of the incoming data stream 30 and the inter-proxy format. This second function is described in more detail herein. A third function involves, at the proxy level (i.e., at proxy 110), applying the inter-proxy translator to generate intermediate, or inter-proxy data stream 31 having the inter-proxy format. The application 113 also provides for a reverse translation process in which the inter-proxy translator translates between the inter-proxy format and the protocols applicable to a related external device 10*i*. In FIG. 3A, the application 113 includes parser tool 113A, extractor tool 113B, and translator tool 113C. These tools are described in more detail herein. The application 113 also includes user interface mechanism 150, also described in more detail herein.

Referring to FIGS. 1C(1) and 3A, central processor 141 in cooperation with memory 143 and non-transitory, computer-readable data store 145, which are connected by bus 142, executes components of the application 113. The data store 145 in turn includes library 147. The library 147 stores two data record libraries 147A and 147B and instructions 149.

Figure 3B:
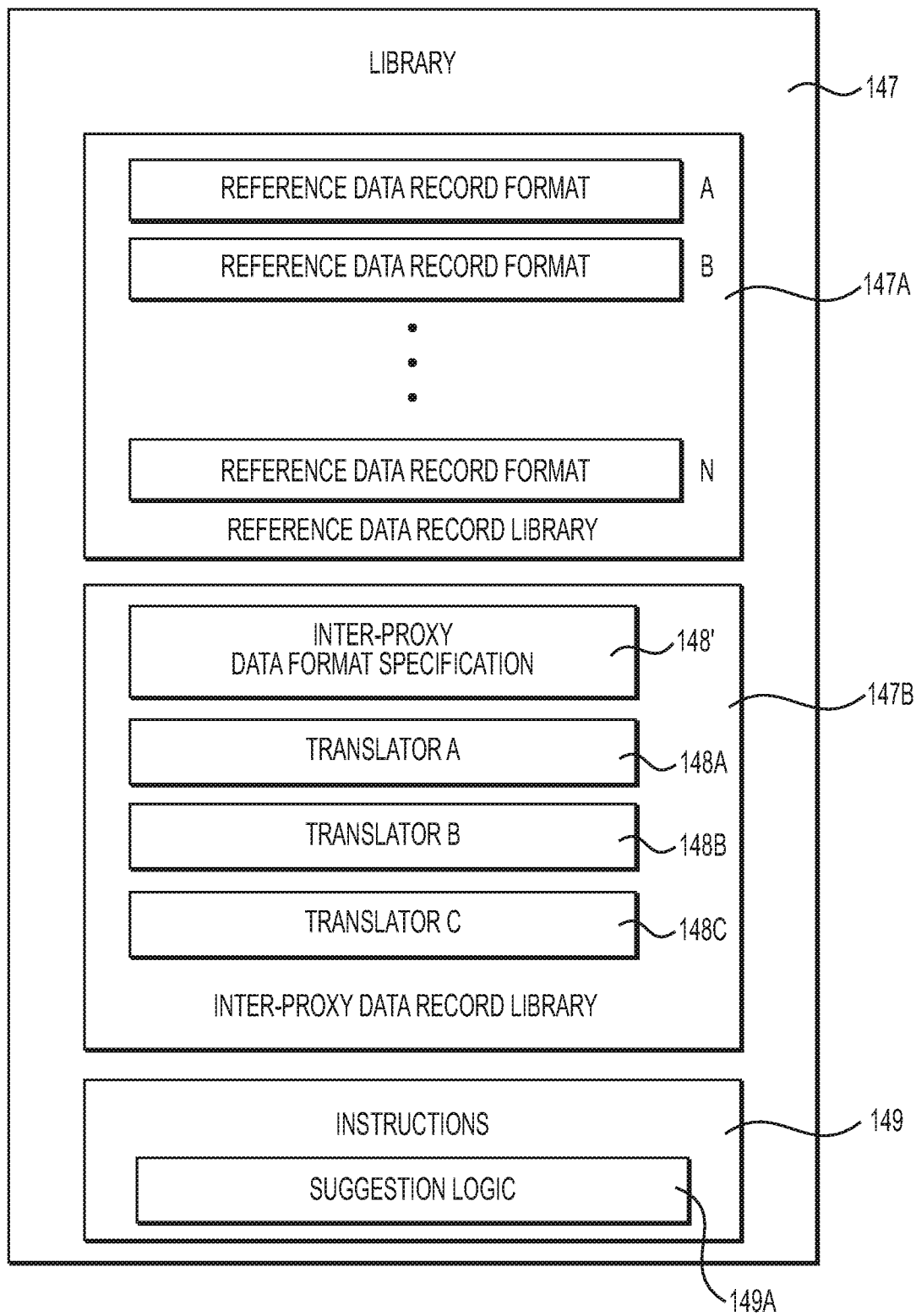

Referring to FIGS. 1C(1), 3A, and 3B, the central processor 141 may execute the application 113, in part, to generate a common inter-proxy format from information contained in reference data record library 147A. To complete this second function noted above, components of the application 113 include structural components derived from one or more specific grammars/data protocols. The central processor 141 begins the derivation process by comparing as many grammars as possible to find common, approximate, context free elements. Reference data record library 147A may store multiple, existing formats and transmission protocols (reference data record formats A-N) that may be employed by external devices 10i. Since the reference data record library 147A serves as a basis for generating an intermediate format (schema/grammar and transmission protocol—that is, common, inter-proxy format provided in inter-proxy data format specification 148'), the reference data record formats A-N may encompass a broad set of formats and protocols such that different characteristics may be included in the common, inter-proxy format, which then is stored in inter-proxy data record library 147B. In an aspect, to generate the inter-proxy format, the approximate, context free elements from the reference data protocols A-N are combined to provide an extensible, context free grammar (ECFG). The ECFG is tested according to known data transmission protocols, and the ECFG is adjusted until a defined grammar is produced. The defined grammar provides a structure of a defined schema. The defined grammar provides a parsing specification and an extraction specification. The parsing tool 113A and the extractor tool 113G use the two specifications to generate a parser and an extractor that may be applied to incoming data stream 30 to extract relevant data elements and non-data elements. A translator (e.g., one of translators 148A, 148B, and 148C) generated by translator tool 113C, is applied to the extracted elements to translate data records of the external device-provided data stream 30 into the common, inter-proxy format, which is stored in structural form in inter-proxy data record library 147B as inter-proxy data format specification 148'. Of note, a proxy 110i may generate and store one or more translators, depending on the proxy's associated external device 10i. As can be seen in FIG. 3B, the inter-proxy data record library 147B stores translators 148A, 148B, and 148C, which are generated by each proxy 110i.

Thus, the instructions 149 allow the central processor 141 to characterize the existing data record formats as part of an overall strategy for developing appropriate schemas for both "new, unknown" data inputs as well as a defined schema/grammar (the common, inter-proxy format).

In an embodiment, the application 113 takes advantage of the fact that computer networks and other data systems, when transmitting a data stream composed of data packets, data frames, and data sub-frames, for example, employ a method called frame synchronization to find valid data in a transmission that consists of data frames. The frame synchronization method may be based on identifying a synchronization word (syncword), sync character, sync sequence, or preamble to indicate the end of a sequence of header information and the start of data, and the data transmitting entity may insert a fixed, distinctive bit pattern (e.g., a sequence of bits—a syncword—that is distinguishable from data bits or data words) at the start of each data frame to mark the start of valid data. The receiving entity then searches for the fixed pattern in each data frame and achieves frame synchronization when a correlation between the input data and the fixed pattern is high. Components of the application 113 may use these and other bit patterns to identify the data and transmission protocols of incoming data stream 30.

FIG. 4A illustrates a simplified representation of frame synchronization and data words in a data frame 400 composed of multiple sub-frames 401. The words are shown, for simplicity purposes, as adjacent blocks; however, the actual data stream would, of course, be expressed in binary form (0s and 1s). Each sub-frame 401 includes a sub-frame identification (SFID) word 402, frame synchronization (FS) word 404, and data words WD1-WD8. Different formats and transmission protocols may use different frame synchronization techniques and formats. However, transmitting and receiving entities often know in advance what the format and transmission protocols are, simplifying the process of identifying the frame synchronization bits, for example. As a more specific example, in some data streams, the frame synchronization pattern is a known binary pattern that repeats at regular intervals within the data stream. A receiving frame synchronizer recognizes this pattern and aligns the data into sub-frames. The frame synchronization pattern may be followed by a counter (sub-frame ID) that indicates which sub-frame in the series is being transmitted. The receiving entity uses this information to assemble a data frame from the received sub-frames. The CADE system 100 may leverage frame synchronization bit patterns, as well as other bit patterns, in an unknown data stream to identify, automatically and without human intervention, and with a high degree of confidence, the format and transmission protocols of received data by iteratively looking for specific bit patterns. This bit pattern matching process employed in the CADE system 100 is not limited to frame synchronization bits, since data streams include other elements that may exhibit a specific pattern. In an aspect, the pattern matching may be based on a library of reference patterns, such as the reference data record library 147A (see FIGS. 3A and 3B). Finally, in an embodiment, the determination of a match condition does not depend on an exact match existing between the format of an incoming data record and an existing, known data record format. In this embodiment, a match condition signifies that, with a sufficient degree of confidence, a translator may be written automatically by operation of the CADE system 100, where the translator translates the incoming data record to an inter-proxy data record having the inter-proxy format. Once the translator is written, its operation may be verified by translating the incoming data record to an inter-proxy data record. In another embodiment, a matching condition signifies that an existing translator may be used to translate the incoming data record into an inter-proxy data record. In addition, as disclosed herein, the CADE system 100 may operate in automatic, semi-automatic, and manual modes, and the specific data bit matching technique may differ depending on the mode.

Returning to FIG. 3A, the parser tool 113A identifies a protocol specification for the incoming data stream 30. The protocol specification gives a grammar for parsing the data stream 30 into a number of elements. Extractor tool 113B uses the protocol specification and corresponding grammar and an extraction specification to extract the parsed elements. The extraction specification indicates what elements need to be extracted. Having a separate extraction specification allows the protocol specification to be reused in different applications that need different elements to be extracted. Both specifications are generated using the extensible context free grammar (ECFG), which may augment rules for a baseline, or original-version ECFG as input data protocols change, or new data protocols are developed. The augmentations also may include actions that increase expressiveness of the ECFG, but still allow the ECFG to be automatically simplified and optimized.

As noted herein, data stream 30 may be composed of a number of discrete, related data elements and non-data elements. The data elements arrive at proxy 110 incrementally. There are two ways to process these elements: incrementally, which means processing each data element as it arrives, or buffering, which means temporarily storing a number of data elements until a certain amount of data stream 30 is collected. Incremental processing may be preferable because buffering may require large amounts of dynamically-allocated memory.

Referring to FIGS. 1A(1), 1C(1), 3A, 3B, 4A, and 7A-7D, components of the CADE system 100 operate to translate between data records 710, 720, and 730 of FIGS. 7A-7C, respectively, on the one hand, and data record 740 of FIG. 7D on the other hand. Data in the data records 710-740 may, for transmission, be encoded in data words WD1-WD8. In addition, frame synchronization words 404 and sub-frame identification words 402 may be appended to the data words WD1-WD8. As can be seen in the data records 710-740, the data record 740 is formatted in a manner that can be translated into data records 710-730 by translators 148A-148C, respectively.

Referring to FIG. 3A, user interface mechanism 150, which includes a user interface driver 153, cooperates with other components of a platform on which the CADE system 100 is installed to provide a user interface 151. The user interface 151 may be employed and understood by a human user; i.e., user 104. In an embodiment, the user interface 151 may be displayed on display device 160 coupled to a computing platform on which proxies 110*i* are instantiated as virtual machines. In embodiments in which a proxy 110*i* is installed as a physical component on the external devices 10*i*, the user interface 151 may be displayed on a display device native to the external device 10*i*. In these and other embodiments, the user interface 151 may display how the external devices 10*i* and the proxies 110*i* interact during transmission and reception of data. As noted herein, structural components of, or available to, the application 113 enable distinct but related functions. To achieve these functions, the application 113 and its components and accessible components execute in one or more operations. A first operation, as needed, provides automated or semi-automated identification of an unknown data stream format, and automated or semi-automated generation of a translator that formats data streams 30 received by proxy 110 from external device 10 into the common, inter-proxy format. Referring to FIGS. 7A-7E, an embodiment of an automated translator generation process may begin when the application 113 executes to parse reference data records into the smallest possible units of a reference data record's elements. For example, a sub-frame may be parsed into sync words and data words. The application 113 saves information related to the thus parsed units in equivalency matrix 750. The application 113 then processes the matrix 750 to find elements and units that perform the same functions across the reference data record formats. As can be seen in FIG. 7E, the equivalency matrix 750 is composed of columns 750C and rows 750R. Each of the data records 710-730 is represented in a column 750C. In addition, inter-proxy data element 740 also is represented. Each matrix row 750R represents an element, sub-element, or smaller parsable unit such as shown in matrix row 750R(1). Thus, the example matrix 750 of FIG. 7E provides a means for comparing possibly equivalent data record components to different record components to determine if it is possible to generate a common, agnostic data record format that may be used as the inter-proxy data record format. In an aspect, the matrix 750 may be displayed to the user 104. In this aspect, the application 113 may suggest translation rules to the user 104. In another aspect, the application 113 automatically may derive translation rules from the matrix. In yet another aspect, the translation rules may be displayed in the matrix 750 (not shown in FIG. 7E). The translation rules, whether interactively derived by the user 104 or automatically derived by the application 113, may be assembled by translator tool 113C to generate a translator that operates between the inter-proxy data record and one of the reference data records. Of note, each reference data record may require a unique translator. The application 113 also performs a second operation, after the translator is generated and saved, to transform incoming data stream 30 into inter-proxy data stream 31 having the common, inter-proxy format. Thus, the application 113 performs two operations, either of which may be automated or semi-automated, to generate a translator (first operation) and then apply the translator (second operation). Aspects of the first and second operations also may be executed manually by a human user. Another example of possible translation follows: JavaScript Object Notation (JSON) is an open standard file format that uses human-readable text to transmit data objects consisting of attribute-value pairs and array data types and is a format used as a replacement for XML. JSON is a derivation of JavaScript. JSON filenames use the extension .json. The undefined type is not included in the JSON standard, and null may be used instead. In fact, the JSON standard specifies that a sparse array such as var v=[0]; v[3]=3; behaves in JavaScript as if it were var vx=[0, undefined, undefined, 3]; with the undefined entries being only implicit rather than explicit, translating to JSON as if it were var vx=[0, null, null, 3]; and with explicit null fillers for the undefined entries. The application 113 may use rules derived from these and other data record format differences to generate a translator.

Figure 5:
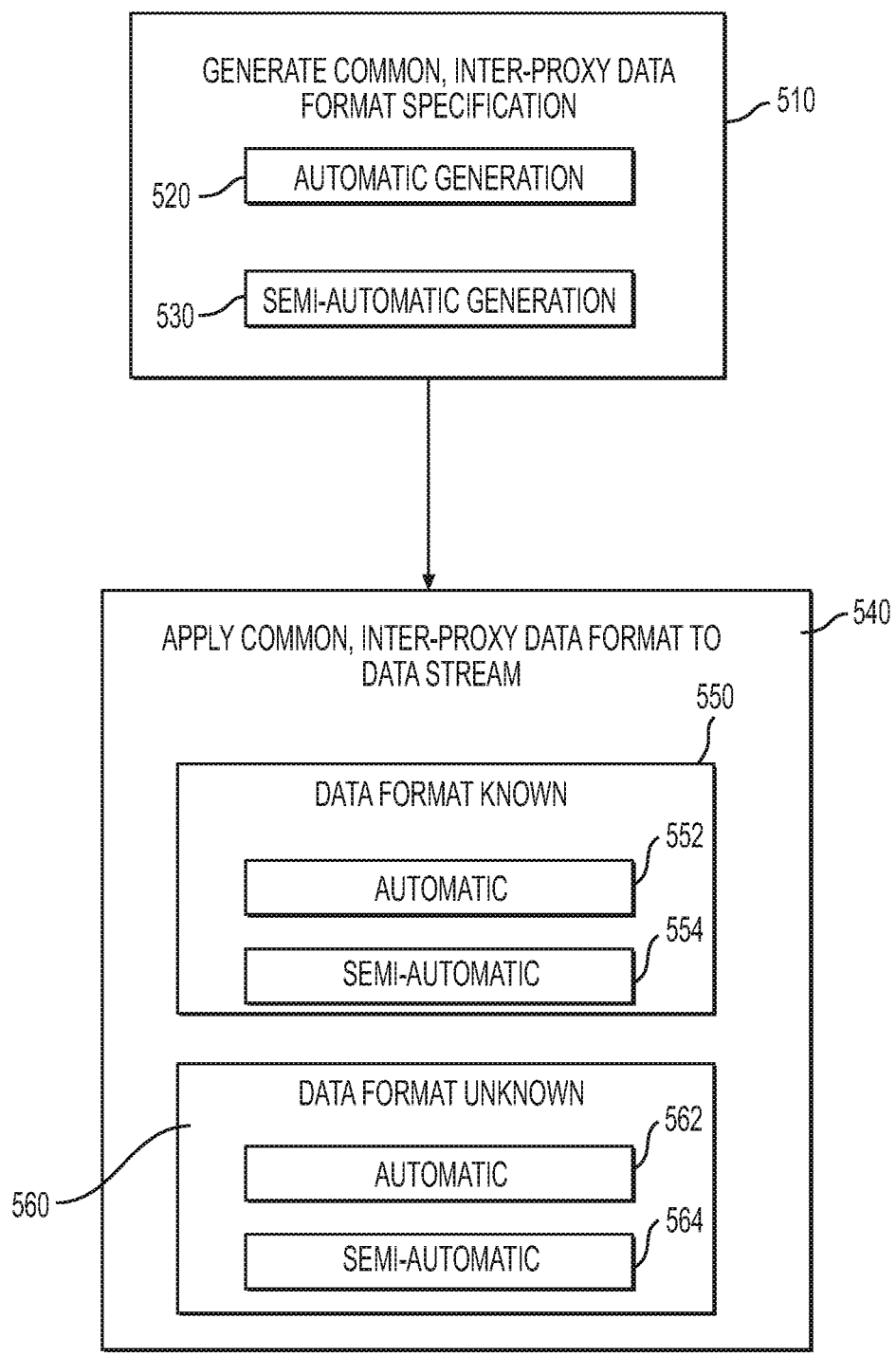
FIG. 5 illustrates example processes of the system and system components of FIGS. 1A(1)-3D(3)

FIG. 5 illustrates, pictorially, these first and second operations that may be executed through employment of the CADE system 100. Block 510 illustrates an operation in which components of the CADE system 100 generate inter-proxy data format specification 148', and ultimately one or more translators 148A-C. Block 520 illustrates automatic generation of the inter-proxy data format specification 148'. In one aspect of block 520, the schema generation/selection application 113 surveys a large number of existing format specifications to identify identical and or similar elements, code segments, or code modules, where identity and similarity are based on the function, instructions, and form of the data elements. For each identical or similar element, the application 113 saves the elements with a link to a generic instruction that represents approximately the similar element. The operation of block 520 continues until a full generic instruction set is assembled, if possible. The generic instruction set is then compiled to generate a generic grammar and corresponding schema. The generic grammar and corresponding schema then are tested against a number of existing formats to verify results identical to, or sufficiently similar to the existing formats are achieved with the generic instruction set. If satisfactory results cannot be achieved with the automatic operation, the semi-automatic operation of block 530 may be employed. The semi-automatic operation may employ the user interface 151 to suggest a number or list of generic code segments in terms of function and/or structure that may be similar to existing code segments, and user 104 selects from generic code segment list to assemble, or to complete assembly begun with the automatic operation of block 520 so that a common, inter-proxy data format specification 148' is produced, tested, and saved. The first operation then may provide a notification or prompt to the user 104. In either block 520 or 530, the universe of possible formats from which to choose may be limited to knowledge of formats used by the external devices 10*i* in network 1A.

In the second operation, in an aspect, proxy 110 receives multiple lines or frames of data and compares elements (e.g., words, sub-frames) of the lines or frames to known data and non-data format patterns stored in the reference data library 147A. The patterns may be stored as object code-level patterns and as source code-level patterns. If the proxy 110 is able to identify potential matches in a set of elements comprising a larger unit such as a sub-frame or a frame, the proxy 110 proceeds to examine the overall data pattern of the larger unit to confirm the overall pattern matches a stored data pattern. The proxy 110 repeats this process for a sufficient number of larger units, or frames. Note that this second operation does not require a complete examination of the data and the automatic mode of the second operation may proceed until a configurable confidence level is reached. If the second operation results in the possible identification of the format or schema of the data, the proxy 110 may present the identification to a user through a display on user interface 151 for user confirmation. In an aspect, proxy 110 may receive multiple lines or frames of data from a transmitting external object 10 and may compare the lines or frames of the received data to other lines or frames of data included in the reference data record library 147A, but is not able to identify, with sufficient certainty, the format or schema of the data. In this aspect of the first operation, the proxy 110 may provide suggestions to the user 104 by way of the user interface 151 as to the meaning of one or more elements, sub-frames or frames of the data record. For example, the proxy 110 may identify a data frame as a suggested match to a specific format, schema, or grammar. The user interface 151 may, for example, show what the data looks like with various grammar choices selected. In a simple example, selecting ASCII will display each eight bits in the file as an ASCII character, which may tell the user 104 whether the data stream, in this example, is ASCII encoded. A visualization method may employ would color coding to aid the user 104. For example, if a data element in the data stream 30 uses 16-bit words and the first word in the data stream is a frame sync word, the user interface 151 may show a color map of a large section of the data element where sync word matches are of a contrasting color to the rest of the data. With color mapping, sequential application of choices may tell the user 104 whether the operation converges to or diverges from a format match. Other displays of data items under various calculations/assumptions likewise may provide overall format clues to the user 104. FIG. 5, beginning in block 540, illustrates the second operation, namely an inter-proxy format specification selection operation executed by the application 113. In block 550, the format of the incoming data stream 30 is known. In block 552, the application 113 selects the appropriate translator 148A-C and applies the selected translator to the incoming data stream 30 to generate an inter-proxy data stream 31 having the common, inter-proxy format. In block 554, even though the format of the incoming data stream 30 is known, the human operator 104 may elect to invoke a semi-automatic, or interactive, translator selection process, possibly as a more reliable or accurate method for translator selection. Once the translator is selected, the application 113 applies the selected translator to reformat the incoming data stream 30 into the inter-proxy data stream 31 having the inter-proxy format.

In block 560, the format of the incoming data stream 30 is unknown to the application 113, but knowable. The operation of block 560 may be automatic (block 562) or semi-automatic (block 564).

Note that under limited circumstances, certain of the operations of FIG. 5 may be performed by a suitably trained and experienced human operator 104 using hand coding. However, the hand coding operation would not parallel, or in most ways, follow the operations of FIG. 5. Furthermore, the computer operations include features and aspects not possible through hand-coding.

Thus, the application 113 includes the structural components to decode data streams of uncertain format and transform these data streams into the common, inter-proxy format and back to another format.

Figure 3C:
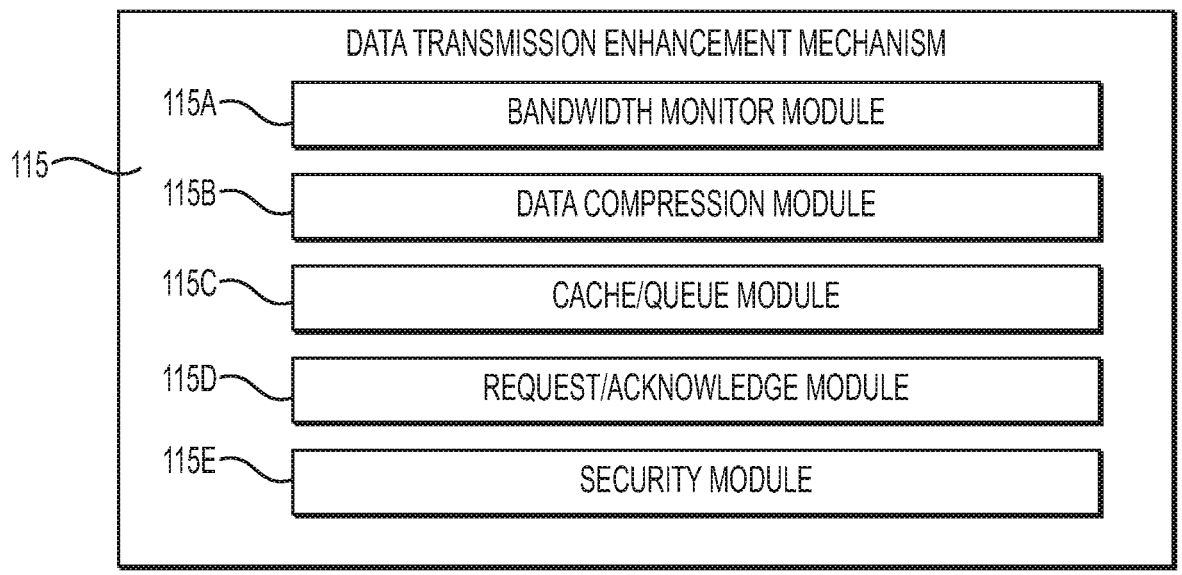

FIG. 3C illustrates the data transmission enhancement component 115. Adding proxies on-the-fly, the data transmission component 115 may request addition of another proxy 110*i* when data transmission slows below a threshold amount. Each proxy 110*i* may cache data to be transmitted. Large data files may be compressed. Data to certain proxies 110*i* may be placed in preference in queue. A transmitting and receiving proxy pair may use an acknowledgement/reply scheme. A transmitting proxy 110*i* may establish a connection to a receiving proxy 110*i* and transmit a data file. A sending proxy 110*i* may send a data file a fixed number of times until receiving an acknowledgement from the addressee proxy, or until a threshold number of attempts is reached. Proxies may establish a serialization scheme where each transmission has a sequence number so that the addressee can see if any data files were missed. As part of the data translation to the inter-proxy format, the mechanism 115 may determine if any viruses or other problems are encoded into the data file being decoded.

In FIG. 3C, data transmission enhancement component 115 includes bandwidth monitor 115A, data compression module 115B, cache/queue module 115C, request/acknowledgement module 115D, and security module 115E. The bandwidth monitor 115A monitors the data transmission rate at communications interface 119 and may execute one or more actions to increase data transmission rate and/or may execute a data transmission priority scheme to transmit certain data on a priority basis. One action that may be initiated is to add one or more additional proxies to provide, in essence, a parallel pathway for data flow from the proxy's associated external device 10 to one or more recipient external devices 10*i*. The manner in which such "on-demand" proxies may be added may depend on the proxy architecture in use. For example, if all proxies 110*i* are virtual machines, adding an on-demand proxy for a specific external device 10*i* would be a straightforward process. If proxy 110 is implemented as a device according to FIG. 1B(1), an "on-demand" virtual machine proxy could be allocated to external device 10, but the allocation would entail a more complex connection process. In an aspect, the "on-demand" proxy may be allocated to a specific external device 10 only as long as transmission demand requires its allocation.

The compression module 115B may operate to compress an inter-proxy data stream 31 when the size of the data stream 31 exceeds a certain value and/or based on the nature of the communications medium 120. In general, the external devices 10i are employed at nodes of a private communications network (e.g., a private local area network (LAN) or a private wider area network (WAN)). The network may be wired or wireless; the network may be a satellite communications network. In a satellite communications network, data compression may improve data transmission.

The cache/queue mechanism 115C may include a cache memory, or may access a cache memory, and the mechanism 115C may buffer outgoing and incoming inter-proxy transmissions. In an aspect, outgoing inter-proxy transmissions may be queued in the cache according to some value such as a proxy or urgency value and a length of time in queue.

The request/acknowledge module 115D operates to provide notifications to the proxies 110i when a receiving proxy 110R sends a data request REQ to a transmitting proxy 110T and corresponding acknowledgements ACK1 and ACK2 between the receiving proxy 110R and the transmitting proxy 110T.

Security module 115E may operate to invoke various security measures for inter-proxy communications. For example, client-server communication schemes are particularly susceptible to distributed denial of service (DDoS) attacks; typically, the private LAN would require some connection to an outside network such as the Internet. One way such a DDoS attack may be implemented is by flooding a processor with data requests or other messaging. Since the example networks disclosed herein are private LANs or WANs, the risk of a DDoS attack may be minimal. Nonetheless, each proxy 110i, through security module 115E, may implement procedures to prevent a DDoS attack and, in the event of a DDoS attack, minimize its damage an expedite recovery. Such procedures are well known.

FIGS. 3D(1)-3D(3) illustrate aspects of the communications control mechanism 117. In an aspect, networks 1A and 1B may employ a publish-subscribe scheme for some or all external devices 10i. In another aspect, the networks 1A and 1B may employ a peer-to-peer and/or a client-server scheme for some or all external devices 10i. FIG. 3D(1) illustrates components of the communication control mechanism 117, including publish-subscribe data classes/data channels device 117A, which in turn includes data content filter 117A(1) and data topic filter 117A(2). These components support a publish-subscribe scheme employing a data transmission pattern where data transmitting external devices 10P (publishers) do not program the data transmission directly to specific receiving external devices 10S (subscribers). Instead, the publishing external devices 10P may categorize published data into classes without knowledge of which subscribing external devices 10S may have an interest in the data. Similarly, subscribing external devices 10S may express an interest in one or more data classes and only receive data transmissions for which the subscribing external device 10S has expressed an interest, without knowledge of which publishing external device 10P provided the data. In this aspect, the respective proxies 110i mirror the behaviors of their external devices 10i. In this publish-subscribe scheme, an individual subscribing proxy 110S may receive a subset of the total published data transmissions through a filtering process. One filtering process is topic-based. When topic-based filtering is employed, data transmissions may be published to "topics" or named logical topic channels. Subscribers (external devices 10S and proxies 110S) then receive all data transmissions published to the topics to which the subscribers subscribe, and all subscribers to a topic receive the same data transmissions. The publishing external device 10P defines the classes of data transmissions to which subscribers can subscribe. Another filtering process is content-based, and data transmissions are delivered to a subscriber only if the attributes or content of those data transmissions match constraints defined by the subscriber. The subscriber classifies the data transmissions.

FIG. 3D(2) illustrates another publish-subscribe intermediary 117b that includes publish interface 117b(1) and subscriber interface 117b(2) by which publishing proxies 110P post data transmissions to intermediary 107 (see FIG. 1A(3)), and by which subscribing proxies 110S register with intermediary 107, letting the intermediary 107 perform the filtering. The intermediary 107 employs a store and forward mechanism to route data transmissions from publishers to subscribers. In addition, the intermediary 107 may prioritize data transmissions in a queue before routing. Subscribers may register for specific data transmissions at build time, initialization time or runtime. In an aspect, subscribers may be added or removed at runtime.

With the publish-subscribe schemes of FIGS. 3D(1) and 3D(2), each publisher and subscriber may share device meta-data in a multicast process. The publisher and the subscribers cache this information locally and route data transmissions based on the discovery. Publishers are loosely coupled to subscribers and need not know of their existence. With topic or content being the focus, publishers and subscribers operate without regard to network topology.

FIG. 3D(3) illustrates a client-server component 117C of communications control 117. In a traditional client-server architecture, clients and servers exchange messages in a request-response messaging pattern. In such a request-response messaging pattern, a client sends a request message to a server, which receives and processes the request, and then returns a response. This messaging pattern allows two devices to engage in a two-way communication over a channel. This message pattern may be implemented in a synchronous fashion, which holds a connection open and waits until the response is delivered or a timeout period expires. However, the request-response scheme also may be implemented asynchronously, with a response being returned at some unknown, later time. Considering the network 1A of FIG. 1A(1), for example, one or more of the external devices 10i may operate as a server and other external devices 10i may operate as clients in the traditional sense. To adequately process requests and responses between external device servers and clients, the proxies 110i may include structural components to provide either synchronous or asynchronous data transmission through medium 120.

In FIG. 3D(3), client-server component 117C includes address module 117C(1) and request/acknowledge (REQ/ACK) module 117C(2). The address module 117C(1) may include network addresses for each external device 10i and proxy 110i with which a specific proxy 110 may communicate. The address module 117C(1) also indicates if the external device 10i is a server or a client, and which servers have which clients. The request/acknowledge module 117C(2) may operate to maintain a data transmission path between proxies 110i when operating as either a server or as a client in a client-server scheme, including providing a timeout mechanism. Furthermore, server proxy 110Se may receive requests from many distinct client proxies 110Cl in a short period of time. To prevent overloading the server proxy 110Se, the module 117C(2) may provide a scheduling system to prioritize incoming requests from client proxies 110CI.

FIGS. 3E(1) and 3E(2) illustrate proxy discovery components of the communications control mechanism 117. In FIG. 3E(1) communications control mechanism 117 includes node discovery component 117E, publish-subscribe node discovery component 117F, client-server node discovery component 117G, and proxy node database 117H. The node discovery component 117E implements a general process, modified as necessary by publish-subscribe node discovery component 117F and/or client-server node discovery component 117G, to determine when a new proxy enters the CADE system 100, and to provide node information among the proxies 110i for each new proxy any information related to the proxies 110i to the new proxy. For example, a new proxy, upon initial or subsequent connection and start-up may broadcast new proxy information. In a client-server scheme, the new proxy may receive a response from a proxy associated with a server external device. In a publish-subscribe scheme, the new proxy may receive information from one or all of the existing proxies 110i. In either scheme, the proxy information for one or more proxies may be stored at each proxy 110. FIG. 3E(2) illustrates an example proxy node data base 117H. The database 117H may record a proxy name, an address for the proxy tied to the corresponding external device. Whether the proxy is active (proxy G is not active, and is not associated with any external device (see FIG. 1A(3)). The database 117H may include, where appropriate, an indication of the client (C) or server (S) status of the proxy.

Figure 4B:
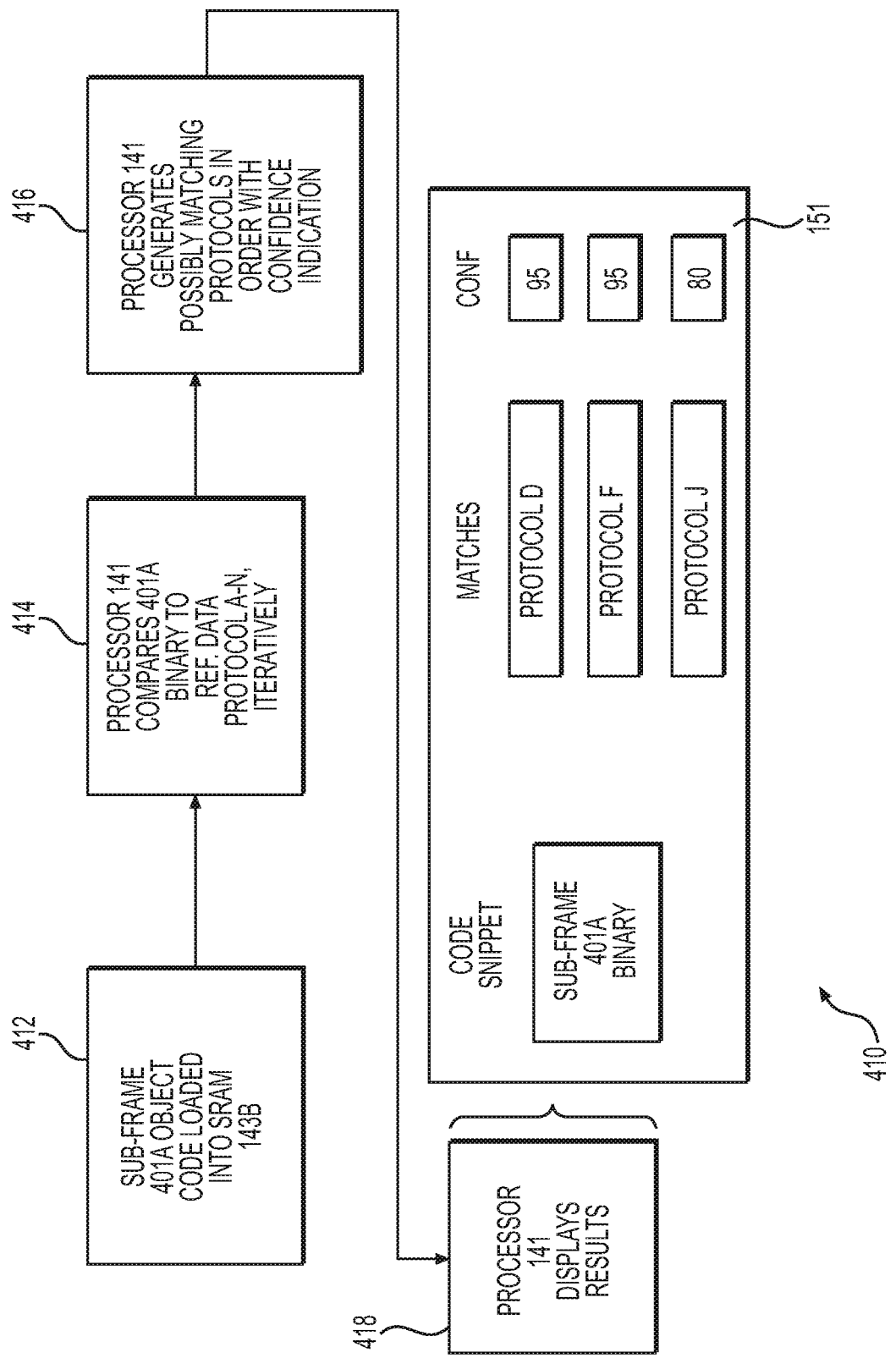
FIGS. 4B-4D illustrate, pictorially, examples of processing and display of the data frame of FIG. 4A.

FIG. 4B illustrates pictorially an example process 410 for semi-automated suggestion of format based on format patterns stored in the reference data record library 147A. As shown in FIG. 4B, as well as FIGS. 3A, 4A and 3B, in 412, processor 141 loads and reads binary code (object code) corresponding to sub-frame 401A into memory 143 (preferably SRAM 143B). In 414, format suggestion logic 149A in the instructions 149 executes to compare the binary, or the source code conforming to the binary, of sub-frame 401A to elements in reference data record library 147A to find elements whose format or format pattern that match or are similar to the binary of sub-frame 401A. In an aspect, the comparison includes pattern comparisons. In 416, elements or words in the sub-frame 401A that match a reference pattern may be arranged in descending order of likelihood of an actual match, and in 418, the results may be presented in the user interface 151 along with an identification of the format and a confidence level in user interface 151. Note that the user interface 151 displays confidence information as a percentage confidence level. Rather than providing a numerical level, the application 113 may express confidence information through a color coding scheme, such as shades of green used to indicate confidence greater than an adjustable minimum threshold value and shades of yellow for elements having confidence levels lower that the threshold.

Figure 4C:
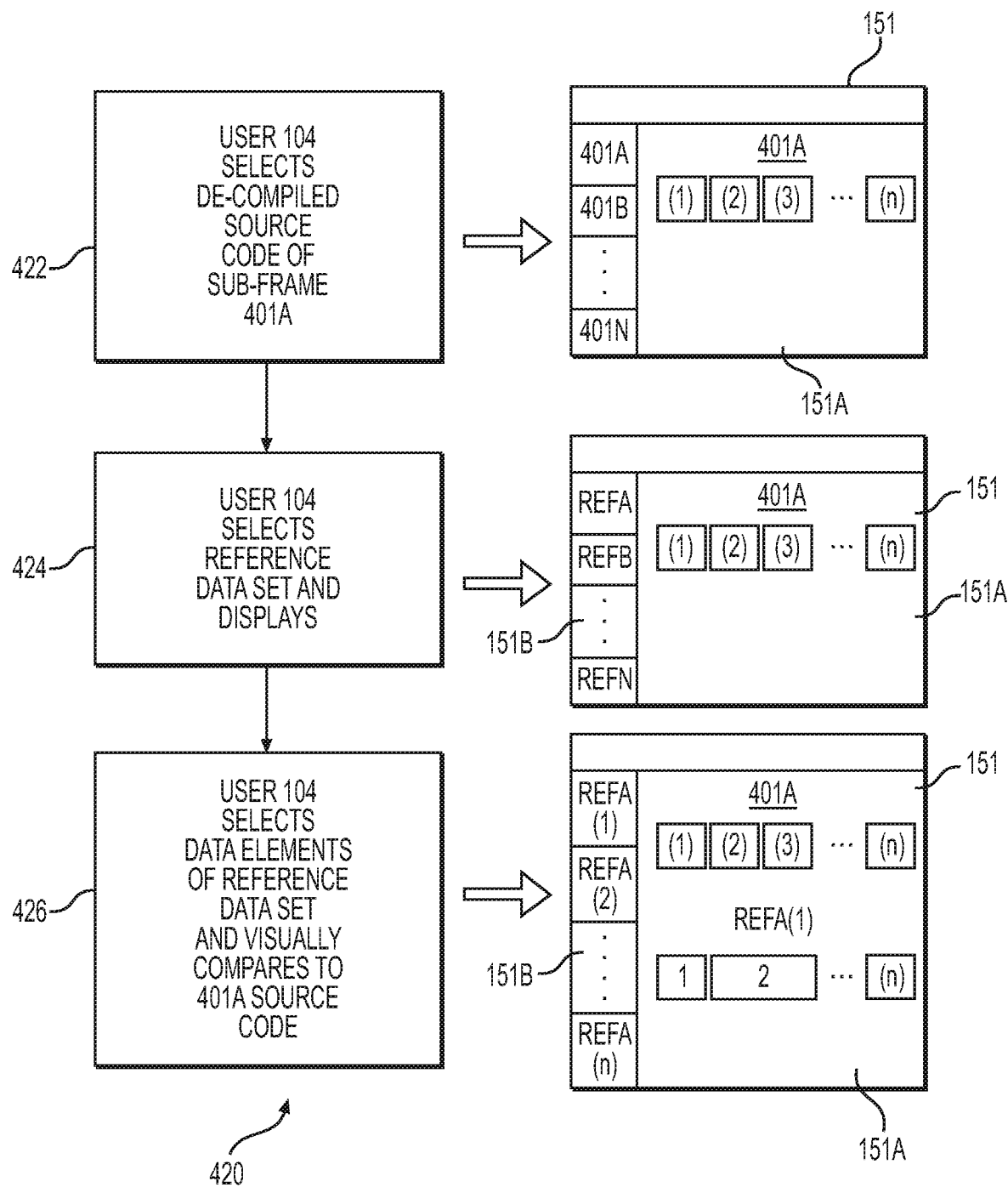

FIG. 4C illustrates pictorially another example process 420 for semi-automated suggestion of format based on format patterns stored in the reference data record library 147A. As shown in FIG. 4C, along with FIGS. 3A, 4A, and 3B, in 422, user 104 selects de-compiled source code of sub-frame 401A, and the source code is displayed in user interface 151. In 424, the user 104 selects reference data set A for comparison to sub-frame 401A source code. In 426, user 104 selects data elements of reference data set A and visually compares the selected data elements to sub-frame 401A source code. The process 420 continues iteratively among the data elements and reference data record formats A-N until the user 104 identifies a matching reference data set, or failing to identify a reference data set, ends process 420.

Figure 4D:
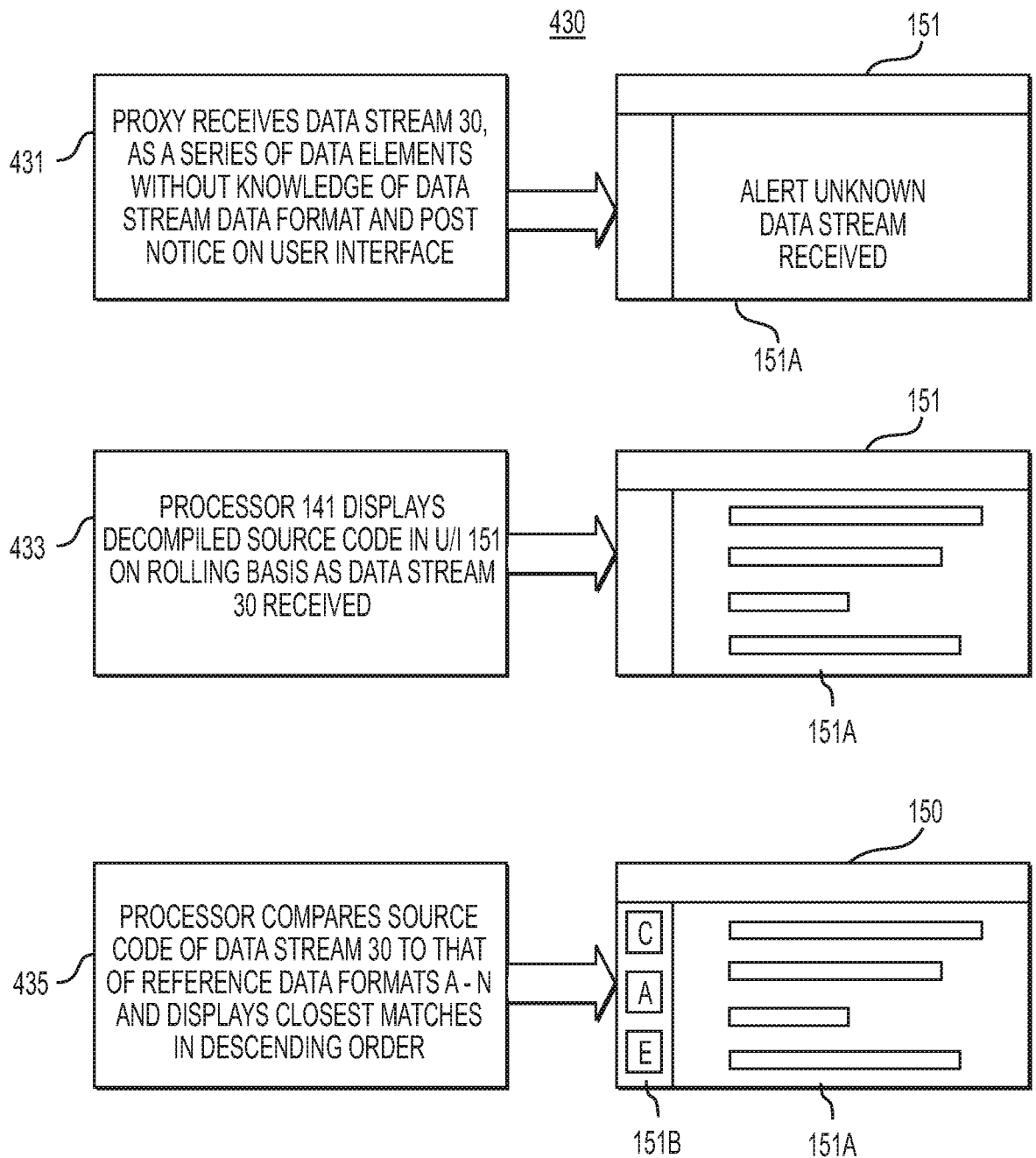
Figure 4D:
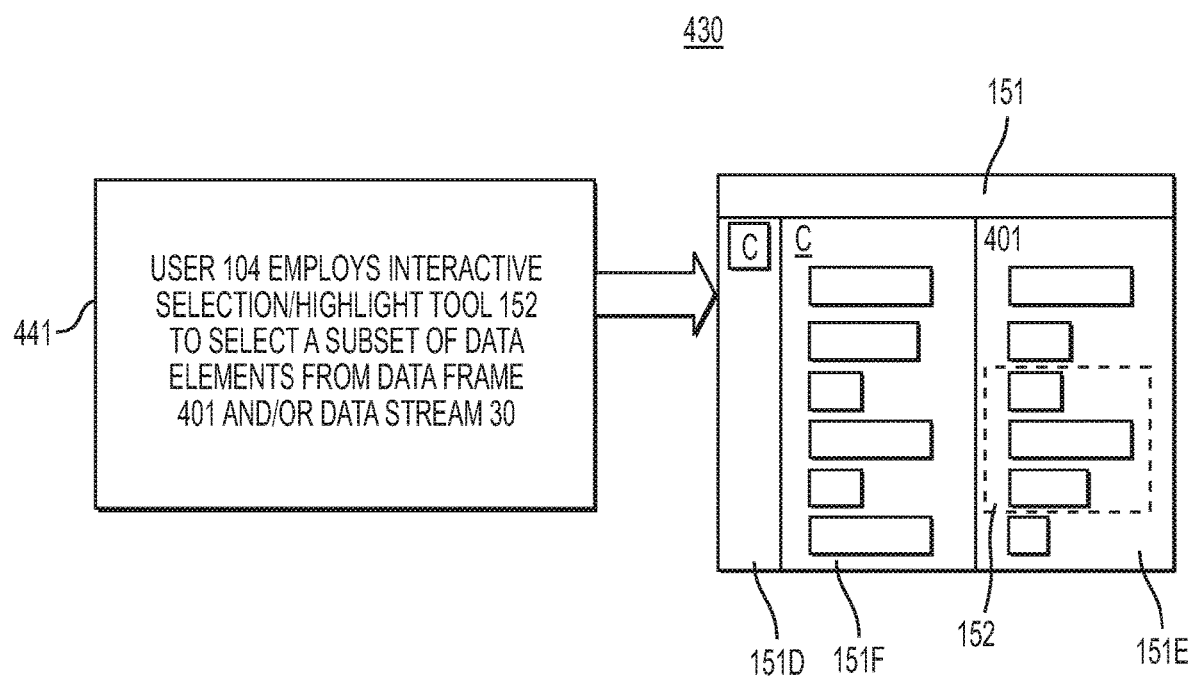

FIG. 4D illustrates pictorially, an example for semi-automatic, interactive processing and display of unknown data elements. In FIG. 4D, process 430 begins in 431 when a proxy 110 receives data stream 30 from its associated external device 10. The data stream 30 may include a number of data elements such as data packets, data frames, and data sub-frames such as the example of FIG. 4A. The proxy 110, in this example, receives the data elements non-data elements without knowledge of the format of the element. The central processor 141 determines the format is unknown and posts a notice or prompt to user 104 as display in window 151A. In 433, central processor 141 displays in window 151A, de-compiled source code for the data elements, on a rolling basis. In 435, processor 141 compares source code of the data stream 30 to that of reference formats A-N and displays the closest matches in descending order in window 151B. In 437, central processor 141 displays two reference data record formats showing match values above threshold level 151C (reference formats C and A are the two formats satisfying the threshold 151C). In 439, user 104 selects a matched reference data set (reference data set C is shown selected). Central processor 141 then displays parsed elements in window 151F for comparison to the reference format C and the elements in data stream 30, as shown in window 151E. User 104 also applies highlight tool 152 to select and highlight a sub-set of the elements. In 441, user 104 employs the highlight tool 152 to select different sub-sets of elements. The comparison may be done by user 104 by a manual-interactive operation supported by the central processor 141 or though operation of central processor 141 in a semi-automatic, interactive method. With the components of the CADE system 100 shown in FIG. 4D, the user 104 may interactively try various alternatives to identify the unknown data record format. For example, the user 104 could iteratively start with a data word length and apply various offsets to see if they look correct. If it does, that portion of the specification can be saved. If that does not work, other word lengths and/or offsets can be tried. After a data word is identified and verified, a next step might, for example, be the determination of a sub-frame sync pattern. The CADE system 100 may, in cooperation with user 104, may analyze a series of frames (based on the result of the first step) and try to identify recurring sub-frame sync patterns within each frame. The results may be displayed to the user 104 and the user 104 may be able to select a sub-frame sync pattern.

Figure 6A:
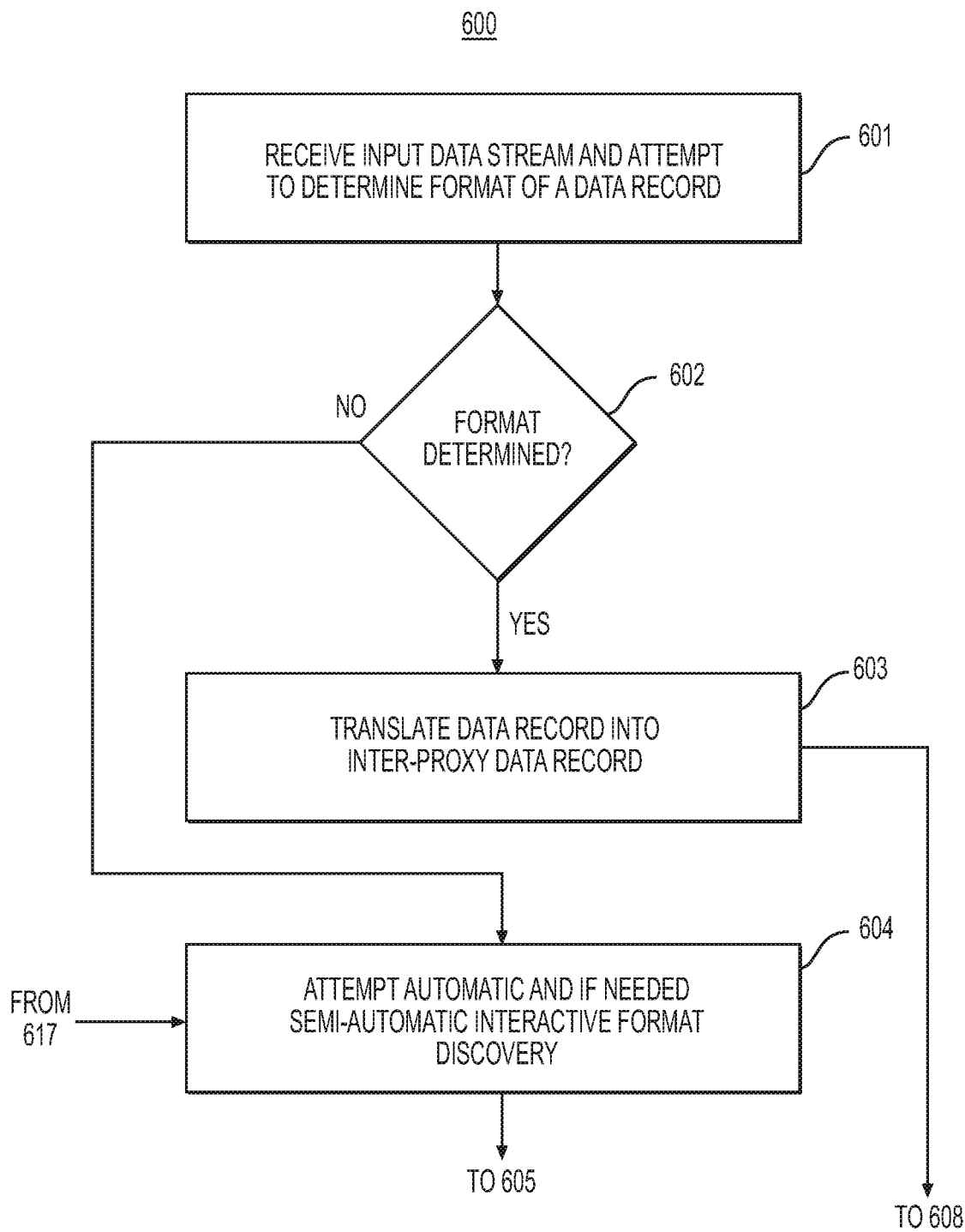
FIGS. 6A-6E are flow charts illustrating example operations of the system and system components of FIGS. 1A(1)-3D(3)
Figure 6A:
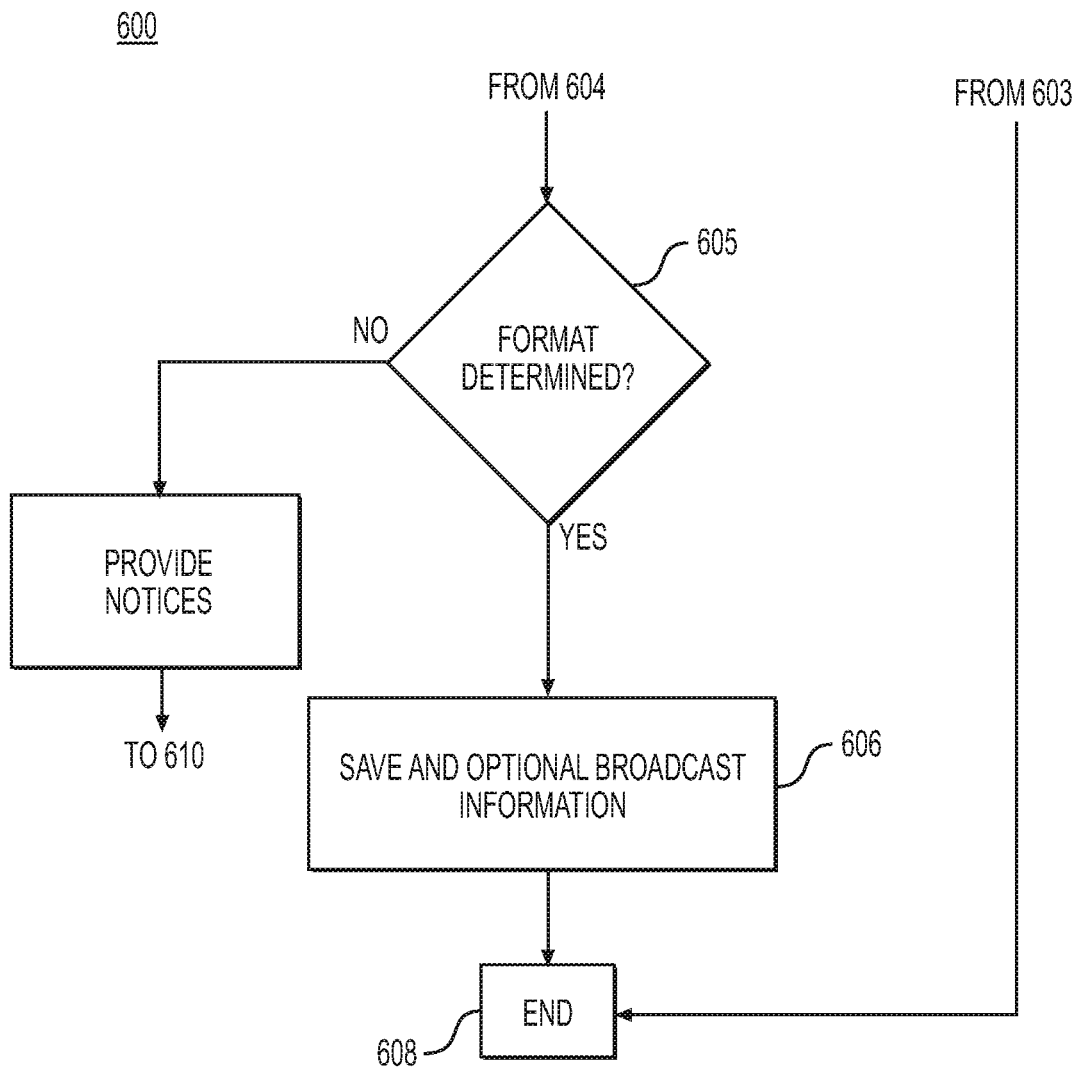

FIGS. 6A-6F are flow charts illustrating example operations of the CADE systems disclosed with respect to FIGS. 1A(1)-3E(2). The example operations may result in displays of information to user 104. Example displays are provided in FIGS. 4B-4D and 8A-8C. In FIG. 6A, overall operation 600 begins in block 601 when a publishing proxy 110i receives an input data stream 30 from an external device 10i, preprocesses the data stream 30, and attempts to determine, in automatic mode, a format for a data record in the input data stream 30. In an aspect, the determination of block 601 may include the central processor 141 consulting a lookup table of data record formats associated with the proxy's external (network) device 10i. In block 602, if the proxy 110i determines the format, operation 600 moves to block 603. If the central processor 141 of proxy 110i is not able to determine the format, operation 600 moves to block 604.

In block 603, the publishing proxy 110*i* translates the data record of input data stream 30 to a common, inter-proxy format, thereby generating an inter-proxy data record, and transmits the inter-proxy data record to a subscribing proxy 110*i*. The operation 600 then moves to block 608 and ends.

In block 604, the publishing proxy 110*i* executes automatic, and if needed, semi-automatic format, discovery processes for the input data stream 30. In block 605, if either the automatic or semi-automatic process results in a determination of the input data stream format, the operation 600 moves to block 606 and the publishing proxy 110*i* saves the information related to the determination, and optionally forwards (broadcasts) the information to all other proxies 110*i* in the CADE system 100. The operation 600 then moves to block 608 and ends. If neither the automatic or semi-automatic process results in a determination of the input data stream format, the publishing proxy 110*i* provides a system-wide notice to the CADE system 100, and a notice to the external device 10*i* and moves to operation 610.

Figure 6B:
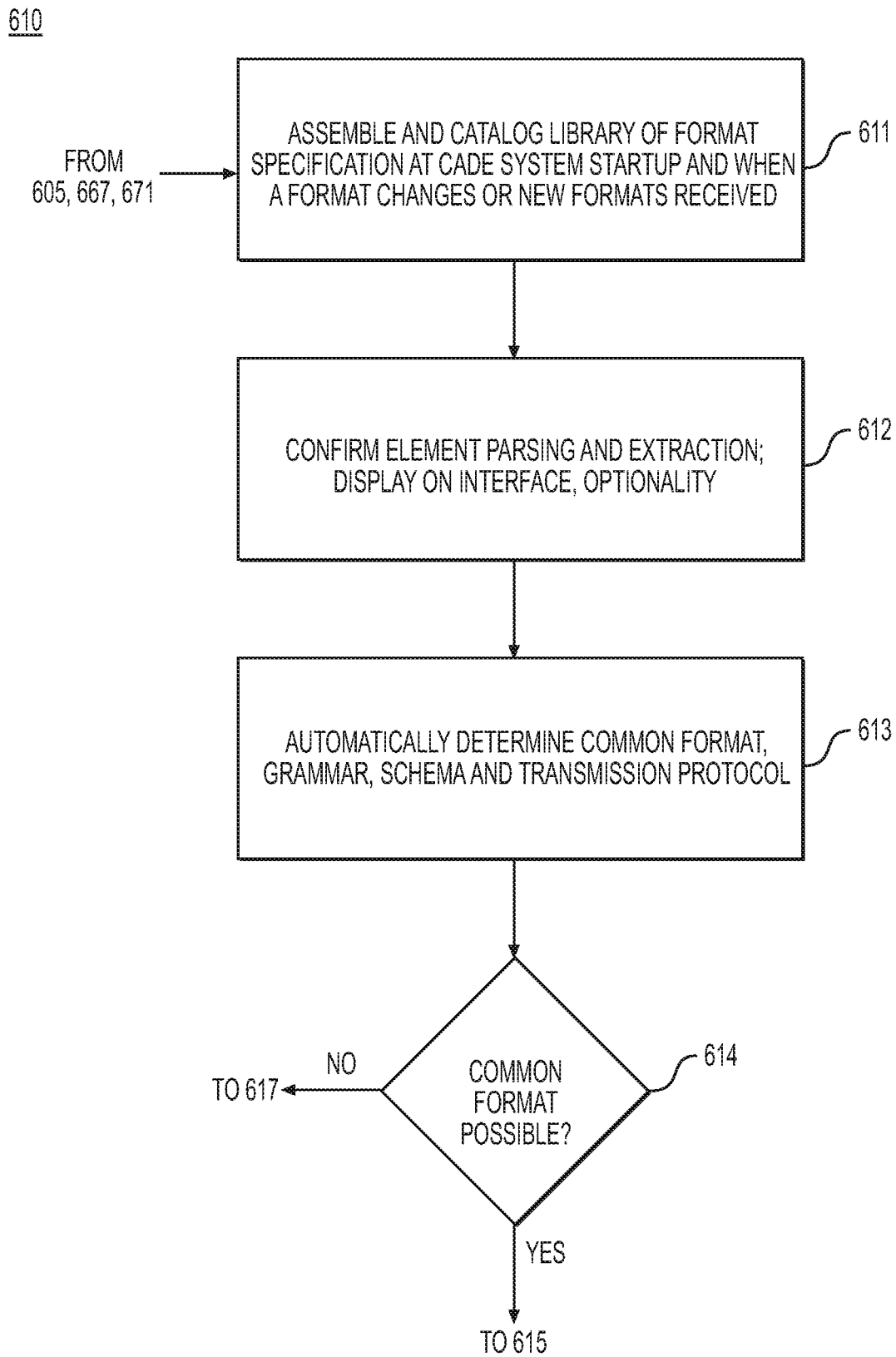
Figure 6B:
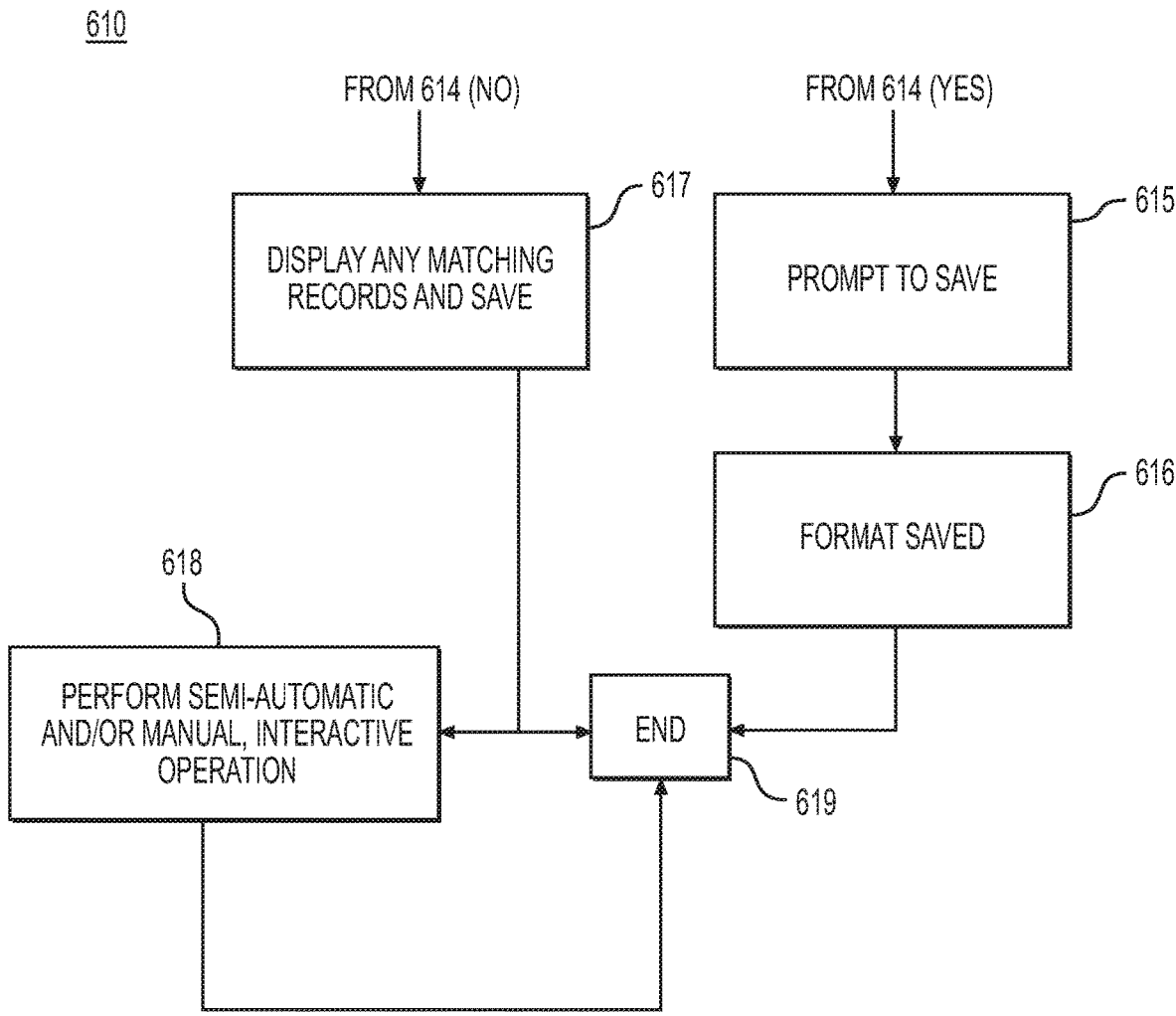

FIG. 6B illustrates an example operation for generating an inter-proxy format specification. Generation of an inter-proxy format and specification may occur at initiation of the CADE system 100, and occasionally thereafter such as when an existing reference data record format is revised or otherwise changed, or when the CADE system 100 encounters a new reference data record format. Furthermore, the CADE system 100 may employ more than one inter-proxy format. In FIG. 6B, operation 610 begins in block 611 when a user 104 assembles a library of current data record formats and specifications and their associated source code, parsers and extractors, grammars and schemas, and data transmission protocols. In block 612, the user 104 operates CADE system 100 to apply each parser and extractor to a data record format source code to confirm the source code parsing and extraction conform to the grammar and schema. The operation of block 612 may be displayed on user interface 151. Once all data record formats are processed and saved, in block 613, the application 113 may execute to automatically attempt to develop an inter-proxy format and specification, and associated grammar, schema, and transmission protocol. Consider the data records of FIGS. 7A-7C. The application 113 analyzes each of the illustrated data records 710-730, and all other data records, which would be parsed and verified in block 612 to determine the grammar, schema, and transmission protocols, to determine if a common grammar, schema, and transmission protocol (e.g., according to 740, FIG. 7D) may be generated, and after generation, translated into each of the data record format specifications associated with data records 710-730. In block 614, if a common inter-proxy format specification can be generated automatically, the application 113 provides a prompt, block 615, to save the common format specification, and in block 616, the specification is saved in the inter-proxy data record library 147B as the inter-proxy data format specification 148' for the common, inter-proxy format. In block 614, if the common inter-proxy format specification cannot be generated automatically, operation 610 moves to block 617, and the application 113 displays and saves any matching data records. The operation 610 then moves to block 618 and semi-automatic or manual, interactive operations are conducted. Following blocks 616, 617, or 618 the operation 610 may end, block 619, and the user 104 attempts a manual, hand-coding operation.

Figure 6C:
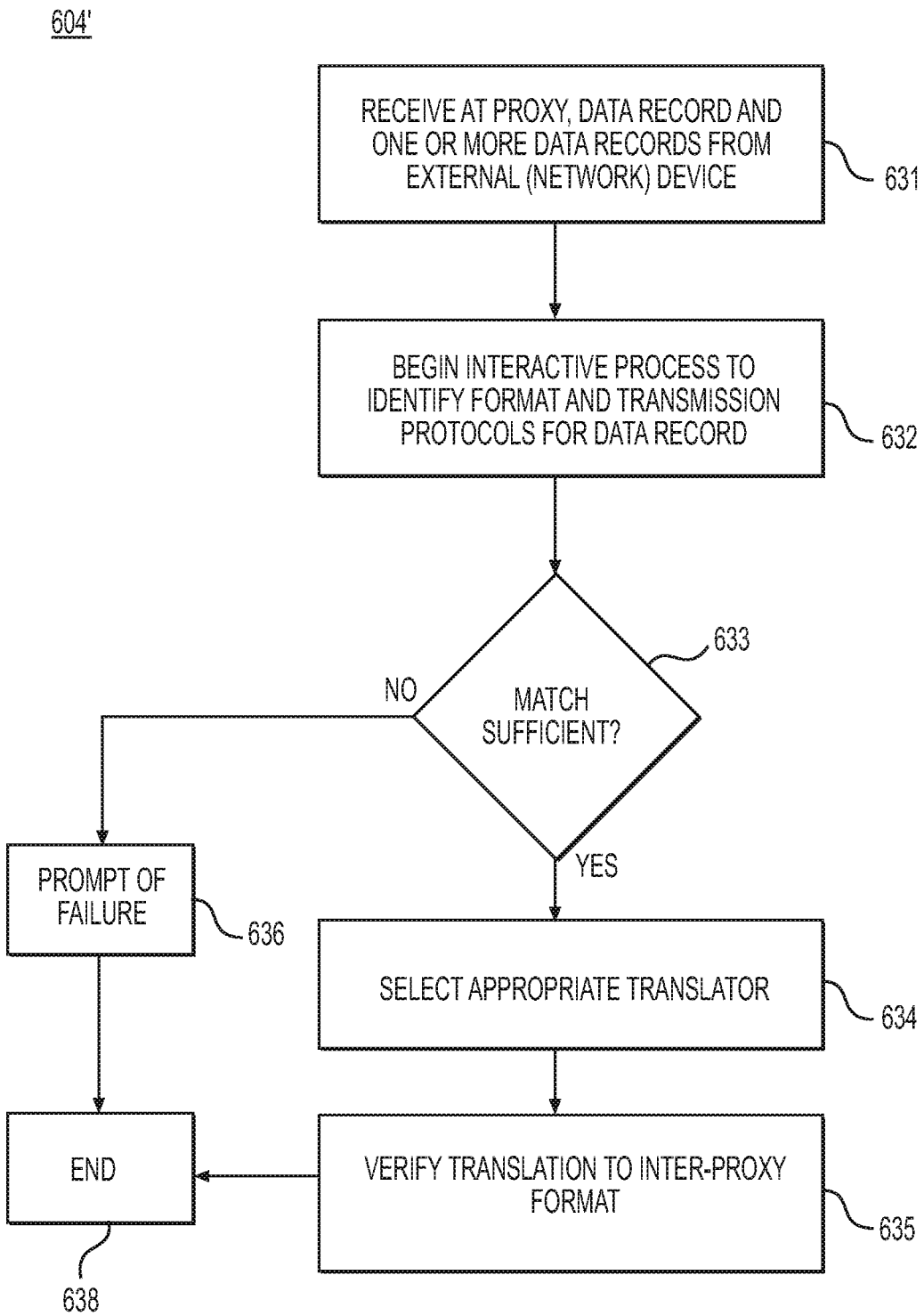

FIG. 6C illustrates one alternate operation of block 604 in which the application 113 invokes an automatic discovery of a format of an input data record in input data stream 30 and generation of a translator to translate the input data record format into the common, inter-proxy format. In an aspect, the operation of FIG. 6C may be based on pattern matches at the object code level, but the comparison operations may be displayed at a higher level, such as at a source code or higher level. See FIGS. 8A-8C, for example. In FIG. 6C, operation 604' begins in block 631, a proxy 110*i* receives one or more data elements from its associated external device 10*i*. In block 632, the application 113 initiates an iterative process to identify the format of the input data stream 30. In an aspect, the identification process includes a method for automatically comparing structures of data elements contained in the data stream 30 to known data element structures as shown in reference data record formats A-N. In block 633, the application 113 determines if a sufficient match has been made to confirm, with a given confidence level, the identity of the format of the incoming data stream 30. In block 633, if a sufficient match has been made, the operation 604' moves to block 634; otherwise, the operation 604' moves to block 636. In block 634, the application 113 selects the translator corresponding to the identified format and translates the input data record according to the inter-proxy data format specification 148'. In block 635, the application 113 verifies the translation is correct. For example, the application 113 may translate the inter-proxy data record back into the format original of the input data record. In block 636, the operation 604' provides a prompt or notification to user 104 that automatic identification and translation failed and suggest execution of a semi-automatic identification and translation process. Following either block 635 or 636, operation 604' ends, block 638.

Figure 6D:
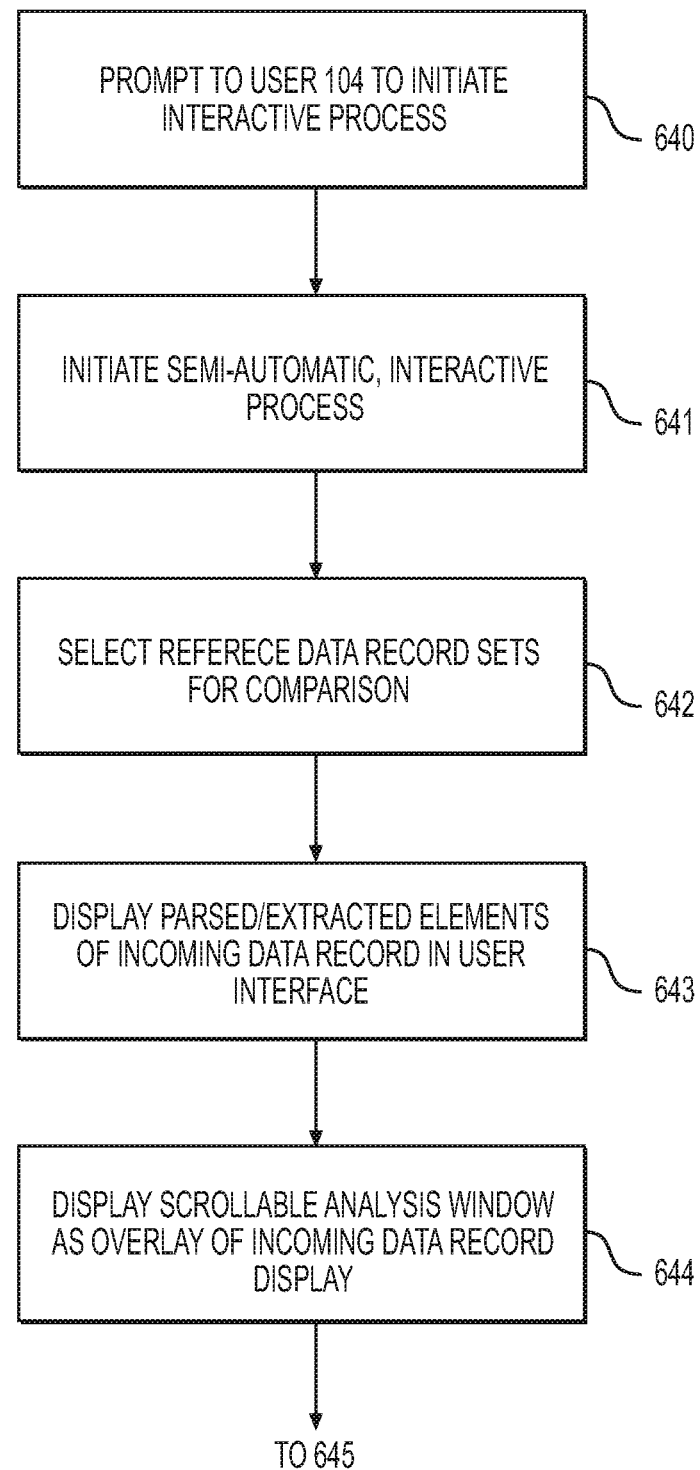
Figure 6D:
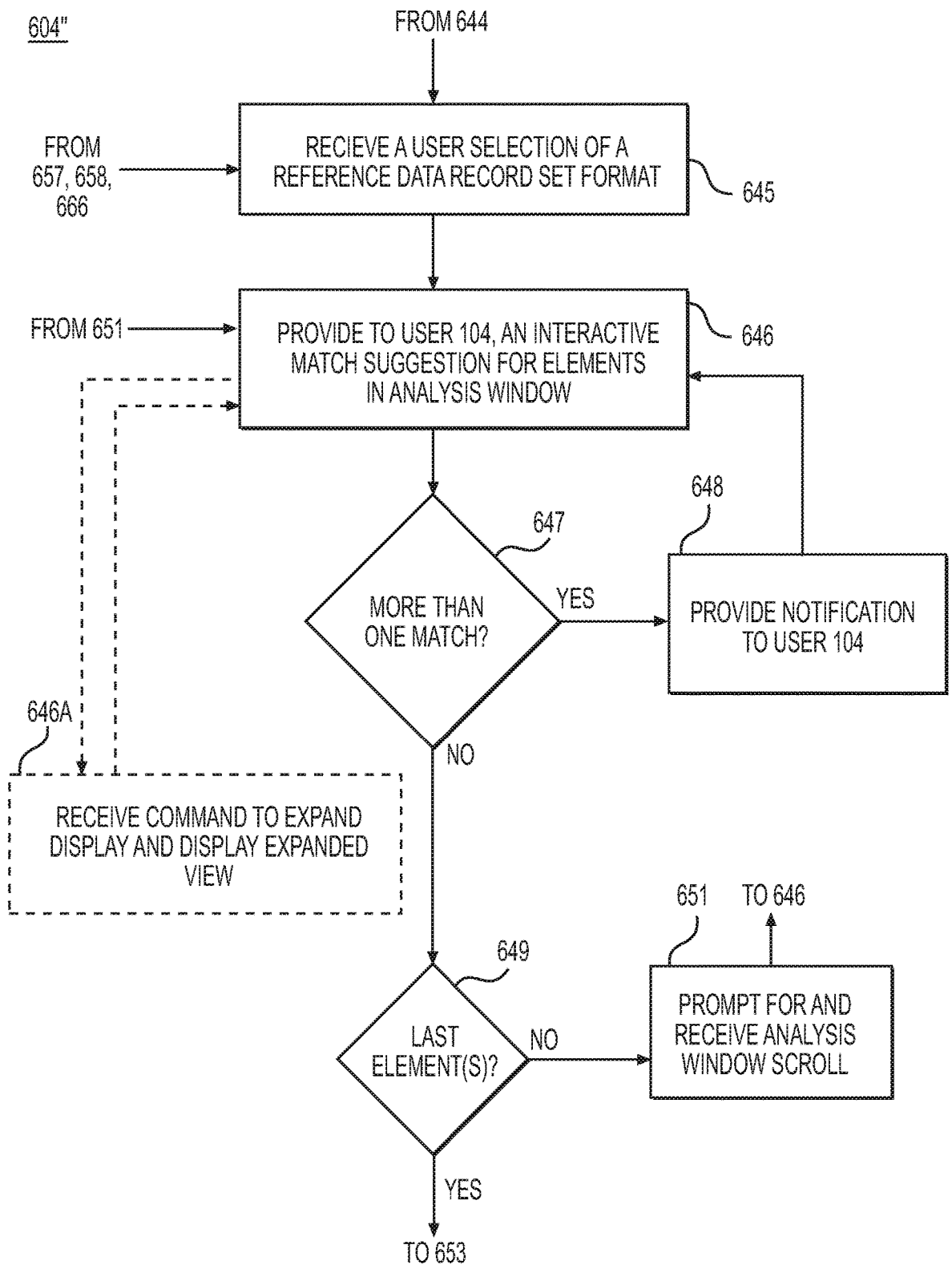
Figure 6D:
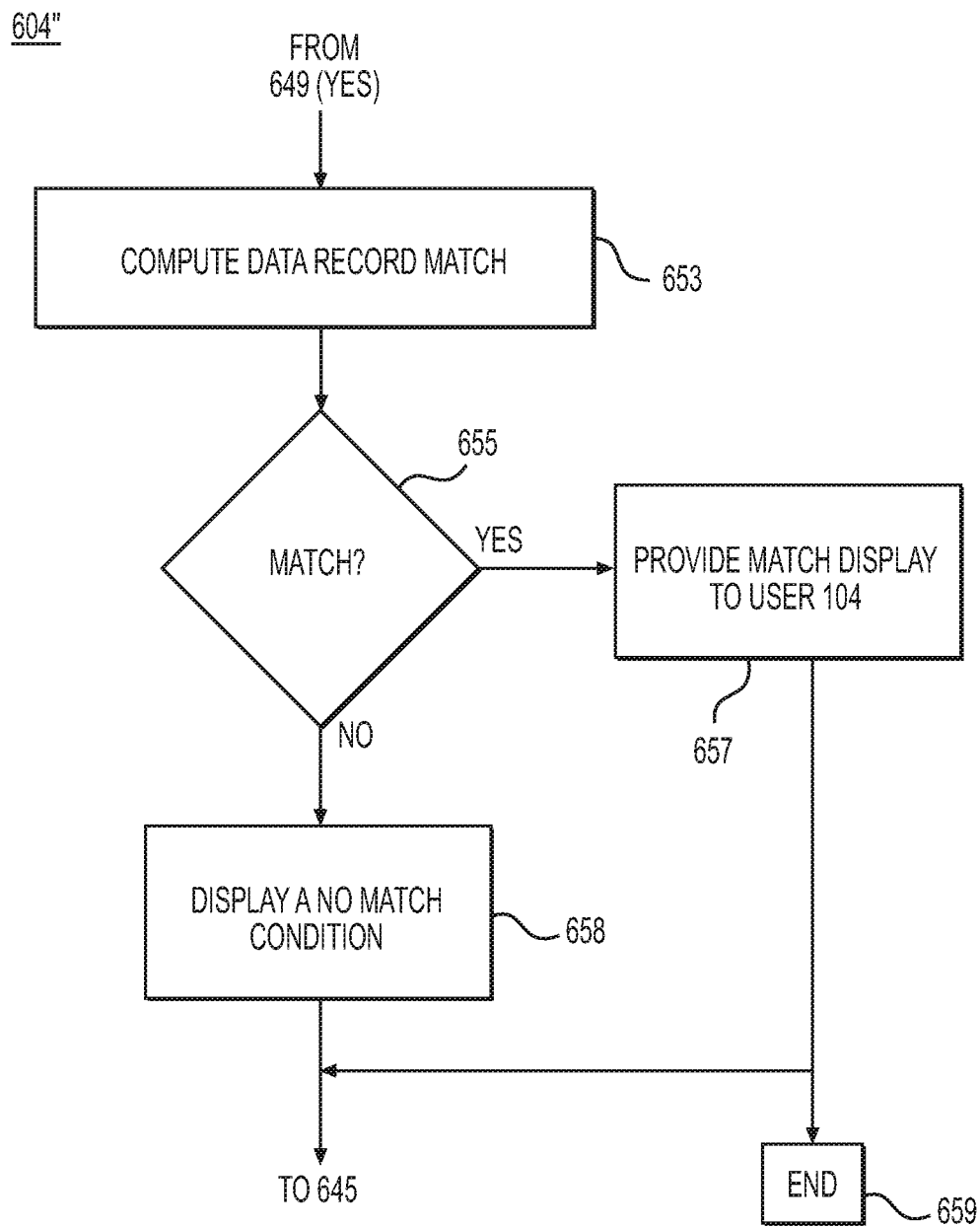
Figure 8A:
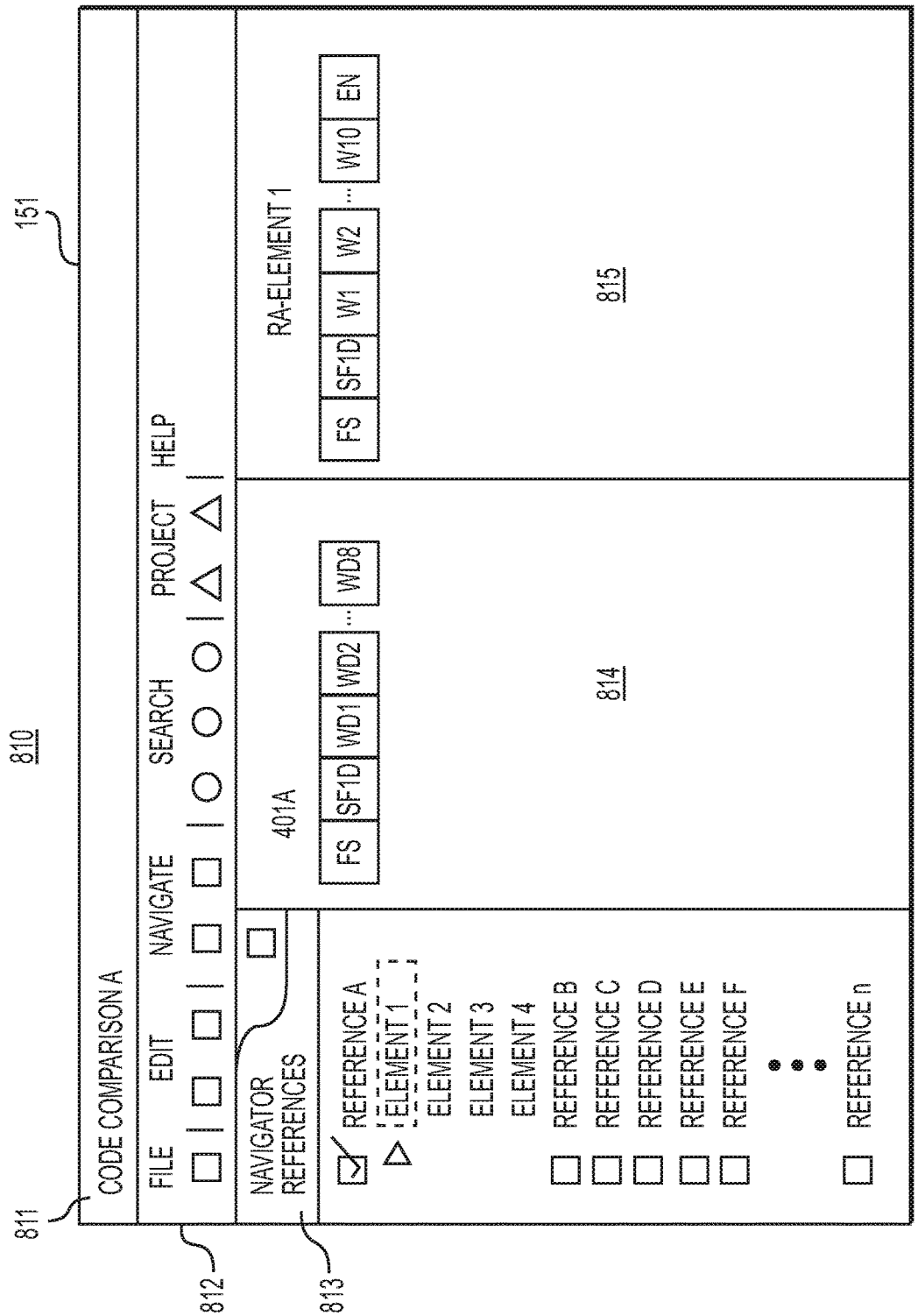
FIGS. 8A-8C illustrate example user interface displays provided by the CADE systems of FIGS. 1A(1)-1A(3).
Figure 8B:
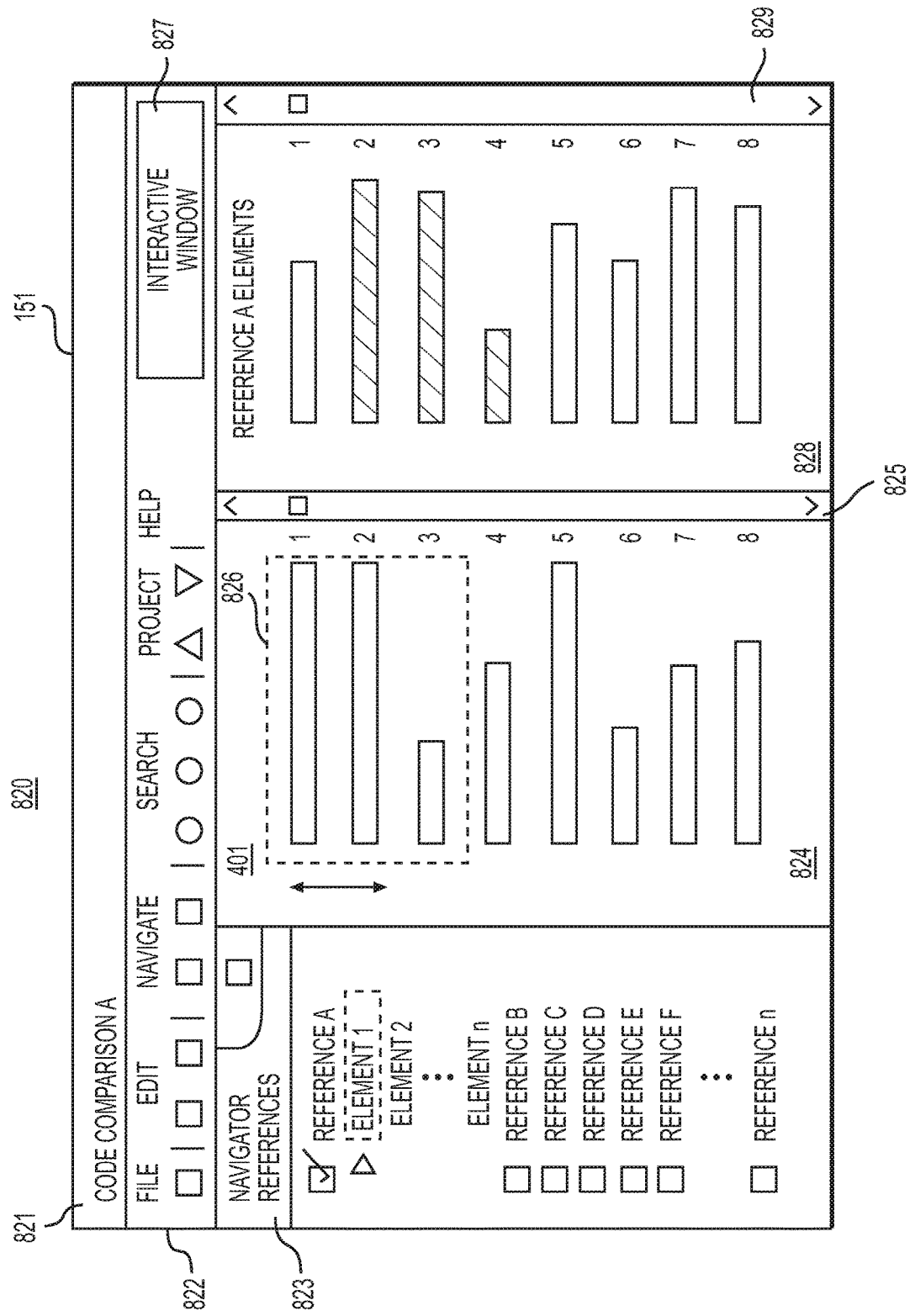
Figure 8C:
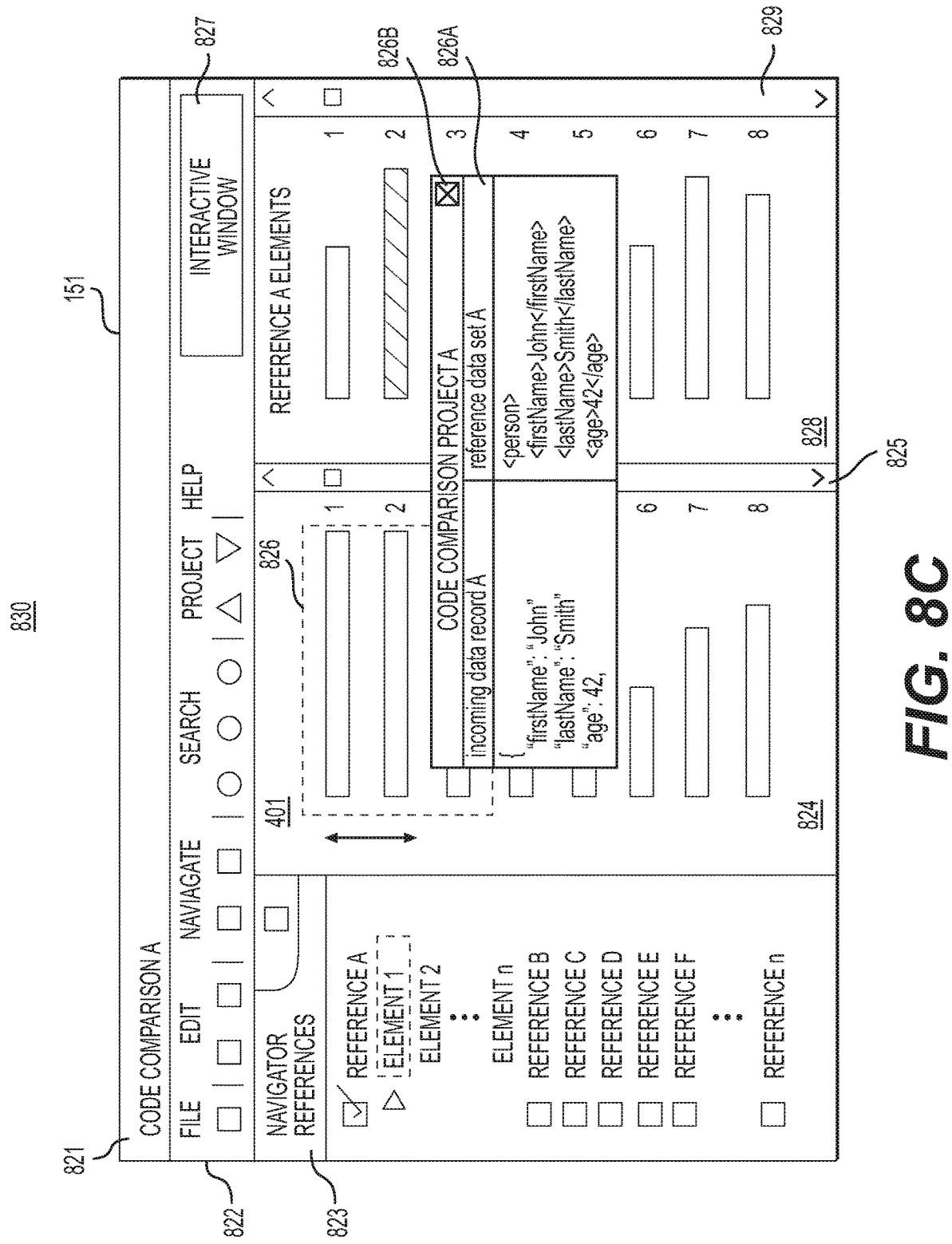

FIG. 6D, in conjunction with FIGS. 8B and 8C, illustrates another alternate operation of block 604 in which the application 113 invokes a semi-automatic process to translate an input data record into an inter-proxy data record having the common, inter-proxy format. In an aspect, the semi-automatic operation of FIG. 6D may employ source code pattern matches, as opposed to object code pattern matches, to determine if a match condition exists. Furthermore, the central processor 141 may make match suggestions that are displayed to, and either accepted or rejected by user 104. In FIG. 6D, operation 604'' begins in block 640 when the application 113 provides a prompt through user interface 151, or other form of notification, to user 104. In block 641, the user 104 initiates the semi-automatic process of operation 604'' using controls provided through the user interface mechanism 150. In block 642, the user 104 selects one or all reference data record formats A-N to be used for comparison, and the central processor 141 loads the reference data record formats A-N into SRAM 143B and provides an expandable listing of the reference data record formats A-N in navigation window 823. In block 643, the central processor 141 causes the incoming data record (i.e., the data record having an unknown format) to be displayed in window 824 as a sequence of the smallest parsable units of the incoming data record. In FIG. 8B, eight such units are displayed; however, window 824 is scrollable, and the incoming data record may include more than eight parsable units. As a consequence of limited display real estate, the user 104 may scroll the window 824 to view and interact with other elements parsed and extracted from the input data record. In block 644, the central processor 141 causes scrollable analysis window 826 to be displayed at a predetermined start position as an overlay encompassing a number of units or elements. In addition to being scrollable, the analysis window 826 may be expanded or contracted vertically or horizontally to expand or contract the focus of the semi-automated format identification process. For example, the analysis window 826 may be contracted vertically so that only one element is encompassed in the analysis window 826. In block 645, the user 104 provides a selection of a reference data record format to be displayed in window 828. As can be seen in FIG. 8B, user 104 selects reference data record format A, and in response, the central processor 141 expands the reference data record format A display in navigation window 823 to display elements 1-n of the reference data record format A and displays the reference data record format A in window 828. If the number of elements exceed the display real estate of window 828, the central processor 141 provides scroll bar 829 so that the user 104 may scroll the display of window 828 to view the entirety of elements of reference data record format A. In block 646, the central processor 141 executes suggestion logic 149A to provide an interactive suggestion as to a possible match between the element or elements encompassed by the analysis window 826 and the elements displayed in window 828. In an aspect, in making this match suggestion, the central processor 141 compares the function and/or the structure of the encompassed elements and provides a suggestion as to a match by highlighting elements in window 828 that may match. In the example of FIG. 8B, elements 2-4 are highlighted by operation of the central processor 141. In an aspect, if the matching elements of the reference data record format were not displayed in window 828, the central processor 141 may scroll the display until the matching elements are displayed. In an aspect, the highlighting may include a color coding scheme where a specific color or color shade indicates a degree of matching and/or a confidence level in the match as to the highlighted elements. In an aspect, the central processor 141 may identify more than one grouping of elements from reference data record format A that possibly match the elements encompassed in analysis window 826. In this aspect, in block 647, the central processor 141 determines if more than one element grouping matches. If more than one element grouping matches, the operation 604" moves to block 648 and provides a pop-up interactive window 827 in the tool bar 822 identifying the location of the other matching element groupings. The operation 604" then returns to block 646. In optional block 646A, the user 104 may command the central processor 141 to display an expanded view of both the elements encompassed in the analysis window 826 and the highlighted elements shown in window 828 by clicking one the analysis window 826. Should the user 104 click on window 826, the central processor 141 provides overlay display 826A, an example of which is shown in FIG. 8C. The overlay display 826A includes a close button 826B that, when selected, causes the central processor 141 to close the overlay display 826A. In block 647, if there is not more than one matching element grouping, the operation 604" moves to block 649 and the central processor 141 determines if the element grouping encompassed by the window 826 is the last un-examined element or element grouping. If the encompassed element or element grouping is not the last un-examined element or element grouping, operation 604" moves to block 651. In block 651, the central processor 141 provides a scroll prompt to, and in return receives a scroll command, from user 104 and repositions analysis window 826 accordingly. The operation 604" then returns to block 646, and the operations of block 646 to 651 repeat until in block 649, the central processor 141 determines no un-examined elements or element groupings exist, at which point, the operation 604" moves to block 653 and the central processor 141 computes an overall, or total match for the incoming data record in comparison to the selected reference data record format (reference data record format A in the example of FIG. 6D). In block 655, if a total match exists, the operation 604" moves to block 657 and the central processor 141 provides a match display, with a degree of confidence, in window 827. In block 655, if the central processor 141 determines no total match exists, the operation 604" moves to block 658 and the central processor 141 displays a no match notification in window 827. The operation 604" then returns to block 645. Note that the central processor 141 could determine a match condition based on the first iteration of block 646 and optional block 646A. Following block 657, the user 104 may elect to return to block 645 by selecting another reference data set for analysis and comparison. Otherwise, the user 104 may end the operation 604" ends, block 659.

A further operation of the CADE systems provides for a manual interactive code comparison operation. This manual interactive code comparison operation differs from that of operation 604" in that the central processor 141 does nor make code match suggestions. Instead, all code comparisons are effectuated by the user 104 manually scrolling contents of windows 824 and 828 (see FIG. 8B) and deciding if a match condition exists.

Figure 6E:
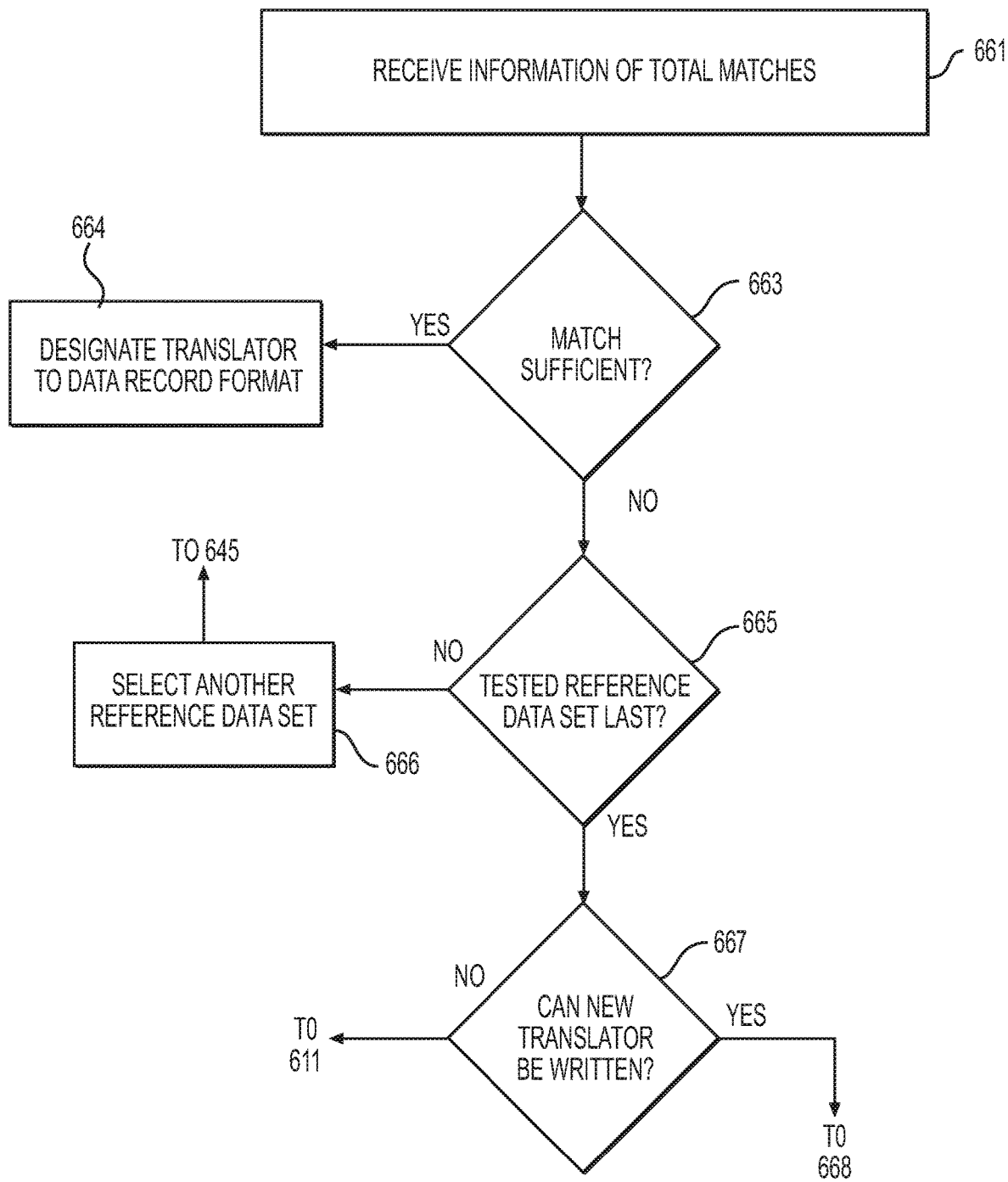
Figure 6E:
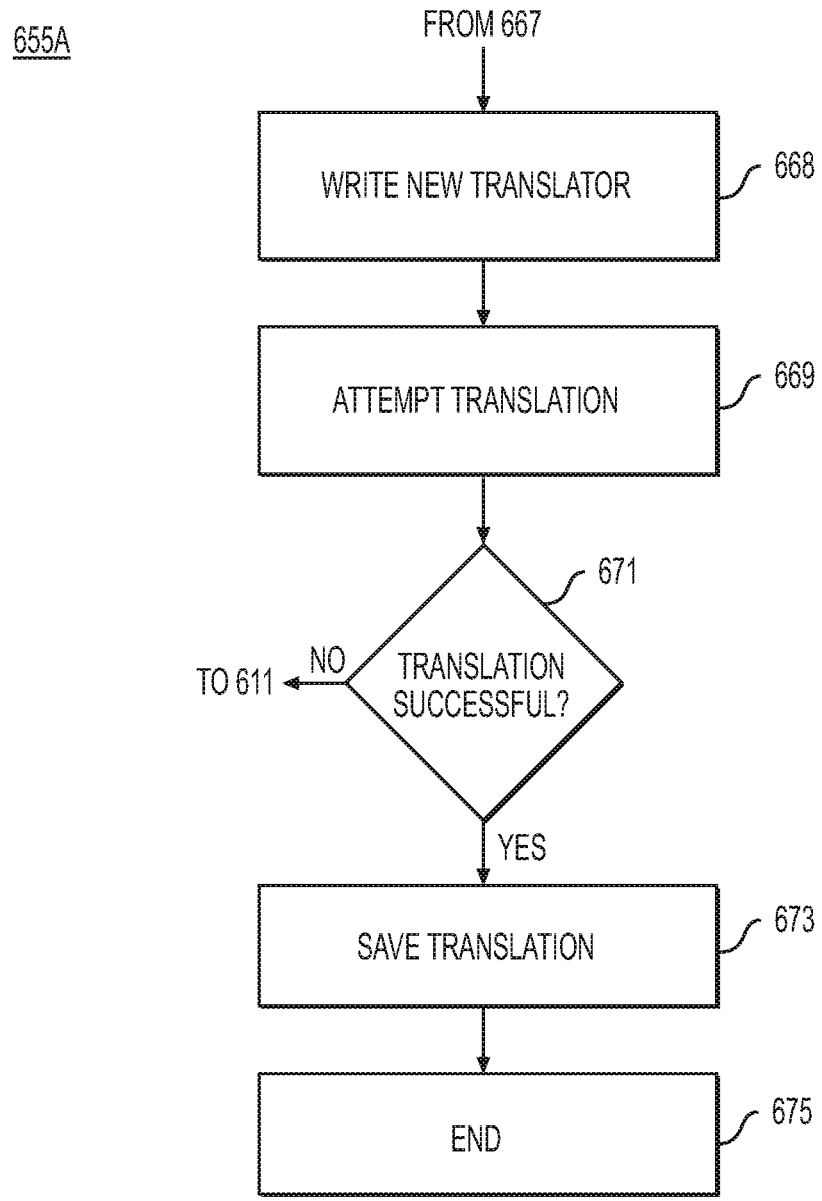

FIG. 6E illustrates the match operation of block 655, FIG. 6D, in detail. The operation 604" of FIG. 6D initially determines "local" matches between individual elements or between sub-sets of elements. Just one "local" match may be sufficient to determine a "total" match between the format of an incoming data record and a reference data record format (e.g., reference data record format A, as shown in FIG. 8B). However, the central processor 141 may need to find more than one "local" match to determine if the formats match. FIG. 6E illustrates a total match determination in detail. The total match determination of FIG. 6E consists of two possible determinations. A first match determination is based on a sufficient total format match such that an existing translator, such as translator 148A, may be used to translate the format of the incoming data record into the inter-proxy format. That is, the translator 148A, for example, will successfully translate the incoming data record into an inter-proxy data record that may be provided to any proxy 110i in networks 1A or 1B. A second match determination is based on a sufficient total format match such that execution of components of the CADE system 100, and specifically execution of the application 113 by central processor 141, may generate and apply a new translator that will translate the incoming data record into an inter-proxy data record.

In FIG. 6E, operation 655a begins in block 661 when the central processor 141 receives information related to the total matched elements between the incoming data record and a chosen reference data record format A (see FIG. 8B). In block 663, the central processor 141 determines if the match is sufficient within a given confidence level, and with a sufficient probability, to designate an existing translator (translator 148A) as capable of translating the incoming data record into an inter-proxy data record. If in block 663, the central processor 141 determines the match is sufficient, operation 655a moves to block 664 and the central processor 141 designates and saves the translator designation. If in block 663, the match is not sufficient, the operation 655a moves to block 665, and the central processor 141 determines if the reference data set tested in block 663 is the last available reference data set. If in block 665, the reference data set tested in block 663 is not the last available reference data set, operation 655a moves to block 666, and the central processor 141, or alternately user 104, selects another reference data record format from the navigation window 823, the operation 655a returns to operation 604", block 645, and the remaining processes of operation 604" are performed. If in block 665, the tested reference data set is the last available reference data set, the operation 655a moves to block 667 and the central processor 141 determines, based on the match information of blocks 661 and 663, if the central processor 141 can write a new translator that will translate the incoming data record into an inter-proxy data record having the current inter-proxy format. If in block 667 the central processor 141 can write a new translator, the operation 655a moves to block 668 and the central processor 141 writes the new translator. Following block 668, operation 655a moves to block 669 and the central processor 141 verifies the new translator by attempting to translate the incoming data record into an inter-proxy data record having the current inter-proxy format. In block 671, if the translation is successful, the operation 669 moves to block 673, and the central processor 141 saves the new translator in the inter-proxy data record library 147B. If in block 671 the translation is not successful, operation 655a returns to block 611, operation 610, FIG. 6B. Following block 673, operation 655a moves to block 675 and ends.

FIG. 8A illustrates an example display, in user interface 151, generated by the CADE system 100. In FIG. 8A, user interface 151 presents display 810 associated with a specific code comparison, notably Code Comparison A as listed in title bar 811. The display 810 includes tool bar 812, which may be employed to vary information shown in display 810. In the tool bar 812, selection of navigate provides navigator window 813, which may be one of many available navigator windows, displaying reference data record formats A-F. As can be seen, reference data record format A is selected, expanding to display available elements. The available elements may be those parsed and extracted by a parser/extractor designed for reference data record format A. Finally, window 814 displays a data element (sub-frame 401A) from data frame 400, and window 815 displays element 1 from reference data record format A. A display such as display 810 may allow a semi-automatic, suggestion-based evaluation. However, the display 810 also may allow a semi-automatic comparison without a suggestion feature.

FIG. 8B illustrates an example display, in user interface 151, generated by the CADE system 100. In FIG. 8B, user interface 151 presents display 820 associated with a specific code comparison, notably Code Comparison A as listed in title bar 821. The display 820 includes tool bar 822, which may be employed to vary information shown in display 820. In the tool bar 822, selection of navigate provides navigator window 823, which may be one of many available navigator windows, displaying reference data record formats A-F. As can be seen, reference data record format A is selected, expanding to display available data elements. The available data elements may be those parsed and extracted by a parser/extractor designed for reference data record format A. Window 824 includes scroll bar 825. Window 824 displays data elements 1-8 in the order in which the data elements 1-8 were received in data stream 30. Window 828 includes scroll bar 829 and within the visible portion of window 828, displays the first eight data elements of reference data record format A. As can be seen in window 824, the user 104 has invoked sliding window 826, shown encompassing data elements 1-3. The sliding window 826 may be shrunk or expanded vertically to encompass fewer or more data elements. Moreover, sliding window 826 may be positioned vertically in window 824. These two features of sliding window 826 allow the user 104 to position the window 826 to encompass one or more data elements of interest. In an aspect, when the sliding window 826 is positioned, the application 113 operates to scroll the reference A elements in window 828 that most closely conform to the selected data elements in window 824. The application 113 then may highlight the conforming data elements in window 828. In another aspect, the application 113 does not scroll the data elements but does highlight the data elements so that the user 104 may see the highlights when the user 104 manually scrolls the window 828. In yet another aspect, movement of window 826, or changes in its size, merely allows the user 104 to concentrate on a sub-set of the data elements in window 824. In this aspect, the user 104 scrolls the window 828 manually to look for conforming data elements.

FIG. 8C illustrates display 830 provided on user interface 151. Display 830 includes pop-up analysis window 826A that shows elements of the incoming data record, in more detail than is provided in window 826, compared to elements of reference data set A, also shown in more detail. The analysis window 826A is displayed when user 104 clicks on sliding window 826.

Certain of the devices shown in FIGS. 1A(1)-2A include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flowchart and accompanying description to illustrate the embodiments represented in FIGS. 4B-4D, 5, and 6A-6E. The disclosed devices, components, and systems contemplate using or implementing any suitable technique for performing the steps illustrated. Thus, FIGS. 4B-4D, 5, and 6A-6E are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A common agnostic data exchange method for exchanging data between two devices in a network, each device transmitting and receiving data records using different data record formats and transmission protocols, comprising:

invoking a proxy at each of the two devices, each proxy including a processor;

a first processor of a first proxy receiving a first data stream from a first device, the first data stream comprising a first data record having a first format, the first data record comprising first data synchronizing elements, the first data synchronizing elements exhibiting a first pattern corresponding to first pattern information;

the first processor identifying the first format of the first data record, comprising:

comparing the first pattern information of the first data record to reference pattern information of one or more reference data records, each reference data record comprising reference date synchronizing elements exhibiting a reference pattern corresponding to the reference pattern information, and based on the comparison, determining a sufficient match exists between the first pattern and the reference pattern;

the first processor generating an inter-proxy data record using a translator to translate the first format of the first data record into a common, inter-proxy format;

the first processor transmitting the inter-proxy data record to a second proxy coupled to a second device, the second proxy comprising a second processor; and the second processor translating the inter-proxy format of the inter-proxy data record to a second format of a second data record at the second device.

2. The method of claim 1, wherein the first data synchronizing elements cooperate to form the first data elements into the first data record; and wherein the reference data synchronizing elements cooperate to form the reference data elements into the reference data record.

3. The method of claim 2, wherein the first processor generates the inter-proxy format, comprising the first processor:

receiving reference data element format information and reference data synchronizing element format information for a plurality of reference formats;

comparing reference element format information for each of the discrete reference elements to first element information for each of the discrete first elements to identify functions common to the first elements and the reference elements;

generating a common grammar encompassing the identified common functions;

generating the inter-proxy format and a corresponding inter-proxy format specification from the common grammar;

generating a translator between the inter-proxy format and each of the plurality of reference formats; and verifying translation between the inter-proxy format and each of the plurality of reference formats by applying the translator to a reference data record for each of the plurality of reference formats to generate the inter-proxy data record.

4. The method of claim 3, wherein first elements and the reference elements are parsed, respectively, into smallest parsable units of the corresponding first data record and the reference data record, and wherein the first processor generating the inter-proxy format specification comprises the first processor applying a parsing tool to identify as the reference elements, the smallest parsable units of the reference data record, and applying an extraction tool to extract the reference elements from the reference data record.

5. The method of claim 3, wherein the first processor generating a translator comprises the first processor:

generating an equivalence matrix between the inter-proxy format and the reference format comprising each row of the matrix including a reference element and a corresponding first element, and each row further processed to generate a translation rule to provide two-way translation between the reference element and the corresponding first element; and assembling the translation rule of each row of the matrix to generate the translator.

6. The method of claim 2, wherein the first processor determines an insufficient match exists, and wherein the first processor invokes an interactive format comparison, comprising the first processor:

receiving reference data element format information and reference data synchronizing element format information for a plurality of reference formats;

applying a parsing tool and an extractor tool to parse and extract the smallest possible units of the data elements and the data synchronizing elements from the first data record and the reference data records;

selecting a first reference data record and displaying its smallest possible parsable units in a scrollable first window of a user interface;

displaying the smallest possible parsable units of the first data record in a scrollable second window of the user interface;

displaying a positionable, adjustable overlay window in the second window at a first reference position;

providing an indication of a match between any first data record elements encompassed in the overlay window and any reference elements displayed in the first window, comprising comparing reference element format information for each of the displayed reference elements to first element information for each of the first data record elements displayed in the overlay window to identify functions common to the first data record elements and the displayed reference elements; and receiving a positioning signal through a user control device of the overlay window and repositioning the overlay window at a user-specified second reference position and repeating the providing and comparing steps until a sufficient match is achieved.

7. The method of claim 1, further comprising, invoking an additional proxy at the first network device, the additional proxy providing additional data transmission bandwidth for the first network device.

8. A method for agnostically exchanging data between two network devices, each network device transmitting and receiving data records using different formats, each format comprising formats and transmission protocols, the method, comprising:

invoking a separate proxy at each of the two network devices, each proxy including a processor component;

a first processor component of a first proxy receiving a first data stream from a first network device, the first data stream comprising at least one first data record, the at least one first data record comprising data elements and data synchronizing elements, the first data record, the data elements and the data synchronizing elements having a first format;

the first processor component invoking a format identification method, comprising:

displaying in a user interface to a user, the data elements and data synchronizing elements of the first data record and reference data elements and reference data synchronizing elements of a first reference data record, the user interface providing a comparison between a first pattern of the first data record and reference patterns corresponding to one or more reference data records, providing suggestions in the user interface of best matches between the first pattern and one or more of the reference patterns, and receiving from a user, a selection of a reference pattern matching the first pattern, the first processor component selecting a translator for translating the first data record;

the first processor component generating an inter-proxy data record by translating the first format of the first data record into a common, inter-proxy data record format;

the first processor component transmitting the inter-proxy data record to a second proxy coupled to a second network device, the second proxy comprising a second processor component; and the second processor component translating the common, inter-proxy data record format of the inter-proxy data record to a format used at the second network device.

9. The method of claim 8, wherein providing suggestions in the user interface of best matches between the first pattern and one or more of the reference patterns, comprises:

providing in the user interface, an adjustable, sliding window positionable by the user;

receiving a user instruction to position the sliding window to encompass a sub-set of first elements of the first data record; and highlighting reference elements when the sliding window encompasses first elements performing same functions as the reference elements.

10. The method of claim 9, wherein highlighting comprises providing a color-coding scheme indicating a range of possible match from highest to lowest above an adjustable threshold value.

11. The method of claim 8, wherein the first proxy publishes one or more inter-proxy data records to a network intermediary and the second proxy subscribes to one or inter-proxy data records published to the network intermediary.

12. A common agnostic data exchange system for exchanging data between two network devices in a network, each network device transmitting and receiving data records employing different formats and transmission protocols, the system comprising:

a first proxy in communication with a first network device and a second proxy in communication with a second network device, the first proxy comprising:

a first processor, and a first non-transitory, computer-readable storage medium storing machine instructions that, when executed, cause the first processor to:

receive a first data stream from the first network device, the first data stream comprising at least one first data record having a first format;

identify the first format of the at least one first data record, wherein the first processor:

extracts and parses elements of the at least one first data record, the element comprising data synchronizing elements comprising frame synchronization words, sub-frame identification words, and data words of the at least one first data record, the synchronizing elements having a first pattern, compares first pattern information of the frame synchronization words, sub-frame identification words, and data words of the at least one first data record to reference pattern information of a reference pattern of one or more reference data records, and determines a sufficient match exists between the first pattern and the reference pattern;

generates an inter-proxy data record by invoking a first translator to translate the first format of the first data record into a common, inter-proxy format; and transmits the inter-proxy data record to the second proxy, the second proxy comprising:

a second a second processor and a second non-transitory, computer-readable storage medium storing machine instructions that, when executed, cause the second processor to:
receive the inter-proxy data record;
invoke a translator to translate the inter-proxy format of the inter-proxy data record into a second format of a second data record; and
transmit the second data record to the second network device.

13. The system of claim 12, wherein the first and second proxies comprise standalone computing platforms physically connected, respectively, to the first and second network devices.

14. The system of claim 12, wherein the first and second proxies comprise virtual machines instantiated on a central computing device coupled to the network.

15. The system of claim 12,
wherein the first processor generates an interactive user interface providing comparison suggestions to a user, the interactive user interface comprising:
a first window displaying parsed and extracted elements for a reference data record, and
a second window displaying parsed and extracted elements for the first data record, the second window comprising a size adjustable overlay window positionable to encompass a sub-set of the parsed and extracted elements for the first data record, wherein the interactive user interface is executed by the first processor to scroll and highlight the parsed and extracted elements for the reference data record to indicate a possible function match with the encompassed subset of the parsed and extracted elements for the first data record; and
wherein the provides an indication that the possible function match exceeds an adjustable threshold probability.

16. The system of claim 15, wherein the first processor provides word adjustment tools that allow a user to apply offsets to the frame synchronization words, sub-frame identification words, and data words and pattern recognition tools that a user may employ to identify a frame or sub-frame by their patterns.

17. The system of claim 12,
wherein the first processor automatically compares parsed and extracted elements of the at least one first data record with parsed and extracted elements of a reference data record and identifies functions common to the at least one first data record and the reference data record; and
wherein the first processor computes a function match probability that exceeds an adjustable threshold probability.

18. A common agnostic data exchange method for exchanging data in a network between two network devices, each network device transmitting and receiving data records using different formats and transmission protocols, comprising:
invoking a proxy device at each of the two network devices, each proxy device including a processor;
a first processor of a first proxy device receiving a first data stream from a first network device, the first data stream comprising at least one data record, the at least one data record comprising one or more elements, the one or more elements comprising data elements and data synchronizing elements, the first data record having a first format and the one or more elements having a first pattern in the first data record;
the first processor identifying the first format of the at least one data record, comprising:
comparing first pattern information of the first data record to reference pattern information of one or more reference data records, the reference data records comprising reference data elements and reference data synchronizing elements, the reference data elements and the reference data synchronizing elements having a reference pattern,
determining a sufficient data pattern match exists between the first pattern information and the reference pattern information, and
generating an inter-proxy data record format;
the first processor translating the first data record into an inter-proxy data record having the inter-proxy data record format;
the first processor transmitting the inter-proxy data record to a second proxy device coupled to a second network device, the second proxy device comprising a second processor;
the second processor translating the common, inter-proxy data record into a second data record having a second format; and
the second processor transmitting the second data record to the second network device.

19. The method of claim 18, wherein the first processor implements the comparing, determining, and generating in an interactive user interface, comprising providing visualization tools operable by the user including element highlighting tools and a configurable and movable analysis window to select a sub-set of elements for user comparison and analysis and suggestive comparison and analysis.

* * * * *